(12) United States Patent
Sasanka et al.

(10) Patent No.: US 9,189,233 B2
(45) Date of Patent: Nov. 17, 2015

(54) SYSTEMS, APPARATUSES, AND METHODS FOR A HARDWARE AND SOFTWARE SYSTEM TO AUTOMATICALLY DECOMPOSE A PROGRAM TO MULTIPLE PARALLEL THREADS

(75) Inventors: Ruchira Sasanka, Hillsboro, OR (US); Abhinav Das, San Jose, CA (US); Jeffrey J. Cook, Portland, OR (US); Jayaram Bobba, Portland, OR (US); Arvind Krishnaswamy, San Jose, CA (US); David J. Sager, Portland, OR (US); Suresh Srinivas, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 181 days.

(21) Appl. No.: 13/533,821

(22) Filed: Jun. 26, 2012

(65) Prior Publication Data
US 2013/0166886 A1    Jun. 27, 2013

Related U.S. Application Data

(63) Continuation-in-part of application No. 12/978,557, filed on Dec. 25, 2010, which is a continuation-in-part of application No. 12/646,815, filed on Dec. 23, 2009, which is a continuation-in-part of application No.
(Continued)

(51) Int. Cl.
*G06F 9/00* (2006.01)
*G06F 9/30* (2006.01)
(Continued)

(52) U.S. Cl.
CPC .......... *G06F 9/30098* (2013.01); *G06F 9/3842* (2013.01); *G06F 9/3851* (2013.01);
(Continued)

(58) Field of Classification Search
None
See application file for complete search history.

(56) References Cited

U.S. PATENT DOCUMENTS 5,724,565 A * 3/1998 Dubey et al. .................. 712/245
5,872,987 A  2/1999 Wade et al.
(Continued)

FOREIGN PATENT DOCUMENTS

CN  1178941 A  4/1988
CN  1178941 A  4/1998
(Continued)

OTHER PUBLICATIONS

Nakano, H., et al., "Static Coarse Grain Task Scheduling with Cache Optimization Using OpenMP. International Journal of Parallel Programming" Jun. 2003, vol. 31, No. 3, pp. 211-223.
(Continued)

*Primary Examiner* — Don Wong
*Assistant Examiner* — Deric Ortiz
(74) *Attorney, Agent, or Firm* — Nicholson De Vos Webster & Elliott LLP

(57) ABSTRACT

Systems, apparatuses, and methods for a hardware and software system to automatically decompose a program into multiple parallel threads are described. For example, a method according to one embodiment comprises: analyzing a single-threaded region of executing program code, the analysis including identifying dependencies within the single-threaded region; determining portions of the single-threaded region of executing program code which may be executed in parallel based on the analysis; assigning the portions to two or more parallel execution tracks; and executing the portions in parallel across the assigned execution tracks.

16 Claims, 25 Drawing Sheets

Related U.S. Application Data

12/624,804, filed on Nov. 24, 2009, now Pat. No. 8,909,902.

(60) Provisional application No. 61/200,103, filed on Nov. 24, 2008.

(51) Int. Cl.
*G06F 11/36* (2006.01)
*G06F 9/38* (2006.01)
*G06F 9/54* (2006.01)
*G06F 9/45* (2006.01)

(52) U.S. Cl.
CPC ............... *G06F9/3861* (2013.01); *G06F 9/54* (2013.01); *G06F 11/3612* (2013.01); *G06F 11/3636* (2013.01); *G06F 11/3648* (2013.01); *G06F 8/456* (2013.01); *G06F 2213/0038* (2013.01)

(56) References Cited

U.S. PATENT DOCUMENTS

| | | | |
|---|---|---|---|
| 5,890,008 | A | 3/1999 | Panwar et al. |
| 5,933,627 | A | 8/1999 | Parady |
| 5,999,734 | A | 12/1999 | Willis et al. |
| 6,016,397 | A | 1/2000 | Ogasawara et al. |
| 6,438,747 | B1 | 8/2002 | Schreiber et al. |
| 6,622,301 | B1 | 9/2003 | Hirooka et al. |
| 6,711,667 | B1 * | 3/2004 | Ireton ............................ 712/35 |
| 7,010,787 | B2 | 3/2006 | Sakai |
| 7,178,137 | B1 | 2/2007 | Peak et al. |
| 7,373,640 | B1 | 5/2008 | English et al. |
| 7,376,800 | B1 | 5/2008 | Choquette et al. |
| 7,765,536 | B2 | 7/2010 | Gordy et al. |
| 7,814,486 | B2 | 10/2010 | Papakipos et al. |
| 7,962,724 | B1 | 6/2011 | Ali |
| 8,136,102 | B2 | 3/2012 | Papakipos et al. |
| 8,181,168 | B1 * | 5/2012 | Lee et al. ...................... 717/149 |
| 8,209,517 | B1 | 6/2012 | Rozas et al. |
| 8,214,808 | B2 | 7/2012 | Day et al. |
| 8,387,034 | B2 | 2/2013 | Gordy et al. |
| 8,418,179 | B2 | 4/2013 | Papakipos et al. |
| 8,527,973 | B2 | 9/2013 | Little et al. |
| 2003/0172253 | A1 | 9/2003 | Balakrishnan et al. |
| 2005/0273772 | A1 | 12/2005 | Matsakis et al. |
| 2006/0005176 | A1 | 1/2006 | Kawahara et al. |
| 2006/0064692 | A1 | 3/2006 | Sanchez et al. |
| 2006/0136878 | A1 | 6/2006 | Raghunath et al. |
| 2006/0218432 | A1 | 9/2006 | Traskov et al. |
| 2006/0294326 | A1 | 12/2006 | Jacobson et al. |
| 2007/0079281 | A1 | 4/2007 | Liao et al. |
| 2007/0174828 | A1 | 7/2007 | O'Brien et al. |
| 2007/0192545 | A1 | 8/2007 | Gara et al. |
| 2007/0220525 | A1 | 9/2007 | State et al. |
| 2007/0226696 | A1 | 9/2007 | Radhakrishnan et al. |
| 2007/0234315 | A1 | 10/2007 | Branda et al. |
| 2007/0283337 | A1 | 12/2007 | Kasahara et al. |
| 2007/0283357 | A1 | 12/2007 | Jeter et al. |
| 2008/0010444 | A1 | 1/2008 | Hammes |
| 2008/0163183 | A1 | 7/2008 | Li et al. |
| 2008/0209389 | A1 | 8/2008 | Baumgartner et al. |
| 2008/0294882 | A1 | 11/2008 | Jayapala et al. |
| 2009/0019272 | A1 | 1/2009 | Cypher et al. |
| 2009/0217020 | A1 | 8/2009 | Yourst |
| 2010/0042981 | A1 | 2/2010 | Dreyer et al. |
| 2010/0205599 | A1 | 8/2010 | Vaidya et al. |
| 2010/0235611 | A1 | 9/2010 | Yamashita |
| 2010/0262812 | A1 | 10/2010 | Lopez et al. |
| 2010/0269102 | A1 | 10/2010 | Latorre et al. |
| 2010/0274972 | A1 | 10/2010 | Babayan et al. |
| 2011/0067015 | A1 | 3/2011 | Takagi et al. |
| 2011/0119660 | A1 | 5/2011 | Tanaka |
| 2011/0167416 | A1 | 7/2011 | Sager et al. |

FOREIGN PATENT DOCUMENTS

| | | |
|---|---|---|
| JP | 10-116192 A | 5/1998 |
| KR | 1020040022436 A | 3/2004 |

OTHER PUBLICATIONS

Marcuello, P., et al., "Thread Partitioning and Value Prediction for Exploiting Specutlative Thread-Level Parallelism" IEEE Transactions on Computers, Feb. 2004, vol. 53, No. 2, pp. 114-125.

Madriles, C., et al., "Anaphase: A Fine-Grain Thread Decomposition Scheme for Speculative Multithreading" 2009 18th International Conference on Parallel Architectures and Compilation Techniques, IEEE Computer Society, pp. 15-25.

Madriles, C., et al., "Boosting Single-thread Performance in Multi-core Systems through Fine-Grain Multi-Threading" ISCA, Jun. 20-24, 2009, ACM, 10 pages.

Kasahara, H. et al, Automatic Coarse Grain Task Parallel Processing on SMP u sing OpenMP, IN: Languages and Computer for Parallel Computing, Springer Berlin Heidelberg, 2001, p. 189-207.

Sarkar, V., "Automatic partitioning of a program dependence graph into parallel tasks", IBM Journal of Research and Development, vol. 35. No. 5/6, Sep./Nov. 1991, pp. 779-804.

Notification of Transmittal of the International Search Report and the Written Opinion of the International Searching Authority, or the Declaration from counterpart PCT/US2013/043723 mailed Jul. 12, 2013, 9 pages.

Office Action and Taiwan Search Report from foreign counterpart Taiwan Patent Application No. 100145350, mailed Apr. 16, 2014, 7 pages.

Office Action from U.S. Appl. No. 12/646,815, mailed Nov. 10, 2014, 13 pages.

Office Action from foreign counterpart Korean Patent Application No. 10-2013-7016446, mailed Sep. 22, 2014, 5 pages.

Notification of Transmittal of the International Search Report and the Written Opinion of the International Searching Authority, or the Declaration from counterpart PCT/US2009/065735 mailed Jul. 8, 2010, 10 pages.

Non-Final Office Action from U.S. Appl. No. 12/624,804, mailed Apr. 22, 2013, 13 pages.

Final Office Action from U.S. Appl. No. 12/624,804, mailed Nov. 6, 2013, 13 pages.

Notice of Allowance from U.S. Appl. No. 12/624,804, mailed Apr. 3, 2014, 9 pages.

Non-Final Office Action from U.S. Appl. No. 12/646,815, mailed Aug. 23, 2012, 7 pages.

Final Office Action from U.S. Appl. No. 12/646/,815, mailed Jul. 18, 2013, 14 pages.

Office Action from foreign counterpart China Patent Application No. 200980139244.5, mailed Dec. 19, 2013, 6 pages.

Office Action from foreign counterpart China Patent Application No. 200980139244.5, mailed May 9, 2013, 14 pages.

Patterson, David. Hennessy, John. "Computer Architecture: A Quantitative Approach". Morgan Kaufmann Publishers, Inc, 1996. pp. 242-251.

Office Action from foreign counterpart Japan Patent Application No. 2011-536625, mailed Oct. 1, 2013, 8 pages.

Office Action from foreign counterpart Korean Patent Application No. 2011-7007725, mailed Oct. 12, 2013, 1 page.

Office Action from foreign counterpart Japan Patent Application No. 2013-546184, mailed Jul. 1, 2014, 2 pages.

Office Action from foreign counterpart Taiwan Patent Application No. 100145350, mailed Apr. 16, 2014, 7 pages.

Notification of Transmittal of the International Search Report and the Written Opinion of the International Searching Authority, or the Declaration from counterpart PCT/US2011/063466, mailed Jun. 28, 2012, 10 pages.

Notice of Allowance from foreign counterpart China Patent Application No. 200980139244.5, mailed May 30, 2014, 4 pages.

Notice of Allowance from foreign counterpart Korean Patent Application No. 2011-7007725, mailed Apr. 26, 2013, 3 pages.

Notice of Allowance from foreign counterpart Japan Patent Application No. 2011-536625, mailed Apr. 15, 2014, 3 pages.

(56) References Cited

OTHER PUBLICATIONS

Non-Final Office Action from U.S. Appl. No. 12/978,557, mailed Jun. 4, 2014, 17 pages.
Final Office Action from U.S. Appl. No. 12/978,557, mailed Jul. 16, 2013, 19 pages.
Non-Final Office Action from U.S. Appl. No. 12/978,557, mailed Nov. 21, 2012, 8 pages.
Notification Concerning Transmittal of International Preliminary Report on Patentability for International Application No. PCT/US2013/043723, mailed Jan. 8, 2015, 6 pages.
Final Notice of Rejection from foreign counterpart Japan Patent Application No. 2013-546184, mailed Jan. 6, 2015, 3 pages.
Office Action and China Search Report from foreign counterpart China Patent Application No. 201180062500.2, mailed Dec. 3, 2014, 12 pages.

* cited by examiner

| BB# | EDGE0 | EDGE1 |
|---|---|---|
| 1 | 7 | 2 |
| 2 | 0 | 3 |
| 3 | 0 | 4 |
| 4 | 0 | 5 |
| 5 | 6 | 0 |
| 6 | 0 | 1 |
| 7 | 0 | 6 |

|     |       |        | V0 target |       | V1 Target |       |
| --- | ----- | ------ | --------- | ----- | --------- | ----- |
| BB# | EDGE0 | EDGE1  | EDGE0     | EDGE1 | EDGE0     | EDGE1 |
| 1   | 7     | 2      | 0         | 0     | 1         | 1     |
| 2   | 0     | 3      | 0         | 0     | 1         | 1     |
| 3   | 0     | 4      | 0         | 0     | 1         | 1     |
| 4   | 0     | 5      | 0         | 0     | 1         | 1     |
| 5   | 6     | 1(BE)  | 0         | 0     | 1         | 1     |
| 6   | 0     | 6      | 0         | 0     |           | 1     |
| 7   |       |        |           |       |           |       |

FIG. 23

SYSTEMS, APPARATUSES, AND METHODS FOR A HARDWARE AND SOFTWARE SYSTEM TO AUTOMATICALLY DECOMPOSE A PROGRAM TO MULTIPLE PARALLEL THREADS

PRIORITY CLAIM

This is a continuation-in-part application and claims the priority date of U.S. patent application Ser. No. 12/978,557 entitled, "Systems, Apparatuses, And Methods For A Hardware And Software System To Automatically Decompose A Program To Multiple Parallel Threads," filed Aug. 25, 2010 which is a continuation-in-part application and claims the priority date of Non-Provisional patent application Ser. No. 12/646,815 entitled "Systems, Methods, and Apparatuses for Parallel Computing," which is itself a continuation-in-part application that claims priority to Non-Provisional patent application Ser. No. 12/624,804, filed Nov. 24, 2009, entitled "System, Methods, and Apparatuses To Decompose A Sequential Program Into Multiple Threads, Execute Said Threads, and Reconstruct The Sequential Execution" which claims priority to Provisional Patent Application Ser. No. 61/200,103, filed Nov. 24, 2008, entitled, "Method and Apparatus To Reconstruct Sequential Execution From A Decomposed Instruction Stream."

FIELD OF THE INVENTION

Embodiments of the invention relate generally to the field of information processing and, more specifically, to the field multithreaded execution in computing systems and microprocessors.

BACKGROUND

Single-threaded processors have shown significant performance improvements during the last decades by exploiting instruction level parallelism (ILP). However, this kind of parallelism is sometimes difficult to exploit and requires complex hardware structures that may lead to prohibitive power consumption and design complexity. Moreover, this increase in complexity and power provides diminishing returns. Chip multiprocessors (CMPs) have emerged as a promising alternative in order to provide further processor performance improvements under a reasonable power budget.

BRIEF DESCRIPTION OF THE DRAWINGS

The present invention is illustrated by way of example and not limitation in the figures of the accompanying drawings, in which like references indicate similar elements and in which:

FIG. 20 illustrates one embodiment of a table continuing basic block identifiers and associated edge identifiers.

FIG. 23 illustrates one embodiment of a table continuing basic block identifiers and associated edge identifiers.

DETAILED DESCRIPTION

Figure 1:
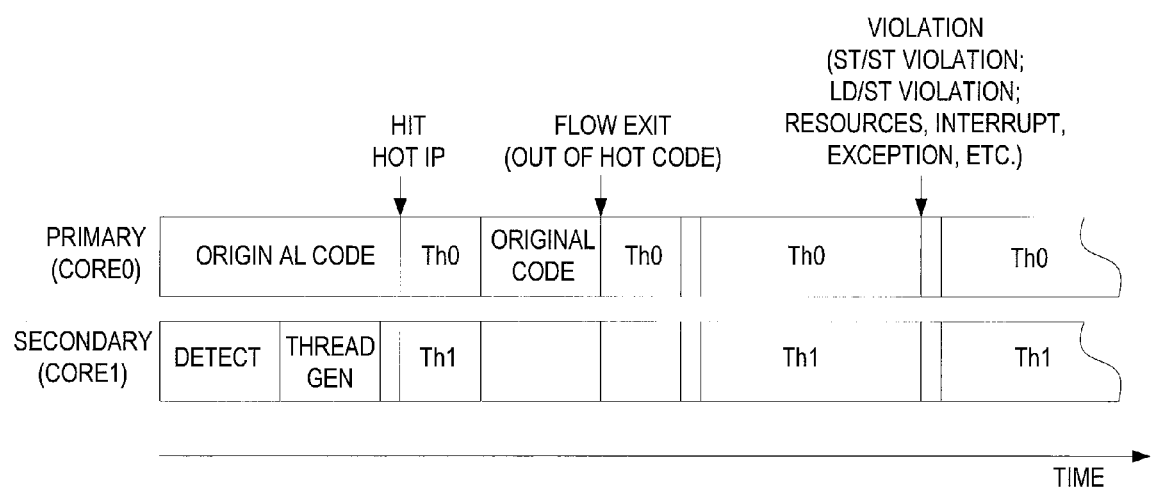
FIG. 1 graphically illustrates an exemplary embodiment of dynamic thread switch execution architecture operation.

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of systems, apparatuses, and methods for providing dynamic thread switch execution are detailed below. Embodiments of systems that support this consist of processor cores surrounded by a hardware wrapper and software (dynamic thread switch software). In a normal execution mode, the processor operates as if the hardware wrapper and dynamic thread switch software does not exist. For example, normal x86 execution occurs. In the dynamic thread switch execution (DTSE) mode, the hardware wrapper and software work together to perform dynamic thread switch execution including the generation and modification of flows, etc. as will be detailed below. However, a high-level overview is first provided. A more detailed explanation of some of these topics such as "flows" and "hot" code follows.

The details below describe a combination of a hardware wrapper that checks that each load gets data from the correct stores and certain other things before globally committing, together with software that uses recent observed code behavior to resolve code dependencies that are difficult to determine from the code alone, the because hardware will check and guarantee correct execution.

The details below describe the identification of many static instances in original code such that dependencies are understood between specific instances of original instructions and not between the original instructions themselves.

The described software uses a complete, but likely not perfectly correct, understanding of dependencies within a defined static code subset called a "Flow," to separate static code into separate "Tracks" that have no dependencies (or only specifically allowed dependencies) between tracks, within that flow.

Additionally, maintenance operations including one or more of the following: taking additional profiles of flows that get shorter than desired dynamic execution before exiting due to unexpected control flow or incorrect load results or failure of other checks; deletion of flows that suddenly become bad in this respect; continual search for new or replacement flows significant to performance; and re-separation of the code into tracks when there is new profile information and deletion of flows that are observed to not perform better than the original code are described.

DTSE Hardware will form a sequential list and write these to the Mid Level Cache. DTSE hardware has registers with the physical addresses associated with this Track's Metadata list. We may have to consider compression of the load and store addresses to keep bandwidth down.

We will need to be able to track the Logical Processor that is executing a load or store, to Load execution and to senior store processing.

DTSE logic also gets branch direction bits at retirement and the targets of taken indirect branches, including returns. This is used for Flash Profiling and for data to support register state recovery.

I. High-Level Overview

As detailed above, the processor detailed herein may operate in a legacy mode where each core operates one its own. The processor cores may also be used for profiling, threading, and running threaded code in DTSE mode when one of the cores is "off" or halted. The halt flow switches ownership of the core from the OS to DTSE mode although the operating system assumes that the core is in a sleep mode.

FIG. 1 graphically illustrates an exemplary embodiment of DTSE operation. This beings taking control of an idle core which becomes the secondary core in the illustration. In some embodiments, control of the idle core occurs when core receives a HALT/WMAIT instruction. The DTSE software watches for all threads of the core to be put to sleep and then assumes control of the core.

The secondary code starts by detecting "hot-code" which is an entry point the software running on the primary core which corresponds to a large part of the dynamic execution (e.g., a kernel that runs for 100K consecutive instructions). Hot-code detection is typically done in a simple hardware structure. Once a hot entry point has been detected, it is armed for profiling. Once hit (by the primary core), the hot-code goes into profiling mode which means that all loads, stores, and branches are profiled for some set amount of instructions (such as 50,000 instructions). Once profiling is finished, thread generation is performed. Thread generation analyzes the hot-code and based on the profiled information generates two threads for the threaded execution mode. Once completed, the entry point (hot IP) is armed as a DTSE mode entry point. The next time the original code (running on the primary core) hits the entry point, it switches into DTSE mode in which both cores cooperative execute the code. DTSE mode ends if the flow exits the hot-code or if a violation or external event (e.g., interrupt) is detected. Violations include, for example, when both cores store different data to the same memory address in the same epoch. Upon violation, the threaded mode rolls back to the last commit point and moves back to the original code.

Figure 2:
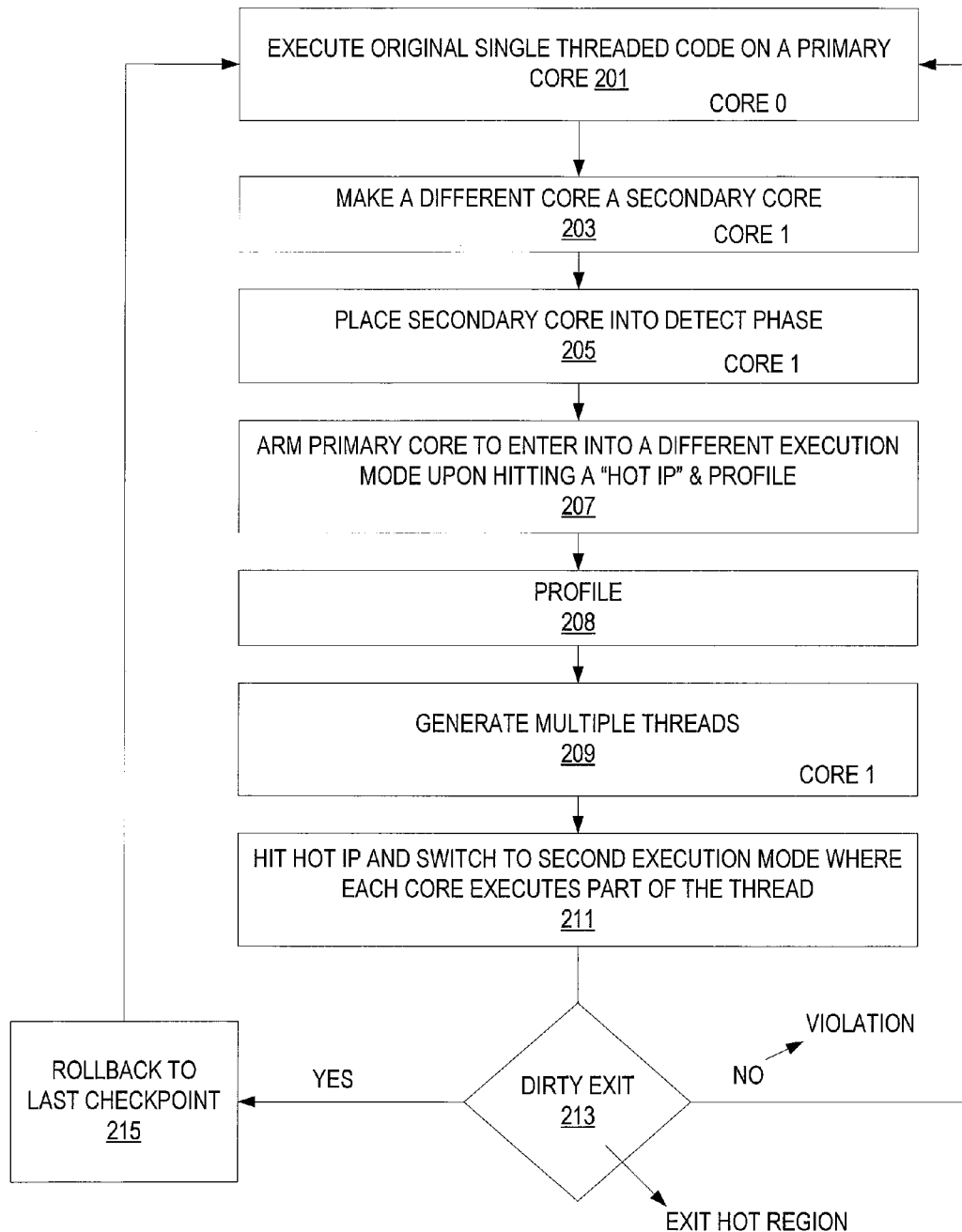
FIG. 2 illustrates an exemplary method of the DTSE operation according to some embodiments.

FIG. 2 illustrates an exemplary method of the DTSE operation according to some embodiments. In this example two cores are utilized to process threaded code. The primary core (core 0) executes the original single threaded code at 201.

At 203, another core (core 1) is turned into and used as a secondary core. A core can be turned into a secondary core (a worker thread) in many ways. For example, a secondary core could be used as a secondary core as a result of static partitioning of the cores, through the use of hardware dynamic schemes such as grabbing cores that are put to sleep by the OS (e.g., put into a C-State), by software assignment, or by threads (by the OS/driver or the application itself).

While the primary core is executing the original code, the secondary core will be placed into a detect phase at 205, in which it waits for a hot-code detection (by hardware or software) of a hot-region. In some embodiments, the hot-code detection is a hardware table which detects frequently accessed hot-regions, and provides its entry IP (instruction pointer). Once such a hot-region entry IP is detected, the primary core is armed such that it will trigger profiling on the next invocation of that IP and will switch execution to a threaded version of the original code at 207. The profiling gathers information such as load addresses, store addresses and branches for a predetermined length of execution (e.g. 50,000 dynamic instructions).

Once profiling has finished, the secondary core starts the thread-generation phase (thread-gen) 209. In this phase, the secondary core generates the threaded version of the profiled region, while using the profiled information as guidance. The thread generation provides a threaded version of the original code, along with possible entry points. When one of the entry points (labeled as a "Hot IP") is hit at 211, the primary core and the secondary cores are redirected to execute the threaded version of the code and execution switches into a different execution mode (sometimes called the "threaded execution mode"). In this mode, the two threads operate in complete separation, while the wrapper hardware is used to buffer memory loads and store, check them for possible violations, and atomically commit the state to provide forward progress while maintaining memory ordering.

This execution mode may end one of two ways. It may end when the code exits the hot-region as clean-exit (no problems with the execution) or when a violation occurs as a dirty-exit. A determination of which type of exit is made at 213. Exemplary dirty exits are store/store and load/store violations or an exception scenario not dealt with in the second execution mode (e.g., floating point divide by zero exception, uncacheable memory type store, etc.). On exit of the second execution mode, the primary core goes back to the original code, while the secondary core goes back to detection mode, waiting for another hot IP to be detected or an already generated region's hot IP to be hit. On clean exit (exit of the hot-region), the original code continues from the exit point. On dirty-exit (e.g., violation or exception), the primary core goes back to the last checkpoint at 215 and continues execution for there.

On both clean and dirty exits, the register state is merged from both cores and moved into the original core.

Exemplary DTSE Architecture

Figure 3:
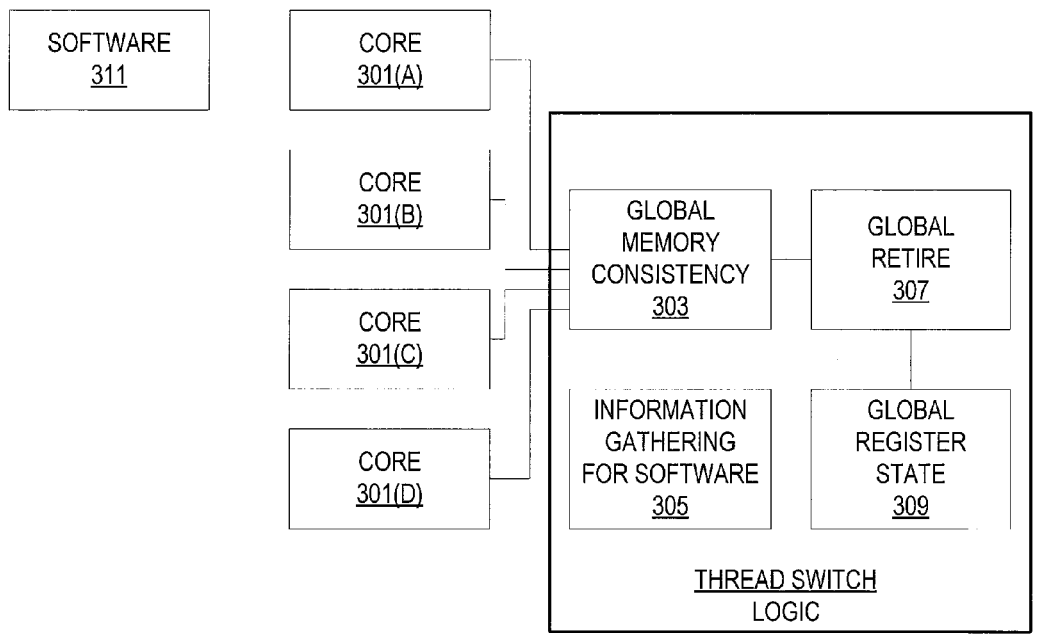
FIG. 3 illustrates an embodiment of a DTSE architecture.

FIG. 3 illustrates an embodiment of a dynamic thread switch execution architecture. The software and hardware aspects of this system are discussed below in detail. As discussed above, each core 301 may natively support Simultaneous Multi-Threading (SMT). This means that two or more logical processors may share the hardware of the core. Each logical processor independently processes a code stream, yet the instructions from these code streams are randomly mixed for execution on the same hardware. Frequently, instructions from different logical processors are executing simultaneously on the super scalar hardware of a core. The performance of SMT cores and the number of logical processors on the same core is increased. Because of this, some important workloads will be processed faster because of the increased number of logical processors. Other workloads may not be processed faster because of an increased number of logical processors alone.

There are times when there are not enough software threads in the system to take advantage of all of the logical processors. This system automatically decomposes some or all of the available software threads, each into multiple threads to be executed concurrently (dynamic thread switch from a single thread to multiple threads), taking advantage of the multiple, perhaps many, logically processors. A workload that is not processed faster because of an increased number of logical processors alone is likely to be processed faster when its threads have been decomposed into a larger number of threads to use more logical processors.

In additional to the "traditional" cores, the hardware includes dynamic thread switch logic that includes logic for maintaining global memory consistency 303, global retirement 307, global register state 309, and gathering information for the software 305. This logic may be included in the cores themselves or be provided separately. This logic may perform five functions. The first is to gather specialized information about the running code which is called profiling. The second, is while original code is running, the hardware must see execution hitting hot IP stream addresses that the software has defined. When this happens, the hardware forces the core to jump to different addresses that the software has defined. This is how the threaded version of the code gets executed. The third is the hardware must work together with the software to effectively save the correct register state of the original code stream from time to time as Global Commit Points inside of a core's data cache. If the original code stream was decomposed into multiple threads by the software, then there may be no logical processor that ever has the entire correct register state of the original program. The correct memory state that goes with each Global Commit Point should also be known. When necessary, the hardware, working with the software must be able to restore the architectural program state, both registers and memory, to the Last Globally Committed Point as will be discussed below. Fourth, although the software will do quite well at producing code that executes correctly, there are some things the software cannot get right 100% of the time. A good example is that the software, when generating a threaded version of the code, cannot anticipate memory addresses perfectly. So the threaded code will occasionally get the wrong result for a load. The hardware must check everything that could possibly be incorrect. If something is not correct, hardware must work with the software to get the program state fixed. This is usually done by restoring the core state to the Last Globally Committed State. Finally, if the original code stream was decomposed into multiple threads, then the stores to memory specified in the original code will be distributed among multiple logical processors and executed in random order between these logical processors. The dynamic tread switch logic must ensure that any other code stream will not be able to "see" a state in memory that is incorrect, as defined by the original code, correctly executed.

In these exemplary architecture, a processor core ("core") usually has two SMT threads. In general, in the DTSE mode there are many more than 2 "Logical Processors" per core. These logical processors are defined as being one of two types: "Primary" and "Worker." A Primary Logical Processor is known to software, i.e., the operating system and Virtual Machine Monitor. The software sees the set of Primary Logical Processors on a core as SMT threads on the core that they are actually on. Primary Logical Processors to do most, if not, everything that an SMT thread does, and in particular, get interrupts.

Worker Logical Processors are not generally visible to external software. They are used by and managed by DTSE software in "reserved memory." This memory is a physically addressable, reserved memory system. This reserved memory could either be a dedicated portion of existing system memory or separate physical memory. This reserved memory is used to store DTSE code and act as its working memory. Data structures generated in the DTSE mode are store in the reserved memory. The "hot" code is also stored in this reserved memory. Track data, the track data directory, and track metadata are in reserved memory. All of these things are addressed physically.

Worker Logical Processors do not have the full context that a Primary Logical Processor has, and, as a result, they are restricted to a subset of the full processor functionality. Worker Logical Processors execute only code in a flow in reserved memory and will not execute original code in visible memory.

A Primary Logical Processor may execute original code in visible memory or code in a flow in hidden memory. The code in a flow in hidden memory that a Primary would execute is single Track code, from a DTSE perspective.

In operation, the operating system runs threads on Primary Logical Processors, as it does today. The Primary Logical Processors are all the same and are grouped into "cores." There are many Primary Logical Processors and each one is very high performance. The performance of a Primary Logical Processor multiplied by the number of Primary Logical Processors available to the operating system far exceeds the throughput capability of the chip.

It is possible to use the entire capability of the chip using a fraction of the Primary Logical Processors that are provided. On the other hand, well coded, massively parallel programs may use the capability of the chip more efficiently, and therefore achieve higher performance, by using a large number, preferably all, of the provided Primary Logical Processors.

If the running Primary Logical Processors are not using all the resources that the chip has to offer, then DTSE software will do automatic thread decomposition. It will run parallelized compute flows on Worker Logical Processors. This includes, especially, decomposition of significant SSE and AVX code to run on the through put engine in parallel. This includes running code that can run on special function units on those special function units.

Basically, when the thread on a Primary Logical Processor is actually running a compute flow on Worker Logical Processors, the Primary Logical Processor has nothing to do. It is effectively halted while the operating system thinks it is doing all the work. As detailed above, the operating system does not know about the Worker Logical Processors. When a compute flow is running on Workers, the Primary Logical Processor that owns it is waiting for one of two things to happen: an interrupt or a flow exit in the compute flow. If either of those things happens, the Primary takes over. If there is an interrupt that goes to an Interrupt Flow, it immediately executes that Interrupt Flow, in parallel with its Compute Flow on the Workers. In most cases the Interrupt Flow does the entire interrupt handling and the Primary is back to waiting, without any impact on the Compute Flow at all. When there is a Flow exit in its Compute Flow, the waiting Primary constructs the register state at that point, and resumes in original code. Ideally, it will hit a hot code entry point very soon. This will begin execution of a new Compute Flow, or possibly a System Flow on the Primary Logical Processor.

The DTSE software 311 includes may include routines for generating, maintaining, and removing flows among other tasks detailed below.

Hardware "Wrapper"

In some embodiments, a hardware wrapper is used for dynamic thread switch execution logic. The wrapper hardware supports one or more of the following functionalities: 1) detecting hot regions (hot code root detection); 2) generating information that will characterize to hot region (profile); 3) buffering state when executing transactions; 4) commit the buffered state in case of success; 5) discarding the buffered state in case of abort; 6) detecting coherency events, such as write-write and read-write conflict; 7) guarding against cross modifying code; and/or 7) guarding against paging related changes. Each of these functionalities will be discussed in detail below or has already been discussed.

While in DTSE execution mode, the generated threads operate together, but have no way of communicating. Each core executes its own thread, while commit/span markers denote IPs in the threaded-code that correspond to some IP in the original code. The DTSE hardware buffers loads and stores information, preventing any store to be externally visible (globally committed). When both cores have reached a span marker the loads and stores are checked for violations. If no violations were detected, the stores can become globally committed. The commit of stores denotes a checkpoint to which execution should jump in case of a violation/dirty exit.

Figure 4:
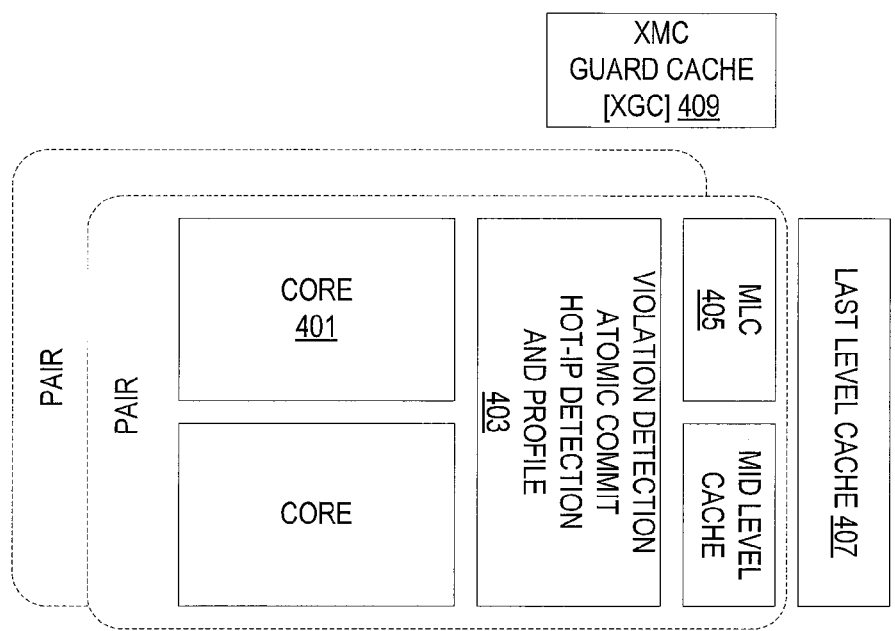
FIG. 4 illustrates the main hardware blocks for the wrapper according to some embodiments.

FIG. 4 illustrates the main hardware blocks for the wrapper according to some embodiments. As discussed above, this consists of two or more cores 401 (shown as a belonging to a pair, but there could be more). Violation detection, atomic commit, hot IP detection, and profiling logic 403 is coupled to the cores 401. In some embodiments, this group is called the dynamic thread switch execution hardware logic. Also coupled to the cores is mid-level cache 405 where the execution state of the second execution mode is merged. Additionally, there is a last level cache 407. Finally, there is a xMC guardata cache (XGC 409) which will be discussed in detail with respect to FIG. 7.

A number of "flows" for an application will be identified by the hardware in root detection hardware (not explicitly illustrated). Each flow is a well-defined set of binary code with one or more entry points. The set of flows for the application should cover a significant amount of the dynamic execution of the application, but the combined size of the static flows should be small due to parallelization of the flows.

When original code is being executed, the root detection hardware searches for a single IP value, called the "root" that will identify a new flow. Typically, this hardware will not search while execution is in a flow. In some embodiments, the hardware will keep a list of 64 instruction pointers (IPs). The list is ordered from location 0 to location 63, and each location can have an IP or be empty. The list starts out all empty.

If there is an eligible branch to an IP that matches an entry in the list at location N, then locations N−1 and N swap locations, unless N=0. If N=0, then nothing happens. More simply, this IP is moved up one place in the list.

If there is an eligible branch to an IP that does NOT match an entry in the list, then entries 40 to 62 are shifted down 1, to locations 41 to 63. The previous contents of location 63 are lost. The new IP is entered at location 40.

In some embodiments, there are restrictions on which IPs are "eligible" to be added to the list, or be "eligible" to match, and hence cause to be promoted, an IP already on the list. The first such restriction is that only targets of taken backward branches are eligible. Calls and returns are not eligible. If the taken backward branch is executing "hot" as part of a flow and it is not leaving the flow, then its target is not eligible. If the target of the taken backward branch hits in the hot code entry point cache, it is not eligible. Basically, IPs that are already in flows should not be placed in to the list.

In some embodiments, there are two "exclude" regions that software can set. Each region is described by a lower bound and an upper bound on the IP for the exclude region. Notice that this facility can be set to accept only IPs in a certain region. The second restriction is that IPs in an exclude region are not eligible to go in the list.

In some embodiments, no instruction that is less than 16,384 dynamic instructions after hitting an instruction in the list is eligible to be added, however, it is permissible to replace the last IP hit in the list with a new IP within the 16,384 dynamic instruction window. Basically, a flow is targeted to average a minimum of 50,000 instructions dynamically. An IP in the list is a potential root for such a flow. Hence the next 16,000 dynamic instructions are considered to be part of the flow that is already represented in the list.

In some embodiments, the hardware keeps a stack 16 deep. A call increments the stack pointer circularly and a return decrements the stack pointer, but it does not wrap. That is, on call, the stack pointer is always incremented. But there is a push depth counter. It cannot exceed 16. A return does not decrement the stack pointer and the push depth counter if it would make the push depth go negative. Every instruction increments all locations in the stack. On a push, the new top of stack is cleared. The stack locations saturate at a maximum count of 64K. Thus, another restriction is that no IP is eligible to be added to the list unless the top of stack is saturated. The reason for this is to avoid false loops. Suppose there is a procedure that contains a loop that is always iterated twice. The procedure is called from all over the code. Then the backward branch in this procedure is hit often. While this looks very hot, it is logically unrelated work from all over the place, and will not lead to a good flow. IPs in the procedures that call this one are what is desired. Outer procedures are preferred, not the inner ones, unless the inner procedure is big enough to contain a flow.

In some embodiments, if an IP, I, is either added to the list, or promoted (due to hitting a match), then no instruction within the next 1024 dynamic instructions is eligible to match I. The purpose of this rule is to prevent overvaluing tight loops. The backward branch in such loops is hit a lot, but each hit does not represent much work.

The top IPs in the list are considered to represent very active code.

The typical workload will have a number of flows to get high dynamic coverage. It is not critical that these be found absolutely in the order of importance, although it is preferable to generally produce these flows roughly in the order of importance in order to get the biggest performance gain early. A reasonable place for building a flow should be found. This will become hot code, and then it is out of play for finding the next flow to work on. Most likely, a number of flows will be found.

The flows, in general, are not disjoint and may overlap. But, at least the root of each flow is not in a previously found flow. It may actually still be in a flow that is found later. This is enough to guarantee that no two flows are identical. While specific numbers have been used above, these are merely illustrative.

There are at least two kinds of flows for this architecture: system slows and compute flows. Compute Flows execute on a cluster of Worker Logical Processors. A System Flow executes on a Primary Logical Processor.

A Compute Flow may be, but is not required to be, multiple Tracks made from a single code stream by thread decomposition. A Compute Flow is executed entirely by Worker Logical Processors within a single Cluster because the whole Flow must be Globally committed in Program order after being checked (but typically is Globally committed as a sequence of Commit Spans, not in a single piece). All of the Workers executing the Flow can freely load and store to the same addresses. A Compute Flow is the most restrictive in terms of what it cannot do.

A System Flow is also code produced by DTSE software and also resides in hidden memory. There are numerous things that cannot be done in a System Flow. It is restricted, but much less restricted than a Compute Flow. A System Flow is either serial code between Compute Flows or an independent parallel thread to Compute Flows.

One of the most important uses for a System Flow is interrupt processing. At times, DTSE software creates Flows whose entry points are the most popular interrupt vector targets. This code will cover the most popular paths from these vector targets. If an interrupt can be completely handled within a System Flow, from vector target to the interrupt return (IRET) back to the interrupted code without a System Flow exit, then there is no need to disturb the Workers executing the Flow that was "interrupted". If the entire interrupt handling sequence cannot be so handled, then a Flow exit must be forced in the Workers executing the Flow that was "interrupted." A context switch will always cause an Interrupt Flow exit, and hence a Flow exit in the "interrupted" Compute Flow.

If the interrupt can be handled in this Interrupt Flow, then registers are never saved. The Interrupt System Flow is a single Global Commit Span. Either it will finish to the IRET and all commit as a unit, or the state will be recovered to the target of the interrupt vector and execution resumes from there in the original code. The state recovery includes stopping Global Commitment (and further execution) in the Compute Flow, and recovering register state from the last Global Commit Point in the Compute Flow.

Code in Flows in Hidden Memory can be thread switched ultra fast and efficiently, because the thread switching is programmed right into the code. Original code cannot have the thread switching programmed in. Thread switching involving original code is slow and inefficient.

Compute Flows are restricted as to what they can do. Some original code is not eligible to go into Compute Flows. Some code that is ineligible for Compute Flows can go into System Flows which are less restrictive. Then there is still some code that is not eligible even to go into System Flows. This must remain original code.

In some embodiments, including unlimited amounts of original code, if need be, are multiplexed with flows of both types.

Once a hot-code root IP (entry IP) is detected, the primary core is armed so that on the next hit of that IP, the core will start profiling the original code. While profiling, the information above (branches, loads and stores) are stored in program dynamic order into buffers in memory. These buffers are later used by the thread generation software to direct the thread generation—eliminate unused code (based on branches), direct the optimizations, and detect load/store relationships. In some embodiments, the same hardware used for conflicts checking (will be described later) is used to buffer the loads, stores and branch information from retirement, and spill it into memory. In other embodiments, micro-operations are inserted into the program at execution which would store the required information directly into memory.

To characterize a hot region (profiling), the threaded execution mode software requires one or more of the following information: 1) for branches, it requires a) for conditional branches taken/not taken information, and b) for indirect branches the branch target; 2) for loads, a) a load address and b) access size; and 3) for stores a) a store address and b) a store size.

In some embodiments, an ordering buffer (OB) will be maintained for profiling. This is because loads, stores and branches execute out-of-order, but the profiling data is needed in order. The OB is similar in size to a Reordering Buffer (ROB). Loads, while dispatching, will write their address and size into the OB. Stores, during the STA (store address) dispatch, will do the same (STA dispatch is prior to the store retirement the purpose of this dispatch is to translate the virtual store address to physical address). Branches will write the 'to' field, that can be used for both direct and indirect branches. When these loads, stores and branches retire from the ROB, their corresponding information will be copied from the OB. Hot code profiling uses the fact that the wrapper hardware can buffer transactional state and later commit it. It will use the same datapath of committing buffered state to copy data from the OB to a Write Combining Cache (will be described later), and then commit it. The profiling information will be written to a dedicated buffer in a special memory location to be used later by threaded execution software.

In some embodiments, the DTSE software writes an IP in a register and arms it. The hardware will take profile data and write it to a buffer in memory upon hitting this IP. The branch direction history for some number of branches (e.g., 10,000) encountered after the flow root IP is reported by the hardware during execution. The list is one bit per branch in local retirement order. The dynamic thread switch execution software gets the targets of taken branches at retirement. It reports the targets of indirect branches embedded in the stream of branch directions. At the same time, the hardware will report addresses and sizes of loads and stores.

As applications may change their behavior over time, the execution should be monitored for as long as the application executes. As flows appear to become "too" short, they should be grown or deleted. Additionally, new flows can be found, regenerated, and merged at any given time. In some embodiments, the dynamic thread switch execution system's hardware will report average globally committed instructions and cycles for each flow. The software will need to consider this and also occasionally get data on original code, by temporarily disabling a flow, if there is any question. In most instances, the software does not run "hot" code unless it is pretty clear that it is a net win. If it is not clear that "hot" code is a net win, the software should disable it. This can be done flow by flow, or the software can just turn the whole thing off for this workload.

The software will continue to receive branch miss-prediction data and branch direction data. Additionally, the software will get reports on thread stall because of its section of the global queue being full, or waiting for flow capping. These can be indicative of an under loaded track (discussed later) that is running too far ahead. It will also get core stall time for cache misses. For example, Core A getting a lot of cache miss stall time can explain why core B is running far ahead. All of this can be used to do better load balancing of the tracks for this flow. The hardware will also report the full identification of the loads that have the highest cache miss rate. This can help the software redistribute the cache misses.

In some embodiments, the software will get reports of the cycles or instructions in each flow execution. This will identify flows that are too small, and therefore have excessive capping overhead.

Figure 5:
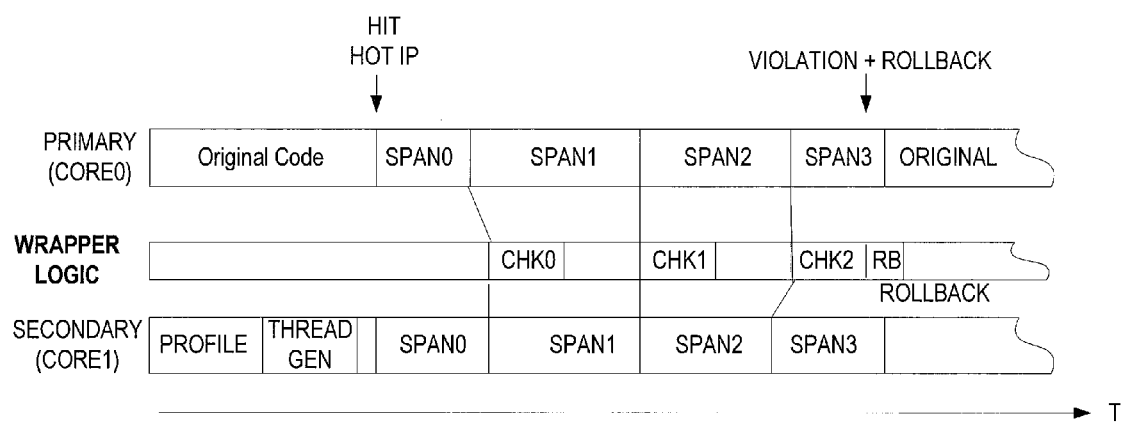
FIG. 5 illustrates spanned execution according to an embodiment.

FIG. 5 illustrates spanned execution according to an embodiment. When the threaded execution software generates threads for hot code it tries to do so with as little duplication as possible. From the original static code, two or more threads are created. These threads are spanned. Span marker syncs are generated to the original code and violations (such as those described above) are checked at the span marker boundaries. The memory state may be committed upon the completion of each span. As illustrated, upon hitting a hot IP, the execution mode is switched to threaded execution. What is different from the previous general illustration is that each thread has spans. After each span a check (chk) is made. In the example, after the second span has executed the check (chk2) has found a violation. Because of this violation the code is rolled back to the last checkpoint (which may be after a thread or be before the hot IP was hit).

As discussed above, threaded execution mode will exit when the hot code region is exited (clean exit) or on violation condition (dirty exit). On a clean exit, the exit point will denote a span and commit point, in order to commit all stores. In both clean and dirty exits, the original code will go to the corresponding original IP of the last checkpoint (commit). The register state will have to be merged from the state of both cores. For this, the thread generator will have to update register checkpoint information on each commit. This can be done, for example, by inserting special stores that will store the relevant registers from each core into a hardware buffer or memory. On exit, the register state will be merged from both cores into the original (primary) core. It should be noted that other alternatives exist for registers merging, for example register state may be retrievable from the buffered load and store information (as determined by the thread generator at generation time).

Figure 6:
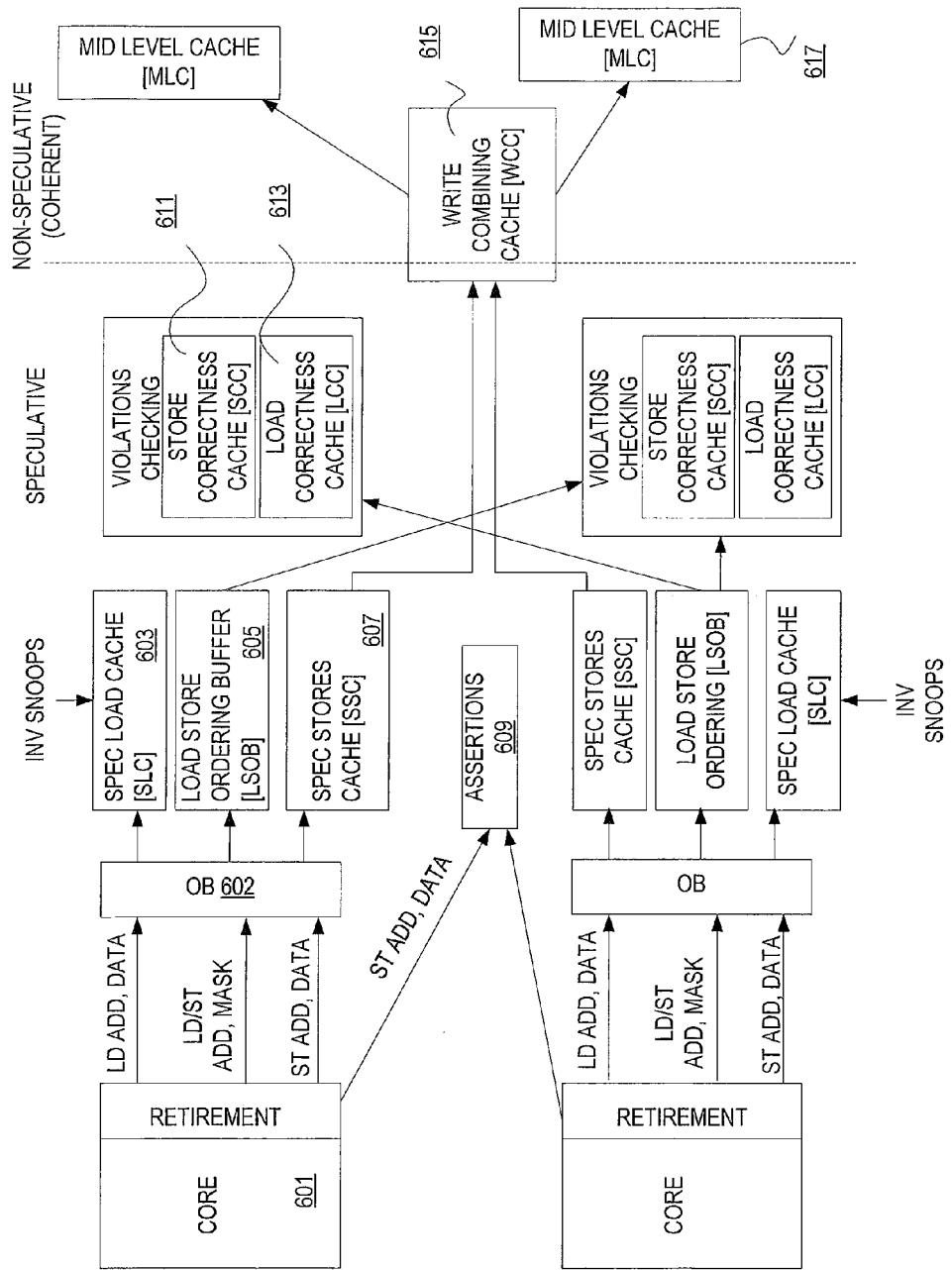
FIG. 6 illustrates a more detailed illustration of an embodiment of DTSE hardware.

A more detailed illustration of an embodiment of DTSE hardware is illustrated in FIG. 6. This depicts both speculative execution on the left and coherent on the right. In some embodiments, everything but the MLC 617 and cores 601 forms a part of the violation detection, atomic commit, hot IP detection, and profiling logic 403. The execution is speculative because while in the threaded mode the generated threads in the cores 601 operate together, they do not communicate with each other.

In some embodiments, the hardware wrapper includes a single physical protection cache that protects original code for which there is a copy, in some form, in reserved memory (again, this is not illustrated). In some embodiments, this is a 16 K line, 8 way set associative cache where each line covers 4096 Bytes of original code. The resolution is to 64 Byte blocks. The cache line contains a starting block and ending block within the 4096 Byte aligned scope of the line. A block number is 6 bits. This cache may have multiple lines in the same set with the same tag. Hence, when reading the physical protection cache, multiple lines in the same set may be hit up to 8 lines. This provides the capability to represent several disjoint spans in the same 4096 Bytes, with unprotected gaps in between.

Software 311 should ensure that no 64 Byte block is represented in the Physical Protection Cache more than once. When a check for a hit on a 64 Byte block is made, a check if the block is in any of the up to 8 lines that the 4096 Byte granularity address hit in is also made. Since there are 16 K lines, they are numbered with a 14 bit line number. A 64 Byte block will either miss this cache or hit a unique 14 bit line number.

The Physical Protection Cache is looked up on any invalidating snoop. On a hit, the 14 bit line number of the hit is retrieved, and optionally the 6 bit number of the 64 Byte block that was hit is supplied.

For each flow, software will ensure that its original code is covered in the Physical Protection Cache before it processes the code. This may involve expanding the span of a line already in the cache or adding a new line.

Software will get the list of line numbers required to cover the Flow. For example, software will reduce this list to a single 28 bit number. The line numbers are 14 bits. We use 2 bits for each bit in the line numbers, valid bit and data bit, hence 28 bits for 14 bit line numbers. In each bit position, if the whole list agrees on what the bit is, that becomes the resultant data bit and the valid bit becomes 1. If there is disagreement in the list for the value in a bit position, then the resultant data bit becomes 0 and the valid bit becomes 0. These 28 bits are the signature of the Flow.

Each core has the signatures of all flows in its Hot Code Entry Point Cache (not shown). And, in particular, it has the one signature of the currently tentatively globally committing Flow. There is a Hot Code Entry Point Table in reserved memory although in some embodiments parts of this table are cached.

If a taken branch is predicted, its target is looked up in the widest scope cache. If it misses, then a refill is requested. If it hits and there is no entry point, that is the end of it. If there is an entry point, then the next smaller scoped cache is looked up. Finally it either hits an entry point, does not hit an entry point, or uncertain but fetching refills to the caches.

If the taken branch target is in reserved memory, there are no Hot Code Entry Point cache lookups.

We get an identification for the taken branch. If we hit an entry point, then when this branch retires and is still taken, we force a jump to the indicated target, and the workers also get forced jumps to the indicated entry points.

Each tentatively Globally committing Flow is checked. If there is a line match, then there will be a Flow exit. Otherwise it can be allowed to commit. This continues until all Flows entered before the Hot Code Entry Point Cache was cleaned are done. Once this check is in place Global Commitment can resume.

All the signatures in the Hot Code Entry Point Cache must be checked. If there is a line match, then the entry point is decertified. When certification code is invoked, it will see the flag. This means that it must process the work list in the Reserved Memory Agent (not shown) before it can certify any entry point. It reads line numbers that were hit. It knows the exact span for each line number. It knows exactly the cache lines required by each Flow. It either deletes or checks each Flow that could have been hit. It updates its full Hot Code Entry Point table. Then it can do its certification task.

Each core 601 executes its own thread, while span markers denote places (IPs) in the threaded code that correspond to some IP in the original code (span markers are shown in a previous figure). While executing in this mode, the hardware buffers loads and stores information, preventing any store to be externally visible (globally committed). This information may be stored in various caches. These are illustrated as the speculative load data cache (SLC) 603, load store ordering buffer (LSOB) 605, and speculative stores cache (SSC) 607. While these are illustrated as being separate, in some embodiments they are partitions of a single entity. Additionally, this storage may not be configured on a per core basis as shown.

In some embodiments, prior to capturing this data it passes through an ordering buffer (OB) 602 which maintains the proper retirement order of executed loads and stores as detailed earlier. Physical addresses and sizes of stores are made available to DTSE logic as the senior (older) stores are written to the data cache and are placed in the SLC 603. The SLC 603 also detects invalidating snoops. Similarly, load addresses and sizes are made available to DTSE logic and are stored in the SLC. Loads and stores are also written to the Load Store Ordering Buffering (LSOB) 605 to keep ordering information between the loads and stores in each thread. The LSOB 605 maintains the data and a mask (valid bytes).

Ultimately, DTSE logic gets retired load addresses in a proper order along with their store addresses. In some embodiments, the DTSE logic gets the load addresses and sizes at execution time. If that is the case, then DTSE logic will age and filter them to get properly ordered, retired load addresses and sizes.

Data Cache

When both cores reach a span marker the loads and stores are checked for violations using the violations checking components (store correctness cache (SCC) 611 and load correctness cache (LCC) 613 as is detailed below. Typically, there is a SCC 611 and LCC 613 per worker. The SCC 611 is written with both load and store addresses for its worker. It is read with the store addresses of all other cooperating workers. It shows the bytes that have been written by code in a single alignment span. Typically this case is an independent physical structure. The LCC 613 is written with store address of all workers from the LSOB 605. It is read with the load addresses of its worker. Typically, this is a data structure in reserved memory. If no violations were detected, the stores can become globally committed. The commit of stores denotes a checkpoint, to which the execution should jump in case of a violation in the following spans.

There are several violations that may occur. The first is an invalidating snoop from an external entity (e.g., another core), which invalidates data used by one of the cores. Since some value was assumed (speculative execution), which may be wrong, the execution has to abort and the original code will go back to the last checkpoint. Store/store violations may arise when two stores on different threads write to the same address in the same span. In some embodiments, since there is no ordering between the different threads in a single span, there is no way to know which store is later in the original program order, and the threaded execution mode aborts and go back to original execution mode. Store/load violations may arise if a store and a load in different threads use the same address in memory in the same span. Since there is no communication between the threads, the load may miss the data that was stores by the store. It should be noted that typically a load is not allowed to hit a stored data by the other core in any past span. That is because the cores execute independently, and the load may have executed before the other core reach the store (one core can be many spans ahead of the other). Self-modifying-code or cross-modify-code events may happen, in which the original code has been modified by a store in the program or by some other agent (e.g. core). In this case, the threaded code may become stale. Other violations may arise due to performance optimizations and architecture tradeoffs. An example of such violations is a L1 data cache unit miss that hits a dropped speculative store (if this is not supported by the hardware). Another example is an assumption made by the thread generator, which is later detected as wrong (assertion hardware block 609).

Once there is guarantee that no violation has happened, the buffered stores may be committed and made globally visible. This happens atomically, otherwise the store ordering may be broken (store ordering is part of the memory ordering architecture, which the processor must adhere to).

While executing the threaded mode, all stores will not use the "regular" datapath, but will write both to the first level cache (of the core executing the store), which will act as a private, non-coherent scratchpad, and to the dedicated data storage. Information in the data storage (cache and buffers above) will include address, data, and datasize/mask of the store. Store combining is allowed while stores are from the same commit region.

When the hardware decides to commit a state (after violations have been checked), all stores need to be drained from the data storage (e.g., SSC 607) and become a coherent, snoopable state. This is done by moving the stores from the data storage to a Write Combining Cache (WCC) 615. During data copy snoop invalidations will be sent to all other coherent agents, so the stores will acquire ownership on the cache lines they change.

The Write Combining Cache 615 combines stores from different agents (cores and threads), working on the same optimized region, and makes these stores global visible state. Once all stores from all cores were combined into the WCC 615 it becomes snoopable. This provides atomic commit, which maintains memory ordering rules, into a mid level cache 217.

The buffered state is discarded in an abort by clearing some "valid" bit in the data storage, thereby removing all buffered state.

Coherency checks may be used due to the fact that the original program is being split to two or more concurrent threads. An erroneous outcome may occur if the software optimizer does not disambiguate loads and stores correctly. The following hardware building blocks are used to check read-write and write-write conflicts. A Load-Correctness-Cache (LCC) 613 holds the addresses and data size (or mask) of loads executed in optimized region. It used to make sure no store from another logical core collides with loads from the optimized region. On span violation check, each core writes its stores into the LCC 613 of the other core (setting a valid bit for each byte written by that core). The LCC 613 then holds the addresses of the stores of the other core. Then each core checks its own loads by iterating over its LSOB (load store ordering buffer) 605, resetting the valid bits for each byte written by its stores, and checking each load that it did not hit a byte which has a valid but set to 1 (meaning that that byte was written by the other core). A load hitting a valid bit of 1 is denoted as a violation. A store-Correctness-Cache (SCC) 611 holds the address and mask of stores that executed in the optimized region. Information from this cache is compared against entries in the LSOB 605 of cooperating logical cores, to make sure no conflict is undetected. On a span violation check, the SCC 611 is reset. Each core writes its stores from its LSOB 605 to the other core's SCC 611. Then each core checks it stores (from the LSOB) against the other core's stores that are already in its SCC 611. A violation is detected if a store hits a store from the other. It should be noted that some stores may be duplicated by the thread-generator. These stores must be handled correctly by the SCC 611 to prevent false violations detection. Additionally, the Speculative-Load-Cache (SLC) 603 guards loads from the optimized region against snoop-invalidations from logical cores which do not cooperate under the threaded execution scheme describe, but might concurrently run other threads of the same application or access shared data. In some embodiments, the threaded execution scheme described herein implements an "all-or-nothing" policy and all memory transactions in the optimized region should be seen as if all executed together at a single point in time—the commit time.

While in the DTSE execution mode, the L1 data cache of each core operates as a scratch pad. Stores should not respond to snoops (to prevent any store from being globally visible) and speculative data (non-checked/committed data) should not be written back to the mid-level-cache. On exit from this mode, all speculative data that may have been rolled back should be discarded from the data cache. Note that due to some implementation tradeoffs, it may be required to invalidate all stored or loaded data which has been executed while in the threaded execution mode. In the data cache, the Original Program Data Block, and the Track Data Blocks for all Global Commit Points are all stored in the same place. They are all addressed by the Original Program Address of the block.

It is important to note that the examples described above are easily generalized to include more than two cores cooperating in DTSE execution mode. Also some violations may be worked around by hardware (e.g., some load/store violations) by stalling or syncing the cores execution.

In some embodiments, commit is not done on every span. In this case, violation checks will be done on each span, but commit will be done once every few spans (to reduce registers check-pointing overhead).

In some embodiments, the data cache and its entries are not typical. With the amount of workers supported, the data cache need some help in the form of an address space map. For example, each data cache tag may be extended with a x-bit address space map (such as 5-bit value assuming 4 workers per core, 3 bits if only 2 workers per core, or only 2 bits if only 1 worker per core).

In the 5-bit variant, bit 4 indicates if the Primary Logical Processors can access this cache line. Each Worker Logical Processor has a bit in the field <3:0>. This indicates if the corresponding Worker Logical Processor can access this line (e.g., 0001 means that worker logical processor 1 can access the line while the others cannot). A Worker Logical Processor will get a data cache miss if its bit in the address space map is not set. A Primary Logical Processor will get a data cache miss if the primary bit in the address space map is not set.

The data cache may contain multiple lines at the same address (in multiple ways), provided that every access will hit, at most, 1 of them. This means that for each of the 5 bits in the address space map, there is not than 1 line in the data cache with that bit set at the same address.

On read of the data cache, of the multiple ways with the same tag, the unique way that is accessible by the requesting Logical Processor will be selected, if any. If there is none, it is a data cache miss.

At senior store processing (processing of the oldest store), the senior store may go only to a cache line accessible to the Logical Processor that executed the store. Further, if a worker writes a senior store to the data cache, the target line gets its address space map set to be accessible only to the Logical Processor that did the store. All Primary Logical Processors are considered the same for this purpose.

Additionally, in some embodiments, there is a "Current Bit" that is logically associated with each data cache line. It does not have to be physically close to the data cache or the data cache tags. The Current Bits, for all cache lines accessible by a Worker Logical Processor, are cleared at the time that a Global Commit marker in the Worker Logical processor goes senior. Any successful write to the line sets it "Current." A write back of the line to the Mid Level Cache sets it "Current." On refill from the Mid Level Cache, the line must be set to "Not Current" if it is dirty and Not Current in the Mid Level Cache. Otherwise it is set Current in the data cache. The Current Bit is set this way, on response from the Mid Level Cache, even if there is no data; the MLC is just granting ownership.

The one thing that is not usual is that the Mid Level Cache forms Dirty and Not Current. This is returned to the data cache and sets the state of the Current Bit in the data cache, even if there is no data; the MLC is just granting ownership.

An attempt to write a senior store to a dirty data cache line that has its Current Bit off causes a write back, but not an invalidate, before that store is put in the data cache. Doing the write back of a data cache line sets its Current Bit. And successfully writing the senior store, if appropriate, after the write back it provokes, sets the line "Current."

If a write of a senior store hits a clean data cache line (E state) that has its Cu6ent Bit off, the Mid Level Cache is signaled to, if it is dirty, write its copy of this line back to the Last Level Cache, and get a new physical address for a new Track Data Block. The dirty data in the Mid Level Cache does not go in the same Global Commit Span as the dirty data now going into the data cache. The data cache line gets Current as a result of writing the senior store to it.

In some embodiments, there is a Metadata Buffer (not shown) for each Worker logical processor. Metadata is written to the buffer sequentially. The Metadata buffer should be able to write this to the Mid Level Cache. Track execution results in Track data written to Reserved Memory and Metadata written to Reserved Memory. The rest of the process is, reading back the Metadata from Reserved Memory, checking it, and then merging Track Data from various Tracks, read from Reserved Memory, and making it visible as the new state of the original program address space.

In the Mid Level Cache 217, the Original Program Data Block, and the Track Data Blocks for all Global Commit Points are all stored in the same place. They are all addressed by the Original Program Address of the block.

At the Mid Level Cache there is an extension to the tags that holds the current Real Physical Address of the Mid Level cache line. The Real Physical Address is needed for write backs from the Mid Level Cache to the Last Level Cache. It is not used for most other operations in the Mid Level Cache. In some embodiments, the Real Physical Address is the Track Data block number. It is not more than 16 bits.

In some embodiments, hardware registers associated with the Mid Level Cache hold the base address and limit of the Track Data space for each Worker Logical Processor, as well as the last allocated Track Data Block for each Track. This hardware also keeps the current Global Commit number.

There is a "Current Bit" that is logically associated with each Mid Level Cache line. It does not have to be physically close to the Mid Level Cache or the Mid Level Cache tags.

This bit, for all cache lines, accessible by a Worker Logical Processor, is cleared at the time that a Global Commit marker goes senior in this Worker.

In some embodiments, each Mid Level Cache tag is extended with a 6 bit (assuming we support 4 Workers per Core) Address Space Map. The size of this tag is dependent on the number of workers per core.

The Address Space map supports having multiple lines in the Mid Level Cache with the same address, including the same tag, at the same time. It specifies which Logical Processors can access the line. On read of the Mid Level Cache, of the multiple ways with the same tag, the unique way that is accessible by the requesting Logical Processor will be selected, if any. If there is none, it is a Mid level Cache miss.

In some embodiments, each line in the Mid Level Cache may have a Tentative Committed bit and a Tentative Decommissioned bit.

A commit will consist of flash clearing the valid bit on the Real Physical Address and setting Primary accessible, for all Tentatively Committed cache lines and flash clearing the line valid bit for all Tentatively Decommissioned cache lines.

In some embodiments, there are a number of checker state machines with each DTSE Cluster. Each checker state machine may be working on a thread, so the number of state machines provided determines the number of threads that the cluster can be simultaneously working on. A checker state machine reads Metadata lists from all Tracks working on the same thread and processes them through the Store Correctness Caches and the Load Correctness Caches. It also writes a Copy Back List.

In some embodiments, the Copy Back state machine distributes cache lines from the Copy Back List to Merge state machines with the Mid Level Caches to do the actual merging of store data from different Tracks and place the result in the Original Program Address Space.

In some embodiments, there is exactly one Merge State Machine per Mid Level Cache. This state machine does the actual merging of data from the Track Data storage of several Tracks, when this is necessary.

Once a load is executed it must be provable that no store by any agent in the system, other than the thread that did the load, can hit this load until the load is Globally Committed. There should be assurance from the core retirement of any load or store until its Global commitment, some Mid Level Cache cooperating in the execution of this thread, has had the target original program address line at least in shared state. The line can get passed around between cooperating Mid Level Caches (the Master-Slave method) but continuous possession must be maintained. This means that for any other agent to get ownership of this line, at least one of the cooperating Mid Level Caches would get an invalidating snoop when no other cooperating Mid Level Cache had the line.

Typically, each DTSE Cluster has a Possession Cache. This structure indicates the cache lines for which we can be sure some Mid Level Cache in the cluster will get snoops from the Ring or data caches. Typically, the possession cache is located in the reserved memory, but a portion may be cached with the checker.

Each Worker Logical Processor has a Speculative Access Cache. The Speculative Access Cache represents loads and stores that have been locally retired by the Worker Logical Processor, but not yet Globally committed.

A Global Commit Marker is a store to special address. The data gives a class number and a pointer to the Commit Pointer descriptor.

A Commit Wait is a load to a set of special addresses. It can appear anywhere. Depending on the exact address in the set, it can be a wait for Commitment at the last Global Commit Point, or the last Global Commit Point of a certain class, or perhaps other possible choices. This address for this load can request the last Globally Committed memory state.

DTSE will not respond to a Commit Wait, and therefore keep execution in the requesting Worker stalled until the specified Global Commitment has happened. If the last Globally Committed memory state is requested, DTSE Logic will further invalidate all Track data in the requesting Worker. Then DTSE Logic will return data for the Commit Wait. This will unstall this Worker and allow it to proceed.

If last Globally Committed memory state is requested all stores in this Worker after the Global Commit Point specified in the wait will be lost. So, in general, it is practical to use this option only after the waited for Global Commit Point, but before this Worker does any more stores. Typically the wait would be immediately after the Global Commit Marker for the Global Commit Point that it is waiting for.

There are three uses for a wait: the wait can be used to protect register state from being changed, hence avoiding the necessity of saving some registers; when a load sometimes hits a store in a different Track, this provides the ability for the load to get the correct result; and it can also be used to prevent runaway speculation.

II. Operation

Data memory state is represented by the data itself and metadata. They are stored not only separately, but differently. Both Primary Logical Processor and Worker Logical Processors have metadata. Without the metadata the memory state makes no sense for Worker Logical Processors. The metadata is used only for profiling for Primary Logical Processors.

With respect to data space in reserved memory, in some embodiments, each Track has its own data space in reserved memory, as does each Worker Logical Processor. Primary Logical Processors do not have Track Data spaces.

On entrance to a Flow, all Track Data spaces are unallocated. Cache line size blocks are allocated circularly sequentially as needed, as the Flow is executed. Each allocation is for a specific Global Commit span. The blocks are deallocated in order when the span they were allocated for is Globally committed. There is an allocation pointer and a deallocation pointer for each Worker Logical Processor. These pointers contain block numbers, not addresses. The block number space will be a multiple of the number of physical blocks that exist for this allocation.

In allocation, the block number cannot wrap. When all block numbers have been allocated once, this Track cannot allocate any more Track Data Blocks. If there is a need for more allocations, this will cause a Flow exit.

On the other hand, allocation of physical blocks can wrap multiple times, up to the limit of not wrapping the block number. A line in the Mid Level Cache that has a deallocated block number in its Real Physical Address will not write back to the Last Level Cache. Similarly if there is a miss in the Mid Level Cache and the Real Physical Address for the refill is a deallocated block number, the refill will come from the Original Program Address instead. Such a line cannot have speculative stores in it. If there were speculative stores, it would have been reallocated more recently.

It can be seen that there should be enough physical blocks to allocate for Track Data to cover the amount by which the Tracks can be different in the logical place in the code that they are executing, plus some to cover the time to check and Globally commit. The block number space has to cover the entire execution of the Flow from start to Flow exit.

If there is a state recovery in a Track, the Track Data space for the Worker executing the Track is initialized to empty, with the original starting point for allocation.

Allocation happens in logic associated with the Worker Logical Processor as a Track is executed. The Copy Back state machine associates specific locations in this space with stores later in the Global Commitment process.

The Copy Back State Machine writes a Merge Job Queue, for each Merge State Machine it is using, in memory. This describes the Track Data blocks that the Merge State Machine should access. Since this is through memory, this should be kept as compressed as possible.

Metadata for each Logical Processor is stored separately. In some embodiments, the Metadata for a Logical Processor is a linear array of Program correct addresses, sizes and load/store indicator. It contains Alignment markers and Global Commit Markers and also duplicated store markers. It may also contain branch directions and targets of indirect branches. It may also records of invalidates received at the Mid Level cache.

As the core loads to the original program address of the data, hardware will capture the address and size and add it onto the Metadata list. If a Worker loads from a data Cache line that is Primary accessible and owned, then (if convenient for the design) it makes it shared after forcing a write back to the Mid Level Cache, if it was dirty. If this is not convenient, it can make the line not Primary accessible and not current instead. Either of these actions will insure notification of any future store to this line by Logical Processors that are not cooperating with this Worker.

A senior store from a worker in execution mode does not need ownership in the data cache to write the data cache. The senior store can be written to a line in shared state, but the line must be accessible by the Track. In any event, if a senior store from a Catalina worker is written to a data cache line, that line becomes accessible only by that worker. Whatever that line was before, it has been converted into Track Data. Note that, if the line was dirty, in some embodiments it would have been forced to write back before the senior store is written unless it is already Track Data and current.

Because of this, ownership is not requested for a data cache line when a senior store to that line is processed.

Since this is really a store to Track Data, the Mid Level cache will not need or request ownership of the original program address line. It will have ownership of the Track Data line.

This is important because other Tracks may be storing to this line. The merge engine will need to get ownership of the original program address line to do the commit. Other Mid Level Caches can have the line shared and readable by Tracks (not by primaries), but cannot have it owned. Because of the provisions described here, they do not need it owned and will not request it owned.

This means that while one Mid Level Cache is being used to do merges and is committing, and requires ownership of the original program address line, other Tracks can retain that line in shared state and both read and write to it (as described, writing to it will convert it to Track data).

On data cache miss, the line is requested from the Mid Level Cache, as usual.

As the core stores to the original program address of the data, hardware will capture the address and size and add it onto the Metadata list.

In the data cache, the original program data block, and the Track Data blocks for all Global Commit Points are all located in the same place. They are all addressed by the original program address of the block.

The Current Bits, for all cache lines accessible by this Worker, are cleared at the time that a Global Commit marker goes senior. Any successful write to the line sets it "Current." A write back of the line to the Mid Level Cache sets it "Current." On refill from the Mid Level Cache, the line must be set to Not Current if it is dirty and Not Current in the Mid Level Cache. Otherwise it is set Current in the data cache. The Current Bit is set this way, on response from the Mid Level Cache, even if there is no data.

An attempt of a Worker to write a senior store to a dirty data cache line that has its Current Bit off causes a write back, but not an invalidate, before that store is put in the data cache. A bit is set with this write back telling the Mid Level Cache to allocate a new Track Data block. Doing the write back of a data cache line sets its Current Bit. And successfully writing the senior store, if appropriate, after the write back it provokes, sets the line "Current."

An attempt of a Worker, that has access to this line, to write a senior store to a dirty data cache line that is Primary accessible causes a write back, but not an invalidate, before that store is put in the data cache. A bit is set with this write back telling the Mid Level Cache to allocate a new Track Data block. Doing the write back of a data cache line sets its Current Bit. And successfully writing the senior store, if appropriate, after the write back it provokes, sets the line "Current."

If a Worker, that has access to this line, writes a senior store to a clean data cache line that is Primary accessible, the Mid Level Cache is signaled to write this line back to the last level cache if it is dirty but unconditionally get a new physical address for a new Track Data Block. Successfully writing the senior store sets the line "Current."

If a Worker write of a senior store hits a clean data cache line (E state) that has its Cu6ent Bit off, the Mid Level Cache is signaled to, conditionally, if it is dirty, write its copy of this line back to the Last Level Cache, and get a new physical address for a new Track Data Block. The dirty data in the Mid Level Cache does not go in the same Global Commit Span as the dirty data now going into the data cache. The data cache line gets Current as a result of writing the senior store to it.

If there is a senior store and the line is not in E or M state in the data cache, a read for ownership request is made for the line from the Mid Level Cache, as usual.

The data cache can ask the Mid Level Cache to "Write Back" a line and allocate a new Track Data block. If the line is dirty in the Mid Level Cache, it is written back and a new Track Data block is allocated. Even if the line is clean in the Mid Level Cache, the request may specify unconditionally allocating a new Track Data block. If a new Track Data Block is allocated, it replaces the block that was there. The data is the same.

On all write backs to the Mid Level Cache, the data cache "Current Bit" (before it is set due to this write back) is sent to the Mid Level Cache. There are two reasons for a data cache write back: this could be a conventional eviction in the data cache or a new senior store has hit a dirty data cache line that is not Current. The data cache sends a bit that is asserted if a new senior store has hit a dirty data cache line that is not Current.

The Mid Level Cache will allocate a new Track Data Block.

In some embodiments, there is a cache, the Track Data Directory, in Reserved Memory for each Track. The data in a line is just the Track Data block number and a Global Commit number. This cache is written only when a dirty Track Data block accessible by the Track but not accessible by Primaries is evicted, not in connection with allocating a new Track Data Block.

In some embodiments, there is another structure that mirrors the Track Data Directory called the Track Data Directory Summary. If there is a Mid Level Cache Miss on by a Worker Logical Processor, the bit that covers its place in the Track Data Directory is read from the Track Data Directory Summary. Usually it will be invalid, indicating a miss in the Track Data Directory. In this case, the refill to the Mid Level Cache should come from the Original Program Address of the block. This data may already be in the Mid Level cache as a Primary accessible version. In this case, this version can simply be made accessible to the worker as well. If the Summary shows the possibility of a hit, the Track Data Directory must be accessed to get the most current Track Data block number, if it turns out to actually be a hit. Logic can convert this into the address of the block. The block is then requested via the Ring, as usual for a miss.

Allocating a new Track Data Block is a special form of write back from the Mid Level Cache to the Last Level cache. If the Mid Level Cache wants to write back a line to the Last Level Cache, and this line is not Primary Accessible, but does not have a valid Real Physical Address, then a new Track Data Block is allocated for it, before the write back can proceed. The write back goes to the physical address obtained by allocating the new Track Data Block. The process of allocating a new Track Data Block was treated in earlier sections of this specification.

In each Track, execution will hit a Global Commit Point separately. There is a store to a special address here which serves as the Global Commit Point marker. It gives the new Global Commit number increment. The Global Commit number in its own Track advances. This is kept as part of the DTSE Logic associated with the Mid Level Cache. As noted above, this will cause stores to go to new Data Blocks. And "Current Bits" associated with both the data cache and the Mid Level Cache are cleared.

Stores become Globally observed only at Global Commit Points. Both Loads and Stores are Globally speculative, and hence vulnerable to being hit by an invalidating snoop, until the next Global Commit Point.

The Track sets a Flag indicating that it has completed this Commit Span. A checker state machine is waiting for this flag from all Tracks.

As detailed above, each Worker Logical Processor has a Store Correctness Cache. This cache enforces the rule that a store in one Worker must not hit a store in another Worker in the same Alignment Span, unless they are the same store. It also enforces the rule that a load in one Worker must not collide with a store in another Worker in the same Alignment Span. It enforces that, in the case that the load happens to be processed first and the store processed later. If the store is processed first and the load later, that is caught by the Load Correctness Cache.

As detailed above, each Worker Logical Processor has a Load Correctness Cache. The Load Correctness Cache identifies all Bytes that have been stored to from entering the Flow, to the current tentative Global commitment point. In particular, it tells which Worker is the logically last writer of the Byte.

The Copy Back state machine works on a Copy Back List to merge all the indicated stores into the Original Program Address locations and make them Globally visible. The Copy Back List represents a collection of stores that are not in program order. Hence all stores represented in the Copy Back List must be made Globally visible atomically. The outside world must see all of these stores or none of them.

If there is a Flow exit because of an internal issue such as an Execute Only Branch violation or a store violation or a load violation, state will be restored to the last Global Commit Point before the Flow exit. This will wait for the Copy Back state machine to finish, so it really is logically the LAST Global Commit Point before the violation.

If there is a Flow exit because of certain external issues such as an invalidating snoop hitting a Globally speculative load, there is the possibility that the instruction involved is in a Span that has been released to the Copy Back state machine. Unless it is known that this is not the case, this must cause an immediate exit without globally committing the Copy Back List that the Copy Back state machine is currently working on.

From the point of view of the data cache, the Merge state machine is like another data cache. If the Merge state machine accesses a cache line, this snoops the data cache and will force a write back if the line is dirty in the data cache.

The modified blocks may span multiple Mid Level Caches so we have a little synchronization:

Block all accesses to the original Program Address blocks (accesses to Track data will be read only and are OK). The tentative bits can be used for this.

Figure 7:
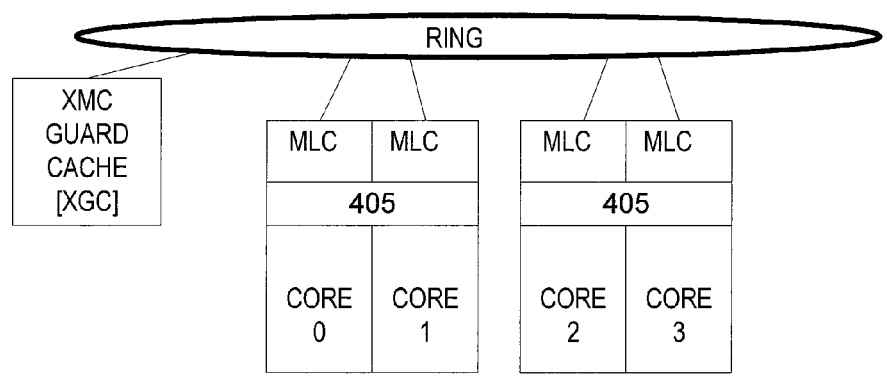
FIG. 7 illustrates the use of XGC according to some embodiments.

While running optimized (threaded) code, the original code might change due to stores generated by the optimized code or by unrelated code running simultaneously (or even by the same code). To guard against that a XMC Guardata cache (XGC) 409 is used. This cache holds the addresses (in page granularity) of all pages that where accessed in order to generate the optimized code and the optimized region ID that will be used in case of a snoop invalidation hit. Region ID denotes all static code lines whose union touches the guarded region (cache line). FIG. 7 illustrates the use of XGC 409 according to some embodiments.

Before executing optimized code, the core guarantees that all entries in the XGC exist and were not snooped or replaced out. In that case, executing optimized code is allowed.

If, during the period where the optimized code is being executed, another logical core changes data in one of the original pages, the XGC will receive a snoop invalidation message (like any other caching agent in the coherency domain) and will notify the one of the cores that it must abort executing the optimized code associated with the given page and invalidate any optimized code entry point it holds which uses that page.

While executing in the threaded execution mode, each store is checked against the XMC 409 to guard against self modifying code. If a store hits a hot-code region, a violation will be triggered.

In some embodiments, the thread generator makes some assumptions, which should later be checked for correctness. This is mainly a performance optimization. An example of such an assumption is a call-return pairing. The thread generator may assume that a return will go back to its call (which is correct the vast majority of the time). Thus, the thread generator may put the whole called function into one thread and allow the following code (after the return) to execute in the other thread. Since the following code will start execution before the return is executed, and the stack is looked up, the execution may be wrong (e.g., when the function writes a return address to the stack, overwriting the original return address). In order to guard against such cases, each thread can write assertions to the assertion hardware block. An assertion is satisfied if both threads agree on the assertion. Assertions much be satisfied in order to commit a span.

III. Software

The dynamic thread switch execution (DTSE) software uses profiling information gathered by the hardware to define important static subsets of the code called "flows." In some embodiments, this software has its own working memory space. The original code in a flow is recreated in this working memory. The code copy in the working memory can be altered by the software. The original code is kept in exactly its original form, in its original place in memory.

DTSE software can decompose the flow, in DTSE Working Memory, into multiple threads capable of executing on multiple logical processors. This will be done if the logical processors are not fully utilized without this action. This is made possible by the five things that the hardware may do.

In any case, DTSE software will insert code into the flows in DTSE working memory to control the processing on the (possibly SMT) hardware processors, of a larger number logical processors.

In some embodiments, the hardware should continue to profile the running code, including the flows that DTSE software has processed. DTSE software responds to the changing behavior to revise its previous processing of the code. Hence the software will systematically, if slowly, improve the code that it processed.

Defining a Flow

When the DTSE hardware has a new IP at the top of its list, the software takes the IP to be the profile root of a new flow. The software will direct hardware to take a profile from this profile root. In an embodiment, the hardware will take the profile beginning the next time that execution hits the profile root IP and extending for roughly 50,000 dynamic instructions after that, in one continuous shot. The buffer in memory gets filled with the addresses of all loads and stores, the directions of direct branches, and the targets of indirect branches. Returns are included. With this, the software can begin at the profile root in static code and trace the profiled path through the static code. The actual target for every branch can be found and the target addresses for all loads and stores are known.

All static instructions hit by this profile path are defined to be in the flow. Every control flow path hit by this profile path is defined to be in the flow. Every control flow path that has not been hit by this profile path is defined to be leaving the flow.

In some embodiments, the DTSE software will direct the hardware to take a profile from the same root again. New instructions or new paths not already in the flow are added to the flow. The software will stop requesting more profiles when it gets a profile that does not add an instruction or path to the flow.

Flow Maintenance

After a flow has been defined, it may be monitored and revised. This includes after new code has been generated for it, possibly in multiple threads. If the flow is revised, typically this means that code, possibly threaded code, should be regenerated.

Aging Ineffective Flows

In some embodiments, an "exponentially aged" average flow length, L, is kept for each flow. In an embodiment, L is initialized to 500,000. When the flow is executed, let the number of instructions executed in the flow be N. Then compute: $L=0.9*(L+N)$. If L ever gets less than a set number (say 100,000) for a flow, then that flow is deleted. That also means that these instructions are eligible to be Hot IP's again unless they are in some other flow.

Merging Flows

In some embodiments, when a flow is executed, if there is a flow exit before a set number of dynamic instructions (e.g., 25,000), its hot code entry point is set to take a profile rather than execute hot code. The next time this hot code entry point is hit a profile will be taken for a number of instructions (e.g., 50,000) from that entry point. This adds to the collection of profiles for this flow.

Any new instructions and new paths are added to the flow. In some embodiments, flow analysis and code generation are done over again with the new profile in the collection.

Topological Analysis

In some embodiments, DTSE software performs topological analysis. This analysis may consists of one or more of the following activities.

Basic Blocks

DTSE software breaks the code of the flow into Basic Blocks. In some embodiments, only joins that have been observed in the profiling are kept as joins. So even if there is a branch in the flow that has an explicit target, and this target is in the flow, this join will be ignored if it was never observed to happen in the profiling.

All control flow paths (edges) that were not observed taken in profiling, are marked as "leaving the flow." This includes fall though (not taken branch) directions for branches that were observed to be always taken.

Branches monotonic in the profile, including unconditional branches do not end the Basic Block unless the target is a join. Calls and Returns end basic blocks.

After doing the above, the DTSE software now has a collection of Basic Blocks and a collection of "edges" between Basic Blocks.

Topological Root

In some embodiments, each profile is used to guide a traversal of the static code of the flow. In this traversal at each call, the call target Basic Block identifier is pushed on a stack and at each return, the stack is popped.

Even though the entire code stream probably has balanced calls and returns, the flow is from a snippet of dynamic execution with more or less random starting and ending points. There is no reason to think that calls and returns are balanced in the flow.

Each Basic Block that is encountered is labeled as being in the procedure identified by the Basic Block identifier on the top of stack, if any.

Code from the profile root, for a ways, will initially not be in any procedure. It is likely that this code will be encountered again, later in the profile, where it will be identified as in a procedure. Most likely there will be some code that is not in any procedure.

The quality of the topological analysis depends on the root used for topological analysis. Typically, to get a good topological analysis, the root should be in the outermost procedure of the static code defined to be in the flow, i.e., in code that is "not in any procedure". The profile root found by hardware may not be. Hence DTSE software defines the topological root which is used by topological analysis.

In some embodiments, of the Basic Blocks that are not in any procedure, a subset of code, R, is identified such that, starting from any instruction in R, but using only the edges of the flow, that is, edges that have been observed to be taken in at least one profile, there is a path to every other instruction in the flow. R could possibly be empty. If R is empty then define that the topological root is the profile root. If R is not empty, then pick the numerically lowest IP value in R as the topological root. From here on, any mention of "root" means the topological root.

Procedure Inlining

Traditional procedure inlining is for the purpose of eliminating call and return overhead. The DTSE software keeps information about the behavior of code. Code in a procedure behaves differently depending on what code calls it. Hence, in some embodiments DTSE software keeps separate tables of information about the code in a procedure for every different static call to this procedure.

The intermediate stages of this code are not executable. When the analysis is done, DTSE software will generate executable code. In this intermediate state, there is no duplication of the code in a procedure for inlining. Procedure inlining assigns multiple names to the code of the procedure and keeping separate information about each name.

In some embodiments this is recursive. If the outer procedure, A, calls procedure, B, from 3 different sites, and procedure B calls procedure C from 4 different sites, then there are 12 different behaviors for procedure C. DTSE software will keep 12 different tables of information about the code in procedure C, corresponding to the 12 different call paths to this code, and 12 different names for this code.

When DTSE software generates the executable code for this flow, it is likely that there will be much less than 12 static copies of this code. Having multiple copies of the same bits of code is not of interest and, in most cases, the call and return overhead is minor. However, in some embodiments the DTSE software keeps separate behavior information for each call path to this code. Examples of behavior information that DTSE keeps are instruction dependencies above all, and load and store targets and branch probabilities.

In some embodiments, DTSE software will assume that, if there is a call instruction statically in the original code, the return from the called procedure will always go to the instruction following the call, unless this is observed to not happen in profiling. However, in some embodiments it is checked that this is correct at execution. The code that DTSE software generates will check this.

In some embodiments, in the final executable code that DTSE generates, for a Call instruction in the original code, there may be an instruction the pushes the architectural return address on the architectural stack for the program. Note that this cannot be done by a call instruction in generated code because the generated code is at a totally different place and would push the wrong value on the stack. This value pushed on the stack is of little use to the hot code. The data space for the program will be always kept correct. If multiple threads are generated, it makes no difference which thread does this. It should be done somewhere, sometime.

In some embodiments, DTSE software may chose to put a physical copy of the part of the procedure that goes in a particular thread physically in line, if the procedure is very small. Otherwise there will not be a physical copy here and there will be a control transfer instruction of some sort, to go to the code. This will be described more under "code generation."

In some embodiments, in the final executable code that DTSE generates, for a return instruction in the original code, there will be an instruction the pops the architectural return address from the architectural stack for the program. The architectural (not hot code) return target IP that DTSE software believed would be the target of this return will be known to the code. In some cases this is an immediate constant in the hot code. In other cases this is stored in DTSE Memory, possibly in a stack structure. This is not part of the data space of the program. The value popped from the stack must be compared to the IP that DTSE software believed would be the target of this return. If these values differ, the flow is exited. If multiple threads are generated, it makes no difference which thread does this. It should be done somewhere, sometime.

In some embodiments, the DTSE software puts a physical copy of the part of the procedure that goes in a particular thread physically in line, if the procedure is very small. Otherwise there will not be a physical copy here and there will be a control transfer instruction of some sort, to go to the hot code return target in this thread. This will be described more under "code generation."

Back Edges

In some embodiments, the DTSE software will find a minimum back edge set for the flow. A minimum back edge set is a set of edges from one Basic Block to another, such that if these edges are cut, then there will be no closed loop paths. The set should be minimal in the sense that if any edge is removed from the set, then there will be a closed loop path. In some embodiments there is a property that if all of the back edges in the set are cut, the code is still fully connected. It is possible to get from the root to every instruction in the entire collection of Basic Blocks.

Each procedure is done separately. Hence call edges and return edges are ignored for this.

Separately, a recursive call analysis may be performed in some embodiments. This is done through the exploration of the nested call tree. Starting from the top, if there is a call to any procedure on a path in the nested call tree that is already on that path, then there is a recursive call. A recursive call is a loop and a Back Edge is defined from that call. So separately, Call edges can be marked "back edges."

In some embodiments, the algorithm starts at the root and traces all paths from Basic Block to Basic Block. The insides of a Basic Block are not material. Additionally, Back Edges that have already been defined are not traversed. If, on any linear path from the root, P, a Basic Block in encountered, S, that is already in P, then this edge ending at S, is defined to be a Back Edge.

Define Branch Reconvergent Points

In some embodiments, there are some branches that are not predicted because they are taken to be monotonic. If this branch goes the wrong way in execution it is a branch miss prediction. Not only that, but it leaves the flow. These branches are considered perfectly monotonic (i.e., not conditional branches at all) for all purposes, in processing the code in a flow.

An indirect branch will have a list of known targets. Essentially, it is a multiple target conditional branch. The DTSE software may code this as a sequential string of compare and branch, or with a bounce table. In either coding, there is one more target: leave the flow. This is essentially a monotonic branch at the end. If this goes the wrong way, we leave the flow. The multi-way branch to known targets has a reconvergent point the same as a direct conditional branch, and found the same way. And, of course, the not predicted, monotonic last resort branch, is handled as not a branch at all.

Call and return are (as mentioned) special and are not "branches." Return is a reconvergent point. Any branch in a procedure P, that does not have a reconvergent point defined some other way, has "return" as its reconvergent point. P may have return coded in many places. For the purpose of being a reconvergent point, all coding instances of return are taken to be the same. For any static instance of the procedure, all coded returns go to exactly the same place which is unique to this static instance of the procedure.

Given all of this, a reconvergent point for all things branches should be able to be found. In some embodiments, only the entry point to a Basic Block can be a reconvergent point.

For a branch B, the reconvergent point R may be found, such that, over all control flow paths from B to R, the total number of Back edge traversals is minimum. Given the set of reconvergent points for branch B that all have the same number of back edges across all paths from B to the reconvergent point, the reconvergent point with the fewest instructions on its complete set of paths from B to the reconvergent point is typically preferred.

In some embodiments, two parameters are kept during the analysis: Back Edge Limit and Branch Limit. Both are initialized to 0. In some embodiments, the process is to go though all branches that do not yet have defined reconvergent points and perform one or more of the following actions. For each such branch, B start at the branch, B, follow all control flow paths forward. If any path leaves the flow, stop pursuing that path. If the number of distinct back edges traversed exceeds Back Edge Limit this path is no longer pursued and back edge that would go over the limit are not traversed. For each path, the set of Basic Blocks on that path is collected. The intersection of all of these sets is found. If this intersection set is empty, then this search is unsuccessful. From the intersection set, pick the member, R, of the set for which the total of all instructions on all paths from B to R is minimum.

Now, how many "visible" back edges there are, total in all paths, from B to R is determined. If that number is more than the Back Edge Limit, then R is rejected. The next possible reconvergent point with a greater number of total instructions is then tested for the total number of visible back edges. Finally, either reconvergent point satisfying Back Edge Limit is found or there are no more possibilities. If one is found, then the total number of branches that don't yet have reconvergent points on all paths from B to R is determined. If that exceeds the Branch Limit, reject R. Eventually an R that satisfies both the Back Edge Limit, and Branch Limit will be found or there are no possibilities. A good R is the reconvergent point for B.

In some embodiments, once a reconvergent point for branch B has been found, for the rest of the algorithm to find reconvergent points, any forward control flow traversal through B will jump directly to its reconvergent point without seeing the details between the branch and its reconvergent point. Any backward control flow traversal through a reconvergent point will jump directly to its matching branch without seeing the details between the branch and its reconvergent point. In essence, the control flow is shrunk from a branch to its reconvergent point down to a single point.

In some embodiments, if a reconvergent point was found, then the Back Edge Limit and the Branch Limit are both to reset, and all the branches that do not yet have reconvergent points are considered. If a reconvergent point was successfully found, then some things were made invisible. Now reconvergent points for branches that were unsuccessful with before may be found, even at lower values of Back Edge Limit and Branch Limit.

In some embodiments, if no reconvergent point was found the next branch B is tried. When all branches that do not yet have reconvergent points have been tried unsuccessfully, then the Branch Limit is incremented and the branches are tried again. In some embodiments, if no potential reconvergent points were rejected because of Branch Limit, then reset the Branch Limit to 0, increment the Back Edge Limit, and try again.

In general, there can be other branches, C, that do not yet have reconvergent points, on control flow paths from branch, B, to its reconvergent point, R, because the Branch Limit set to more than 0. For each such branch, C, C gets the same reconvergent point assigned to it that B has, namely R. The set of branches, B, and all such branches, C, is defined to be a "Branch Group." This is a group of branches that all have the same reconvergent point. In some embodiments, this is taken care of, before the whole thing, from the branches to the reconvergent point is made "invisible." If this is not taken care of as a group, then as soon as one of the branches gets assigned a reconvergent point, all of the paths necessary to find the reconvergent points for the other branches in the group become invisible, not to mention that those other branches, for which there is not yet reconvergent points, become invisible.

In some embodiments, all branches have defined reconvergent points. The "number of back edges in a linear path" means the number of different back edges. If the same back edge occurs multiple times in a linear path, that still counts as only one back edge. If Basic Block, E, is the defined reconvergent point for branch, B, this does not make it ineligible to be the defined reconvergent point for branch, D.

En Mass Unrolling

In some embodiments, en mass unrolling is performed. In en mass unrolling, a limited amount of static duplication of the code is created to allow exposure of a particular form of parallelism.

In these embodiments, the entire flow is duplicated N times for each branch nesting level. A good value for N may be the number of tracks that are desired in the final code, although it is possible that other numbers may have some advantage. This duplication provides the opportunity to have the same code in multiple (possibly all) tracks, working on different iterations of a loop. It does not make different iterations of any loop go into different tracks. Some loops will separate by iterations and some will separate at a fine grain, instruction by instruction within the loop. More commonly, a loop will separate in both fashions on an instruction by instruction basis. What wants to happen, will happen. It just allows for separation by iteration.

As things stand at this point, there is only one static copy of a loop body. If there is only one static copy, it cannot be in multiple tracks without dynamic duplication, which may be counterproductive. To allow this code to be in multiple tracks, to be used on different control flow paths (different iterations), there should be multiple static copies.

Nesting

A branch group with at least one visible back edge in the paths from a branch in the group to the group defined reconvergent point is defined to be a "loop." What is "visible" or not "visible" to a particular branch group was defined in reconvergent point analysis. In addition, any back edge that is not on a path from any visible branch to its reconvergent point is also defined to be a "loop".

A loop defined to be only a back edge, is defined to have the path from the beginning of its back edge, via the back edge, back to the beginning of its back edge as its "path from its branches to their reconvergent point."

Given different loops, A and B, B is nested in A if all branches in B's group are on a path from branches in A to the defined reconvergent point for A. A loop defined as a back edge that is not on a path from a branch to its reconvergent point is defined to not be nested inside any other loop, but other loops can be nested inside it, and usually are.

A loop defined to be only a back edge is associated with this back edge. Other loops are associated with the visible back edges in the paths from branches of the loop to the loop reconvergent point. What is "visible" or not "visible" to a particular branch group was defined in reconvergent point analysis.

One or more of the following theorems and lemmas may be applied to embodiments of nesting.

Theorem 1: If B is nested in A then A is not nested in B.

Suppose B is nested in A. Then there are branches in B, and all branches in B are on paths from A to its reconvergent point. If A does not contain branches, then by definition, A cannot be nested in B. If a branch, X, in A is on a path from a branch in B to its reconvergent point, then either X is part of B, or it is invisible to B. If X is part of B, then all of A is part of B and the loops A and B are not different. So X must be invisible to B. This means that A must have had its reconvergent point defined before B did, so that A's branches were invisible to B. Hence B is not invisible to A. All of the branches in B are on paths from A to its reconvergent point and visible. This makes B part of A, so A and B are not different. X cannot be as assumed.

Lemma 1: If branch B2 is on the path from branch B1 to its reconvergent point, then the entire path from B2 to its reconvergent point is also on the path from B1 to its reconvergent point.

The path from B1 to its reconvergent point, R1, leads to B2. Hence it follows all paths from B2. If B1 has reconverged, then B2 has reconverged. If we have not yet reached the "reconvergent point" specified for B2, then R1 is a better point. The reconvergent point algorithm will find the best point, so it must have found R1.

Theorem 2: If one branch of loop B is on a path from a branch in loop A to its reconvergent point, then B is nested in A.

Let X be a branch in B that is on a path from a branch in A to A's reconvergent point, RA. By Lemma 1, the path from X to its reconvergent point, RB is on the path from A to RA. Loop B is the collection of all branches on the path from X to RB. They are all on the path from A to RA.

Theorem 3: If B is nested in A and C is nested in B, then C is nested in A.

Let X be a branch in C with reconvergent point RC. Then X is on the path from branch Y in B to B's reconvergent point, RB. By Lemma 1, the path from X to RC is on the path from Y to RB. Branch Y in B is on the path from branch Z in A to A's reconvergent point, RA. By Lemma 1, the path from Y to RB is on the path from Z to RA.

Hence the path from X to RC is on the path from Z to RA. So surely X is on the path from Z to RA. This is true for all X in C. So C is nested in A.

Theorem 4: A back edge is "associated with" one and only 1 Loop.

A back edge that is not on a path from a visible branch to its reconvergent point is itself a loop. If the back edge is on a path from a visible branch to its reconvergent point, then the branch group that this branch belongs to has at least one back edge, and is therefore a loop.

Suppose there is back edge, E, associated with loop, L. Let M be a distinct loop. If L or M are loops with no branches, i.e. they are just a single back edge, then the theorem is true. So assume both L and M have branches. Reconvergent points are defined sequentially. If M's reconvergent point was defined first, and E was on the path from M to its reconvergent point, then E would have been hidden. It would not be visible later to L. If L's reconvergent point was defined first, then E would be hidden and not visible later to M.

NON Theorem 5: It is not true that all code that is executed more than once in a flow is in some loop.

An example of code in a flow that is not in any loop, but is executed multiple times, is two basic blocks ending in a branch. One arm of the branch targets the first basic block and the other arm of the branch targets the second basic block. The reconvergent point of the branch is the entry point to the second basic block. Code in the first basic block is in the loop but code in the second basic block is not in the loop, that is, it is not on any path from the loop branch to its reconvergent point.

An "Inverted Back Edge" is a Back Edge associated with a loop branch group such that going forward from this back edge the reconvergent point of the loop branch group is hit before any branch in this loop branch group (and possibly never hit any branch in this loop branch group). A Back Edge is "associated with" a loop branch group if it is visible to that loop branch group and is on a path from a branch in that loop branch group to the reconvergent point of that loop branch group.

Note that in a classical loop with a loop branch that exits the loop, the path though the back edge hits the loop branch first and then its reconvergent point. If the back edge is an Inverted Back Edge, the path through this back edge hits the reconvergent point first and then the loop branch.

Theorem 6: If there is an instruction that is executed more than once in a flow that is not in any loop, then this flow contains an Inverted Back Edge.

Let I be an instruction that gets executed more than once in a flow. Assume I is not in any loop. Assume there is no Inverted Back Edge in the flow.

There must be some path, P, in the flow from 1 back to I. There is at least one back edge, E, in that path.

Suppose that there is a Branch B that is part of a loop associated with E. This means that B is part of a branch group. E is visible to that branch group and E is on the path from a branch in that group to its reconvergent point.

Going forward from E is on P unless there is another branch. If there is another branch, C, then C is on the path from B to the reconvergent point of B, hence C is in this same branch group. C is in P. Hence there is a loop branch of this loop in P. If there is no C, then P is being followed and will get to I. If I is reached before the reconvergent point of B, then I is in the loop, contrary to assumptions. So the reconvergent point of B should be reached before reach I. And that is before reaching any branch. So the path from the back edge hits the reconvergent point before it hits another loop branch.

On the other hand, assume there is loop branch, C, that is in P. If the reconvergent point is not in P, then all of P is in the loop, in particular I. So the reconvergent point is also in P. So C, E, and the reconvergent point, R, are all on path P. The sequence must go E then C then R, because any other sequence would give us an inverted back edge. If there is more than one branch on P, such as a branch, X, that could go anywhere on P. But at least one loop branch must be between E and R. C is that loop branch.

C has another arm. There should be a path from the other arm of C to R. If all paths from C go to R before E, then E is not on any path from C to R. Hence, the whole structure from C to R would not be visible to B and C could not be a loop branch for this loop. Hence some path from C must go through E before R. But this is not possible. This path must join P somewhere before the edge E. Where ever that is, that will be the reconvergent point, R. The conclusion is that the only possible sequence on P, from other points of view, E then C then R, is, in fact, not possible.

In some embodiments, with one or more of the above theorems, loops may be assigned a unique nesting level. Loops that have no other loops nested inside of them get a nesting level 0. The loops containing them are nesting level 1. There is a loop with the highest nesting level. This defines the nesting level for the flow. Notice that loop nesting is within a procedure only. It starts over from 0 in each procedure. This fits in, because of the procedure inlining. The nesting level of the flow is the maximum nesting level across all procedures in the flow.

Since each back edge belongs to one and only one loop, the nesting level of a back edge may be defined to be the nesting level of the loop that it belongs to.

In some embodiments, the DTSE software will duplicate the entire flow, as a unit, $N^U$ times, where U is the loop nesting level of the flow. N is the number of ways that each loop nesting level is unrolled.

In some embodiments, since this is $N^U$ exact copies of the very same code, there is no reason for software to actually duplicate the code. The bits would be exactly the same. The code is conceptually duplicated $N^U$ times.

The static copies of the flow can be named by a number with U digits. In an embodiment, the digits are base N. The lowest order digit is associated with nesting level 0. The next digit is associated with nesting level 1. Each digit corresponds to a nesting level.

In some embodiments, for each digit, D, in the unroll copy name, the DTSE software makes every back edge with nesting level associated with D, in all copies with value 0 for D, go to the same IP in the copy with value 1 for D, but all other digits the same. It makes every back edge with nesting level associated with D, in all copies with value 1 for D, go to the same IP in the copy with value 2 for D, but all other digits the same. And so forth up to copy N−1. software makes every back edge with nesting level associated with D, in all copies with value N−1 for D, go to the same IP in the copy with value 0 for D, but all other digits the same.

The embodiment of this is the current unroll static copy number and an algorithm for how that changes when traversing the flow. This algorithm is, if back edge of level L is traversed in the forward direction, then the Lth digit modulo N is incremented. If a back edge of Level L is traversed in the backward direction, then decrement the Lth digit modulo N. That is what the previous complex paragraph says. In some embodiments, the DTSE software does not have pointers or anything to represent this. It just has this simple current static copy number and counting algorithm.

Hence, in some embodiments, the DTSE software has unrolled all loops by the factor N. It does it en mass, all at once, without really understanding any of the loops or looking at them individually. All it really knew was the nesting level of each back edge, and the maximum of these, the nesting level of the flow.

In these embodiment, since no target IP changed, there was no change to any bit in the code. What did change is that each static instance of the instruction at the same IP can have different dependencies. Each static instance is dependent on different other instructions and different other instructions are dependent on it. For each instruction, defined by its IP, the ability to record its dependencies separately for each of its static instances is desired. When traversing any control path, an unroll copy counter will change state appropriately to always tell what unroll copy of the instructions being looked at right now.

Branch Reconvergent Points

In some embodiments, if, in control flow graph traversal, a branch, B, is hit that is a member of a loop, L, then an identifier of the branch group that B belongs to is pushed on a stack. If, in control flow graph traversal, a branch whose branch group is already on the top of stack is hit then nothing is done. If the reconvergent point is hit for the branch that is on the top of stack (defined before unrolling), X, in control flow graph traversal, then go to version 0 of this unroll nesting level, and pop the stack. This says that version 0 of X will be the actual reconvergent point for the unrolled loop.

In some embodiments, there is an exception. If the last back edge for L that was traversed is an inverted back edge and the reconvergent point for L (defined before unrolling) is hit, X, and L is on the top of stack, the stack is popped, but same unroll version should be maintained rather than going to version 0. In this case version 0 of this unroll nesting level of X, is defined to be the reconvergent point for L.

On exiting a loop, L, always go to version 0 of the nesting level of L (except when L has an inverted back edge).

The above describes embodiments of how to follow the control flow graph forward. As it turns out in some embodiments, there may be more needed to follow the control flow graph backwards than forwards. In some embodiments, that is the same with nested procedures.

Going backwards the reconvergent point for L is hit first. The complication is that this could be the reconvergent point for multiple loops and also for branch groups that are not loops. The question is which structure is being backed into? There can indeed be many paths coming to this point. If backing into a loop it should be at a nesting level 1 below the current point. There could still be many loops at this nesting level, and non loop branch groups. A pick of which path being followed may be made. If a loop, L, is picked that is being backed into, there are N paths to follow into the N unroll copies. In some embodiments, one of those is picked. Now the static copy of the code being backed into is known. What may be looked for is a branch in the corresponding branch group. That information is pushed on the stack.

In some embodiments, if not in unroll copy 0 of the current nesting level, then back into a back edge for this loop. So, when the last opportunity to take a back edge is reached the path is known. Up until then, there are all possibilities. If in unroll copy 0 of the current nesting level, then the additional choice of not taking any back edge, and backing up out of the loop may be made in some embodiments. If the loop is backed out of, pop the stack.

In some embodiments, every time a back edge of this loop is taken decrement the copy number at this nesting level modulo N.

A loop is typically entered at static copy 0 of its nesting level, and it always exits to static copy 0 of its nesting level.

Figure 8:
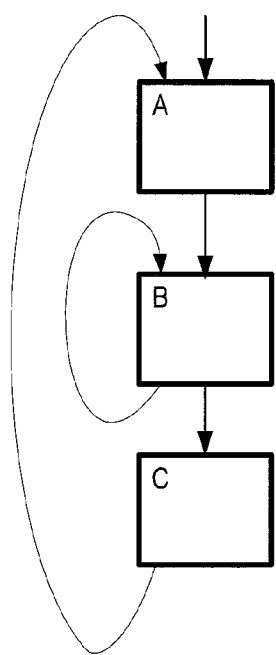
FIGS. 8-11 illustrate examples of some of software operations.
Figure 9:
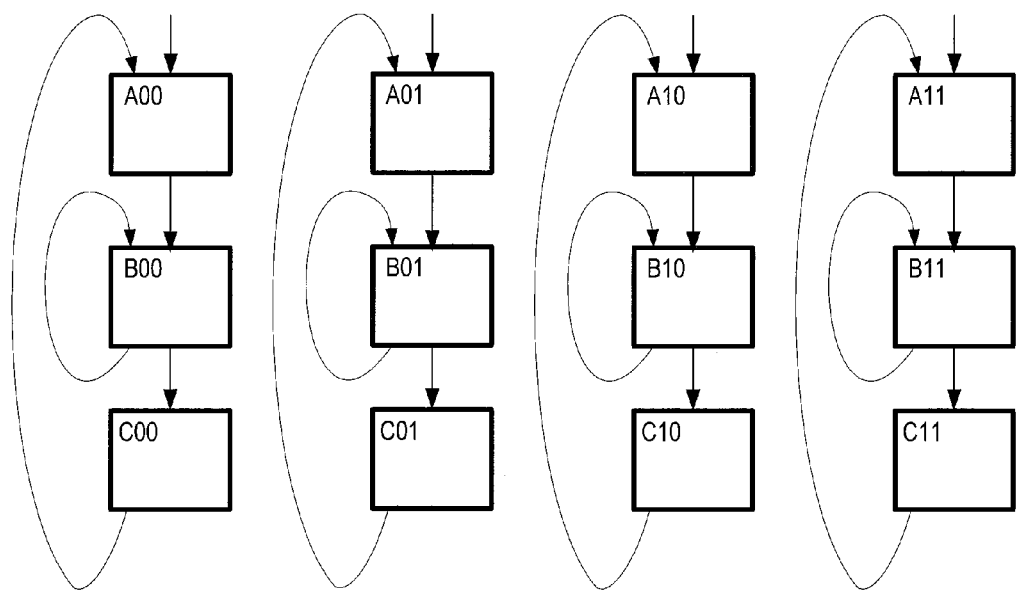
Figure 10:
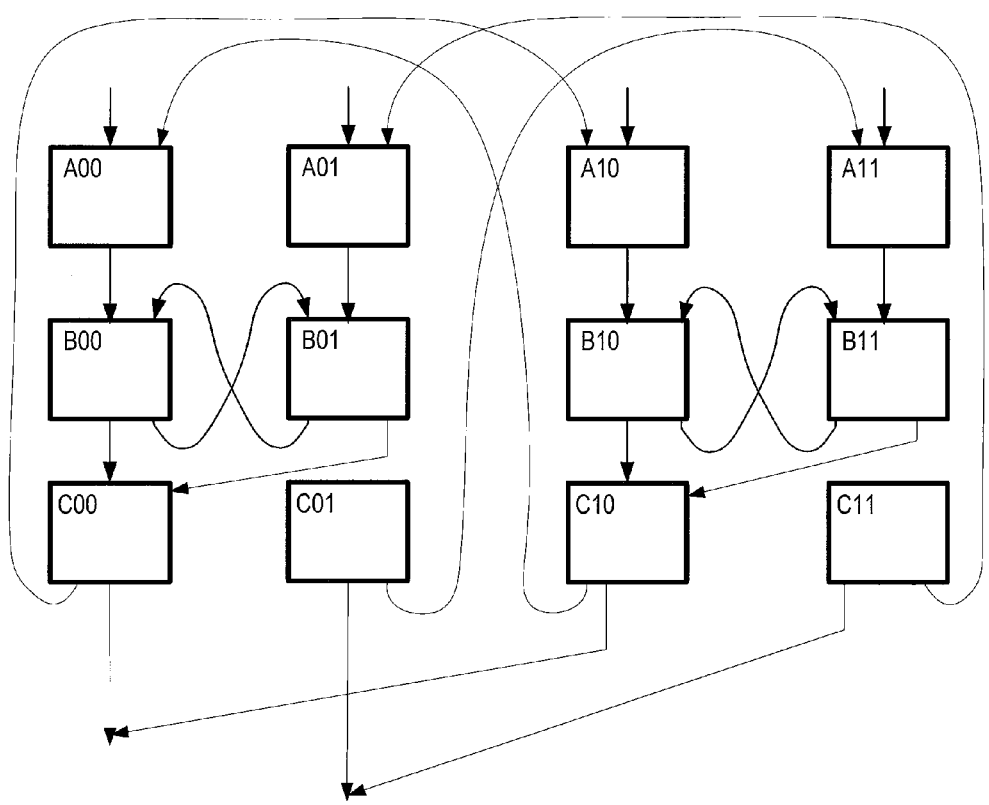
Figure 11:
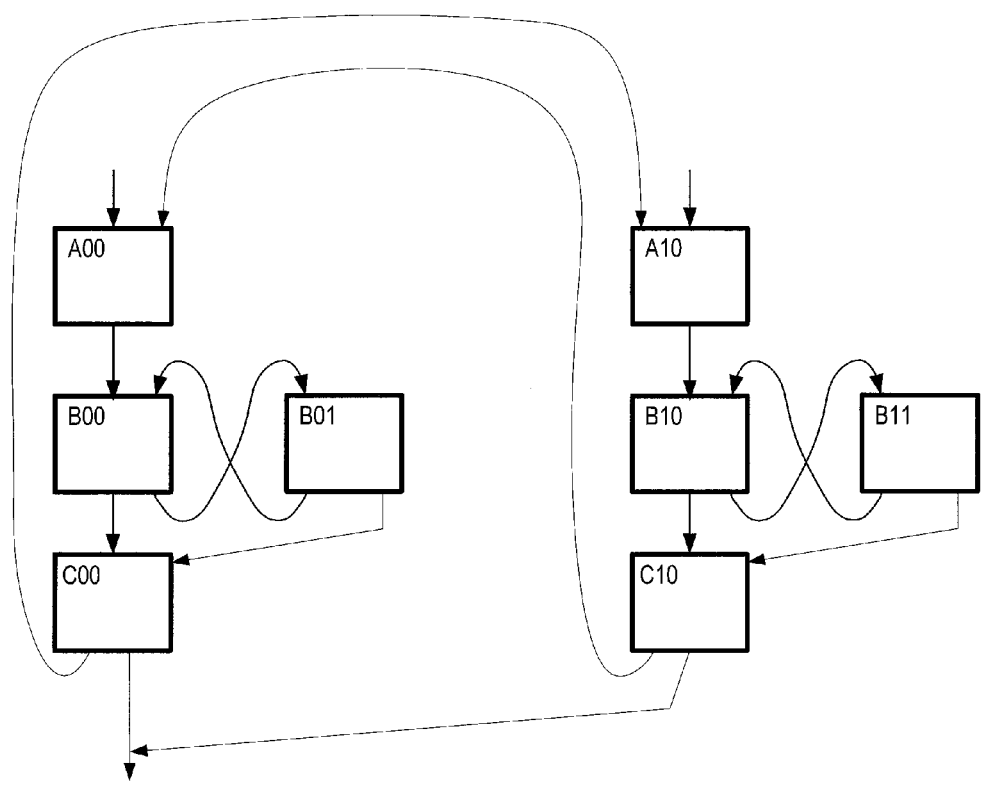

Remember, these are operations inside the software that is analyzing this code; not executing this code. In most embodiments, execution has no such stack. The code will be generated to just all go to the right places. For the software to generate the code to go to all the right places, it has to know itself how to traverse the flow. FIGS. 8-11 illustrate examples of some of these operations. FIG. 8 shows an example with three Basic Blocks with two back edges. This forms two levels of nested simple loops. The entrance to C is the reconvergent point for the branch in B. The target of the exit from C is the reconvergent point for the branch in C. FIG. 9 shows that the entire flow has been duplicated. A part of which is shown here. There are now 4 copies of our nested loops, copy 00, copy 01, copy 10 and copy 11. The entrance to Cx is the reconvergent point for the branch in Bx. The target of the exit from Cx is the reconvergent point for the branch in Cx. These are different for each x. FIG. 10 shows the back edges and edges to the reconvergent points have been modified using one or more of the operations discussed above. The entry to C00 is now the reconvergent point for the loop B00-B01. The entry point to C10 is now the reconvergent point for the loop B10-B11. The outer loop, static copies 00 and 10 both go to the common reconvergent point. There is a common reconvergent point that is the target of C01 and C11 too. This is of less interest since C01 and C11 are dead code. There is no way to reach this code. In fact, the exit from this piece of code is always in static copy 00 coming from C00 or C10. In FIG. 11 the dead code and dead paths have been removed to show more clearly how it works. Notice that there is only one live entry to this code which is in static copy 00 and only one live exit from this code which is in static copy 00. In some embodiments, the DTSE software will not specifically "remove" any code. There is only one copy of the code. There is nothing to remove. The software does understand that Basic Blocks A and C require dependency information under only two names: 00 and 10, not under 4 names. Basic Block B requires dependency information under four names.

A larger number for N increases the amount of work to prepare the code but it may also potentially increase the parallelism with less dynamic duplication. In some embodiments, the DTSE software may increase N to do a better job, or decrease N to produce code with less work. In general, an N that matches the final number of Tracks will give most of the parallelism with a reasonable amount of work. In general, a larger N than this will give a little better result with a lot more work.

Loop unrolling provides the possibility of instruction, I, being executed in one Track for some iterations, while a different static version of the same instruction, I, for a different iteration is simultaneously executed in a different Track. "Instruction" is emphasized here, because Track separation is done on an instruction by instruction basis. Instruction I may be handled this way while instruction, J, right next to I in this loop may be handled completely differently. Instruction J may be executed for all iterations in Track 0, while instruction, K, right next to I and J in this loop may be executed for all iterations in Track 1.

Loop unrolling, allowing instructions from different iterations of the same loop to be executed in different Tracks, is a useful tool. It uncovers significant parallelism in many codes. On the other hand loop unrolling uncovers no parallelism at all in many codes. This is only one of the tools that DTSE may use.

Again, for analysis within DTSE software, there is typically no reason to duplicate any code for unrolling as the bits would be identical. Unrolling produces multiple names for the code. Each name has its own tables for properties. Each name can have different behavior. This may uncover parallelism. Even the executable code that will be generated later, will not have a lot of copies, even though, during analysis, there are many names for this code.

Linear Static Duplication

In some embodiments, the entire flow has already be duplicated a number of times for En Mass Unrolling. On top of that, in some embodiments, the entire flow is duplicated more times, as needed. The copies are named S0, S1, S2, . . . .

Each branch, B, in the flow gets duplicated in each static copy S0, S1, S2, . . . . Each of the copies of B is an instance of the generic branch, B. Similarly, B had a reconvergent point which has now been duplicated in S0, S1, S2, . . . . All of the copies are instances of the generic reconvergent point of the generic branch, B. Duplicated back edges are all marked as back edges.

In some embodiments, no code is duplicated. In those embodiments, everything in the code gets yet another level of multiple names. Every name gets a place to store information.

In some embodiments, all edges in all "S" copies of the flow get their targets changed to the correct generic Basic Block, but not assigned to a specific "S" copy. All back edges get their targets changed to specifically the S0 copy.

In some embodiments, the copies of the flow S0, S1, S2, . . . are gone through one by one in numerical order. For Sk, every edge, E, with origin in flow copy Sk, that is not a back edge, assign the specific copy for its target to be the lowest "S" number copy such that it will not share a target with any other edge.

Finally, there will be no edge, that is not a back edge, that shares a target basic block with any other edge. Back edges will, of course, frequently share a target Basic Block with other, perhaps many other, back edges.

As in the case of en mass unrolling, in some embodiments the target "S" instance of edges that exit the loop are modified by going to the loop reconvergent point, as follows.

In some embodiments, if, in control flow graph traversal, a branch, B, is hit that is a member of a loop, L, an identifier of the branch group that B belongs to is pushed and the current "S" instance number on a stack. In some embodiments, if, in control flow graph traversal, a branch whose branch group is already on the top of stack is hit nothing is done. In some embodiments, if an instance of the generic reconvergent point for the loop that is on the top of stack is hit, in control flow graph traversal, then I pop the stack and actually go to the "S" instance number popped from the stack.

This says that in a loop, each iteration of the loop starts in "S" instance number 0, but on exiting this loop, go to the "S" instance in which this loop was entered.

Notice that the same stack can be used that is used with en mass unrolling. If the same stack is used, a field is added to each stack element for the "S" instance.

Again, these are operations inside the software that is analyzing this code; not executing code. Execution has no such stack. The code will be generated to just all go to the right places. For the software to generate the code to go to all the right places, it has to know itself how to traverse the flow.

There will be a first flow copy Sx, that is unreachable from copy S0. This and all higher numbered copies are not needed. Besides this, each surviving static copy, S1, S2, . . . typically has a lot of dead code that is unreachable from S0. Stuff that is unreachable from here will not generate emitted executable code.

Dependency Analysis

Multiple Result Instructions

It was already discussed that in some embodiments that the original call instruction may have been replaced with a push and original returns may have been replaced with a pop and compare.

In general, multiple result instructions are not desired in the analysis. In some embodiments, these will be split into multiple instructions. In many, but for sure, not all, cases these or similar instructions may be reconstituted at code generation.

Push and pop are obvious examples. Push is a store and a decrement stack pointer. Pop is a load and an increment stack pointer. Frequently it will be desired to separate the stack pointer modification and the memory operation. There are many other instructions that have multiple results that could be separated. In some embodiments, these instructions are separated.

The common reason to separate these is that, very probably, all threads will need to track stack pointer changes, but it should not be necessary to duplicate the computation of data that is pushed in every thread.

Invariant Values

Hardware Support and Mechanism

In some embodiments, the DTSE hardware has a number of "Assert Registers" available to the software. Each "Assert Register" can at least hold two values: an Actual Value, and an Asserted Value, and there is a valid bit with each value. In some embodiments, the Assert Registers are a global resource to all Cores and hardware SMT threads.

In some embodiments, the DTSE software can write either the Actual Value part or the Asserted Value part of any Assert Register any time, from any hardware SMT thread in any core.

In some embodiments, in order to Globally Commit a write to the Asserted Value of a given Assert Register, the Actual Value part of the target Assert Register must be valid and both values must match. If the Actual Value is not valid or the values do not match, then the hardware will cause a dirty flow exit, and state will be restored to the last Globally Committed state.

An assert register provides the ability for code running on one logical processor, A, in one core to use a value that was not actually computed by this logical processor or core. That value must be computed, logically earlier, but not necessarily physically earlier, in some logical processor, B, in some core, and written to the Actual Value part of an Assert register. Code running in A can assume any value and write it to the Asserted Value of the same Assert Register. Code following the write of the asserted Value knows for certain, that the value written to the Asserted Value exactly matches the value written to the Actual value at the logical position of the write to the Asserted Value, no matter where this code happens to get placed.

This is useful when the DTSE software has a high probability, but not a certainty, of knowing a value without doing all the computations of that value, and this value is used for multiple things. It provides the possibility of using this value in multiple logical processors in multiple cores but correctly computing it in only one logical processor in one core. In the event that the DTSE software is correct about the value, there is essentially no cost to the assert operation. If the DTSE software was not correct about the value, then there is no correctness issue, but there may be a large performance cost for the resulting flow exit.

Stack Pointers

The stack pointer and the base pointer are typically frequently used. It is unlikely that much useful code is executed without using the values in the stack pointer and base pointer. Hence, typically, code in every DTSE thread will use most of the values of these registers. It is also typical that the actual value of, for example, the stack pointer, depends on a long dependency chain of changes to the stack pointer. In some embodiments, the DTSE software can break this long dependency chain by inserting a write to the Actual Value part of an assert Register, followed by the write of an assumed value to the Asserted Value of that assert Register. There is then a value that is not directly dependent either on the write of the Actual Value, or anything preceding that.

For Procedure call and return in the original code, DTSE software will normally assume that the value of the stack pointer and the base pointer just after the return is the same as it was just before the call.

Just before the call (original instruction) a dummy instruction may be inserted in some embodiments. This is an instruction that will generate no code, but has tables like an instruction. The dummy is marked as a consumer of Stack Pointer and Base Pointer.

After the return from the procedure, instructions are inserted to copy Stack Pointer and Base pointer to the Actual Value part of 2 Assert Registers. These inserted instructions are marked as consumers of these values.

Just after this, in some embodiments instructions are inserted to copy of the Stack Pointer and Base Pointer to the Asserted Value part of these Assert Registers. These inserted instructions are marked as not consuming these values, but producing these values. These instructions are marked as directly dependent on the dummy.

Similarly, for many loops that are not obviously doing unbalanced stack changes, it is assumed the value of the Stack Pointer and Base Pointer will be the same at the beginning of each iteration. A dummy that is a consumer, in some embodiments, is inserted at initial entrance to the loop. Copies to the Actual Value are inserted and identified as consumers, followed by copies to the Asserted Value, identified as producers. The copies to the asserted value are made directly dependent on the dummy.

Many other uses can be made of this. Notice that to use an assert, it is not necessary that a value be invariant. It is only necessary that a many step evaluation can be replaced by a much shorter evaluation that is probably correct.

Assert compare failures are reported by the hardware. If an assert is observed to fail in some embodiments the DTSE software will remove the offending assert register use and reprocess the code without the failing asserts.

Notice that it is quite possible to generate erroneous code even with this. A thread could wind up with some but not all changes to the stack pointer in a procedure. It can therefore be assuming the wrong value for the stack pointer at the end of the procedure. This is not a correctness problem. The Assert will catch it, but the assert will always or frequently fail. If a thread is not going to have all of the stack pointer changes of the procedure, then we want it to have none of them. This was not directly enforced.

The thread that has the write to the Actual Value, will have all of the changes to the stack pointer. This is not a common problem. In some embodiments, if there are assert failures reported in execution, remove the assert.

In some embodiments, DTSE software can specifically check for some but not all changes to an assumed invariant in a thread. If this problematic situation is detected, then remove the assert. Alternatively the values could be saved at the position of the dummy and reloaded at the position of the writing of the Asserted value.

Control Dependencies

In some embodiments, each profile is used to trace a linear path through the fully duplicated code. The profile defines the generic target of each branch or jump and the available paths in the fully duplicated code define the specific instance that is the target. Hence this trace will be going through specific instances of the instructions. The profile is a linear list but it winds its way through the fully duplicated static code. In general it will hit the same instruction instances many times. Separately for each static instance of each branch, record how many times each of its outgoing edges was taken.

If an edge from an instance of a branch has not been seen to be taken in any profile, then this edge is leaving the flow. This could render some code unreachable. A monotonic instance of a branch is marked as an "Execute Only" branch. Many of these were identified previously. The generic branch could be monotonic. In this case, all instances of this generic branch are "Execute Only" branches. Now, even if the generic branch is not monotonic, certain static instances of this branch could be monotonic. These instances are also "Execute Only" branches.

No other instruction instances are ever dependent on an "Execute Only Branch." Specific branch instances are or are not "Execute Only."

In some embodiments, for each non Execute Only instance of the generic branch, B, trace forward on all paths, stopping at any instance of the generic reconvergent point of B. All instruction instances on this path are marked to have a direct dependence on this instance of B. In some embodiments, this is done for all generic branches, B.

There could be a branch that has "leaving the flow" as an outgoing edge, but have more than one other edge. This is typical for an indirect branch. Profiling has identified some of the possible targets of the indirect branch, but typically it is assumed there are targets that were not identified. If the indirect branch goes to a target not identified in profiling, this is "leaving the flow".

In these cases, DTSE software breaks this into a branch to the known targets and a two way branch that is "Leaving the flow" or not. The "Leaving the flow" or not branch is a typical monotonic "Execute Only" branch.

Direct Dependencies

In some embodiments, the Direct Control Dependencies of each instruction instance have already been recorded.

For each instruction instance, its "register" inputs are identified. This includes all register values needed to execute the instruction. This may include status registers, condition codes, and implicit register values.

In some embodiments, a trace back from each instruction instance on all possible paths to find all possible sources of the required "register" values is made. A source is a specific instruction instance, not a generic instruction. Specific instruction instances get values from specific instruction instances. There can be multiple sources for a single required value to an instruction instance.

A Profile is a linear sequence of branch targets and load addresses and sizes and store addresses and sizes. DTSE software should have at least one profile to do dependency analysis. Several profiles may be available.

In some embodiments, each profile is used to trace a linear path through the fully duplicated code. The profile defines the generic target of each branch or jump and the available paths in the fully duplicated code define the specific instance that is the target. Hence this trace will be going through specific instances of the instructions. The profile is a linear list but it winds its way through the fully duplicated static code. In general it will hit the same instruction instances many times.

A load is frequently loading several bytes from memory. In principle, each byte is a separate dependency problem. In practice, this can, of course, be optimized. In some embodiments, for each byte of each load, look back in reverse order from the load in the profile to find the last previous store to this byte. The same instance of the load instruction and the exact instance of the store exist. In some embodiments, this store instance is recorded as a direct dependency in this load instance. A load instance may directly depend on many store instances, even for the same byte.

Super Chains

Each instruction instance that no other instruction instance is directly dependent on is the "generator of a Super Chain."

A Super Chain is the transitive closure, under dependency, of the set of static instruction instances that contains one Super Chain generator. That is, start the Super Chain as the set containing the Super Chain Generator. In some embodiments, any instruction instance in the Super Chain is dependent on is any instruction instance is added to the set. In some embodiments, this is continued recursively until the Super Chain contains every instruction instance that any instruction instance in the Super Chain depends on.

After all Super Chains have been formed from identified Super Chain generators, there may remain some instruction instances that are not in any Super Chain. In some embodiments, any instruction instance that is not in any Super Chain is picked and designated to be a Super Chain generator and its Super Chain formed. If there still remain instruction instances that are not in any Super Chain, pick any such instruction instance as a Super Chain generator. This is continued until every instruction instance is in at least one Super Chain.

Note that many instruction instances will be in multiple, even many, Super Chains.

In some embodiments, the set of Super Chains is the end product of Dependency Analysis.

Track Formation

Basic Track Separation

In some embodiments, if N Tracks are desired, N Tracks are separated at the same time.

Initial Seed Generation

In some embodiments, the longest Super Chain is found (this is the "backbone").

For each Track, in some embodiments the Super Chain that has the most instructions that are not in the "backbone" and not in any other Tracks is found. This is the initial seed for this Track.

In some embodiments, iteration one or two times around the set of Tracks is made. For each Track, in some embodiments the Super Chain that has the most instructions that are not in any other Tracks is found. This is the next iteration seed for this Track, and replaces the seed that we had before. For this refinement, it may (or may not) be a good idea to allow the "backbone" to become a seed, if it really appears to be the most distinctive choice.

Typically, this is only the beginning of "seeding" the Tracks, not the end of it.

Track Growing

In some embodiments, the Track, T, is picked which estimated to be the shortest dynamically. A Super Chain is then placed in this Track.

In some embodiments, the Super Chains will be reviewed in order by the estimated number of dynamic instructions that are not yet in any Track, from smallest to largest.

In some embodiments, for each Super Chain, if it will cause half or less of the duplication to put it in Track T, compared to putting it in any other Track, then it is so placed, and the beginning of Track Growing is gone back to. Otherwise skip this Super Chain and try the next Super Chain.

If the end of the list of Super Chains without placing one in Track T has been reached, then Track T needs a new seed.

New Seed

In some embodiments, all "grown" Super Chains are removed from all Tracks other than T, leaving all "seeds" in these Tracks. Track T retains its "grown" Super Chains, temporarily.

In some embodiments, from the current pool of unplaced Super Chains, the Super Chain that has the largest number (estimated dynamic) of instructions that are not in any Track other than T is found. This Super Chain is an additional seed in Track T.

Then all "grown" Super Chains are removed from Track T. "Grown" Super Chains have already been removed from all other Tracks. All Tracks now contain only their seeds. There can be multiple, even many, seeds in each Track.

From here track growing may be performed.

Getting good seeds helps with quality Track separation. The longest Super Chain is likely to be one that has the full set of "backbone" instructions that will very likely wind up in all Tracks. It is very likely not defining a distinctive set of instructions. Hence this is not initially chosen to be a seed.

In some embodiments, instead, the Super Chain with as many instructions different from the "backbone" as possible is looked for. This has a better chance of being distinctive. Each successive Track gets a seed that is as different as possible from the "backbone" to also have the best chance of being distinctive, and as different as possible from existing Tracks.

In some embodiments, this is iterated again. If there is something for each of the Tracks, an attempt to make each Track more distinctive is made if possible. The choice of a seed in each Track is reconsidered to be as different as possible from the other Tracks.

From here on, there may be a two prong approach.

"Growing" is intended to be very incremental. It adds just a little bit more to what is already there in the Track and only if it is quite clear that it really belongs in this Track. "Growing" does not make big leaps.

In some embodiments, when obvious, incremental growing comes to a stop, then leap to a new center of activity is made. To do this, the collection of seeds in the Track is added to.

Big leaps are done by adding a seed. Growing fills in what clearly goes with the seeds. Some flows will have very good continuity. Incremental growing from initial seeds may work quite well. Some flows will have phases. Each phase has a seed. Then the Tracks will incrementally fill in very well.

In some embodiments, to find a new seed for Track T, all of the other Tracks except for their seeds are emptied. What is there could have an undesirable bias on the new seed. We want to keep everything we have in Track T, however. This is stuff that is already naturally associated with T. What we want is to find something different to go into T. It will not help us to make something we are going to get anyway be a seed. We need something that we would not have gotten by growing to add as a seed.

When going back to growing, in some embodiments the process is started clean. The growing can take a substantially different course with a difference in the seeds and those seeds may be optimizable.

In some embodiments, growing is performed for a while as just a mechanism for finding what is needed for seeds. In the case where the flow has different phases, seeds in all of the different phases may be needed. But the phases are not known or how many seeds are needed. In an embodiment, this is how this is found out. Since the "trial" growing was just a way to discover what seeds are need it is just thrown way. When there is a full set of needed seeds, then a high quality "grow" is made to fill in what goes in each Track.

Raw Track Code

In some embodiments, for each Track, the fully duplicated flow is the starting point. From here, every instruction instance from the code for this Track, that is not in any Super Chain assigned to this Track is deleted. This is the Raw code for this Track.

Once the Raw code for the Tracks is defined, there is no further use for the Super Chains. Super Chains exist only to determine what instruction instances can be deleted from the code for each Track.

At this point, all Tracks contain all fully duplicated Basic Blocks. In reality, there is only the generic Basic Block and it has many names. For each of its names it has a different subset of its instructions. For each name it has outgoing edges that go to different names of other generic Basic Blocks. Some outgoing edges are back edges. In general, many Basic Blocks, under some, or even all, of its names, will contain no instructions.

Each name for a Basic Block has its own outgoing edges. Even empty Basic Block instances have outgoing edges. The branches and jumps that may or may not be in a certain name of a Basic Block do not correctly support the outgoing edges of that name for that Basic Block. There are instances (names) of Basic Blocks that contain no jump or branch instructions, yet there are out going edges for this instance of this Basic Block. The branches and jumps that are present still have original code target IP's. This is yet to be fixed. The target IPs will have to be changed to support the outgoing edges, but this is not done yet. And for many instances of Basic Blocks, even a control transfer instruction (jump) will have to be inserted at the end to support the outgoing edges.

All of the Tracks have exactly the same control flow structure and exactly the same Basic Block instances, at this point. They are all the same thing, just with different instruction deletions for each Track. However, the deletions for a Track can be large, evacuating all instructions from entire structures. For example all instructions in a loop may have entirely disappeared from a Track.

Span Markers

The span marker instruction is a special instruction, in some embodiments a store to a DTSE register, that also indicates what other Tracks also have this span marker in the same place in the code. This will be filled in later. It will not be known until executable code is generated.

In some embodiments, any back edge, that is not an inverted back edge, that targets unroll copy 0 of its level of the unroll copy number digit gets a Span Marker inserted on the back edge. This is a new Basic Block that contains only the Span Marker. The back edge is changed to actually target this new Basic Block. This new Basic Block has only one, unconditional out going edge that goes to the previous target of the back edge.

In some embodiments, all targets of edges from these Span Markers get Span Markers inserted just before the join. This new Span Marker is not on the path from the Span Marker that is on the back edge. It is on all other paths going into this join. This Span Marker is also a new Basic Block that contains only the Span Marker and has only 1 unconditional out going edge that goes to the join.

In some embodiments, for every branch that has an inverted back edge, the reconvergent point for this branch gets a Span Marker added as the first instruction in the Basic Block.

All Span Markers will match across all of the Tracks because all Tracks have the same Basic Blocks and same edges. In executable code generation, some Span Markers will disappear from some Tracks. It may be necessary to keep track of which Span Markers match across Tracks, so this will be known when some of them disappear.

Executable Code Generation

Executable code that is generated does not have the static copy names or the information tables of the representation used inside the DSTE software. In some embodiments, it is normal X86 instructions to be executed sequentially, in address order, unless a branch or jump to a different address is executed.

This code is a "pool." It does not belong to any particular Track, or anything else. If a part of the code has the correct instruction sequence, any Track can use it anywhere in the Track. There is no need to generate another copy of the same code again, if the required code already exists, in the "pool."

There is, of course, the issue that once execution begins in some code, that code itself determines all future code that will be executed. Suppose there is some code, C, that matches the required instruction sequence for two different uses, U1 and U2, but after completing execution of C, U1 needs to execute instruction sequence X, while U2 needs to execute instruction sequence Y, and X and Y are not the same. This is potentially a problem.

For DTSE code generation, there are at least two solutions to this problem.

In some embodiments, the first solution is that the way the static copies of the code were generated in the DTSE software, makes it frequently (but not always) the case that different uses, such as U1 and U2 that require the same code sequence, such as C, for a while, will, in fact, want the same code sequences forever after this.

In some embodiments, the second solution is that a section of code, such as C, that matches multiple uses, such as U1 and U2, can be made a DTSE subroutine. U1 and U2 use the same code, C, within the subroutine, but U1 and U2 can be different after return from this subroutine. Again, the way the code analysis software created static copies of the code makes it usually obvious and easy to form such subroutines. These subroutines are not known to the original program.

Building Blocks

The code has been structured to naturally fall into hammocks. A hammock is the natural candidate to become a DTSE Subroutine.

DTSE subroutines are not procedures known to the original program. Note that return addresses for DTSE subroutines are not normally put on the architectural stack. Besides it not being correct for the program, all executing cores will share the same architectural stack, yet, in general they are executing different versions of the hammocks and need different return addresses.

It may be desirable to use Call and Return instructions to go to and return from DTSE subroutines because the hardware has special structures to branch predict returns very accurately. In some embodiments, the stack pointer is changed to point to a DTSE private stack before Call and changed back to the program stack pointer before executing code. It is then be changed back to the private stack pointer to return. The private stack pointer value has to be saved in a location that is uniformly addressed but different for each logical processor. For example the general registers are such storage. But they are used for executing the program. DTSE hardware can provide registers that are addressed uniformly but access logical processor specific storage.

As was noted, it is frequently unnecessary to make a subroutine because the uses that will share a code sequence will, in fact, execute the same code from this point forever. A sharable code sequence will not be made a subroutine if its users agree on the code from this point "forever."

If all uses for a version of a hammock go to the same code after the hammock, there is typically no need to return at this point. The common code can be extended for as long as it is the same for all users. The return is needed when the users no longer agree on the code to execute.

A hammock will be made a subroutine only if it is expected to execute long enough to reasonably amortize the cost of the call and return. If that is not true then it is not made a subroutine.

Inlined Procedures

Procedures were "inlined," generating "copies" of them. This was recursive, so with just a few call levels and a few call sites, there can be a large number of "copies." On the other hand, a procedure is a good candidate for a DTSE subroutine. Of the possibly, many "copies" of a procedure, in the most common case, they all turn out to be the same (other than different instruction subsetting for different Tracks). Or, there may turn out to be just a few actually different versions (other than different instruction subsetting for different Tracks). So the procedure becomes one or just a few DTSE subroutines (other than different instruction subsetting for different Tracks).

En Mass Loop Unrolling

In some embodiments, a loop is always entered in unroll copy 0 of this loop. A Loop is defined as having a single exit point, the generic common reconvergent point of the loop branch group in unroll copy 0 of this loop. This makes it a hammock. Hence a loop can always be made a subroutine.

Opportunistic Subroutines

Portions of a branch tree may appear as a hammock that is repeated in the tree. A trivial example of this is that a tree of branches, with Linear Static Duplication effectively decodes to many linear code segments. A number of these linear code segments contain the same code sequences for a while. A linear code sequence can always be a subroutine.

Code Assembly

In some embodiments, for each Track, the Topological Root is the starting point and all reachable code and all reachable edges are traversed from here. Code is generated while traversing. How to go from specific Basic Block instances to specific Basic Block instances was previously explained.

An instance of a Basic Block in a specific Track may have no instructions. Then no code is generated. However, there may be multiple outgoing edges from this Basic Block instance that should be taken care of.

If an instance of a Basic Block in a Track has multiple out going edges, but the branch or indirect jump to select the outgoing edge is deleted from this instance in this Track, then this Track will not contain any instructions between this (deleted) instance of the branch and its reconvergent point. In some embodiments, the traversal should not follow any of the multiple out going edges of this instance of the Basic Block in this Track, but should instead go directly to the reconvergent point of the (deleted) branch or jump at the end of this Basic Block instance in this Track.

If there is a single outgoing edge from a Basic Block instance, then that edge is followed, whether or not there is a branch or jump.

If there is a branch or indirect jump at the end of a Basic Block instance in this Track that selects between multiple out going edges then traversal follow those multiple out going edges.

In some embodiments, when traversal in a Track encounters a Basic Block instance that contains one or more instructions for this Track, then there will be code. Code that already exists in the pool may be used or new code may be added to the pool. In either event, the code to be used is placed at a specific address. Then the last generated code on this path is fixed to go to this address. It may be possible that this code can be placed sequentially after the last preceding code on this path. Then nothing is needed to get here. Otherwise, the last preceding instruction may have been a branch or jump. Then its target IP needs to be fixed up to go to the right place. The last preceding code on this path may not be a branch or jump. In this case an unconditional jump to the correct destination needs to be inserted.

Most Basic Block instances are typically unreachable in a Track.

The generated code does not need to have, and should not have, the large number of blindly generated static copies of the intermediate form. The generated code only has to have the correct sequence of instructions on every reachable path.

On traversing an edge in the intermediate form, it may go from one static copy to another. Static copies are not distinguished in the generated code. The general idea is to just get to the correct instruction sequence as expediently as possible, for example closing the loop back to code that has already been generated for the correct original IP, if there is already code with the correct instruction sequence. Another example is going to code that was generated for a different static copy, but has the correct instruction sequence.

The problem happens when code that is already there is gone to. It could be existing instruction sequence is correct for a while but then it does not match anymore. The code may be going to the same original IP for two different cases, but the code sequences required from that same original IP are different for the two cases.

Linear Static Duplication

In some embodiments, Linear Static Duplication created "copies" of the code to prevent the control flow from physically rejoining at the generic reconvergent point of a non-loop branch, until the next back edge. This is basically until the next iteration of the containing loop, or exit of the containing loop. There tends to be a branch tree that causes many code "copies."

In most, but not all, cases, the code that has been held separate after the generic reconvergent point of a branch does not become different, other than the different subsetting of instructions for different Tracks (a desirable difference). In code generation, this can be put back together (separately for the different instruction subsetting for different Tracks) because at the generic reconvergent point, and from there on, forever, the instruction sequence is the same. The copies have disappeared. If not all of the potentially many copies of the code are the same, they very likely fall into just a few different possibilities, so the many static copies actually result in just a few static copies in the generated code.

Even if the copies, for a branch B, all go away and the generated code completely reconverges to exactly as the original code was (except for instruction subsetting for different Tracks), it is not true that there was no benefit from this static duplication. This code is a conduit for transmitting dependencies. If it is not separated, it creates false dependencies that limit parallelism. It was necessary to separate it. Besides this, the copies of the code after the generic reconvergent point of B sometimes, albeit not usually, turn out different due to Track separation.

En Mass Loop Unrolling

In some embodiments, En Mass Loop Unrolling creates many "copies" of the code for nested loops. For example, if there are 4 levels of nested loops and just 2 way unrolling, there are 16 copies of the innermost loop body. It is highly unlikely that these 16 copies all turn out to be different. Quite the opposite. The unrolling of a loop has well less than a 50% chance of providing any useful benefit. Most of the unrolling, and frequently all of the unrolling for a flow, is unproductive. Unproductive unrolling, most of the unrolling, normally results in all copies, for that loop, turning out to be the same (other than different instruction subsetting for different Tracks). Hence, most, and frequently all, of the unrolling is put back together again at code generation. But sometimes, a few copies are different and is beneficial for parallelism.

If the two copies of a loop body from unrolling are the same, then in code generation, the back edge(s) for that loop will go to the same place, because the required following instruction sequence is the same forever. The unroll copies for this loop have disappeared. If this was an inner loop, this happens the same way, in the many copies of it created by outer loops.

If an outer loop has productive unrolling, it is reasonably likely that an inner loop is not different in the multiple copies of the outer loop, even though there are differences in the copies of the outer loop. Loops naturally tend to form hammocks. Very likely the inner loop will become a subroutine. There will be only one copy of it (other than different instruction subsetting for different Tracks). It will be called from the surviving multiple copies of an outer loop.

Inlined Procedures

In some embodiments, procedures were "inlined," generating "copies" of them. This was recursive, so with just a few call levels and a few call sites, there can be a large number of "copies". On the other hand, a procedure is the ideal candidate for a DTSE subroutine. Of the possibly many "copies" of a procedure, in the most common case, they all turn out to be the same (other than different instruction subsetting for different Tracks). Or, there may turn out to be just a few actually different versions (other than different instruction subsetting for different Tracks). So the procedure becomes one or just a few DTSE subroutines (other than different instruction subsetting for different Tracks).

Procedures, if they were not "inlined," could create false dependencies. Hence, even if the procedure becomes reconstituted as just one DTSE subroutine (per Track), it was still desired that it was completely "copied" for dependency analysis. Besides this, the "copies" of the procedure sometimes, albeit not usually, turn out different due to Track separation.

Duplicated Stores

The very same instruction can finally appear in multiple tracks where it will be executed redundantly. This happens because this instruction was not deleted from multiple Tracks. Since this can happen with any instruction, there can be stores that appear in multiple Tracks where they will be executed redundantly.

In some embodiments, the DTSE software marks cases of the same store being redundantly in multiple Tracks. The store could get a special prefix or could be preceded by a duplicated store marker instruction. In some embodiments, a duplicated store marker instruction would be a store to a DTSE register. The duplicated store mark, whichever form it takes, must indicate what other Tracks will redundantly execute this same store.

Align Markers

In some embodiments, if the DTSE hardware detects stores from more than one Track to the same Byte in the same alignment span, it will declare a violation and cause a state recovery to the last Globally committed state and a flow exit. Of course, marked duplicated stores are excepted. The DTSE hardware will match redundantly executed marked duplicated stores and they will be committed as a single store.

Span markers are alignment span separators. Marked duplicated stores are alignment span separators. Align markers are alignment span separators.

In some embodiments, an alignment marker is a special instruction. It is a store to a DTSE register and indicates what other Tracks have the same alignment marker.

If there are stores to the same Byte in multiple Tracks, the hardware can properly place these stores in program order, provided that the colliding stores are in different alignment spans.

The DTSE hardware knows the program order of memory accesses from the same Track. Hardware knows the program order of memory accesses in different Tracks only if they are in different alignment spans. In some embodiments, if the hardware finds the possibility of a load needing data from a store that was not executed in the same Track then it will declare a violation and cause a state recovery to the last Globally committed state and a flow exit.

In some embodiments, the DTSE software will place some form of alignment marker between stores that occur in multiple Tracks that have been seen to hit the same byte. The DTSE software will place that alignment marker so that any loads seen to hit the same address as stores will be properly ordered to the hardware.

State Saving and Recovery

In some embodiments, a Global Commit point is established at each Span Marker. The Span Marker, itself, sends an identifier to the hardware. In some embodiments, the DTSE software builds a table. If it is necessary to recover state to the last Globally Committed point, the software will get the identifier from hardware and look up this Global Commit point in the table. The DTSE software will put the original code IP of this Global commit point in the table along with other state at this code position which does not change frequently and can be known at code preparation time, for example the ring that the code runs in. Other information may be registers that could possibly have changed from the last Globally committed point. There is probably a pointer here to software code to recover the state, since this code may be customized for different Global commit points.

In some embodiments, code is added to each span marker to save whatever data needs to be saved so that state can be recovered, if necessary. This probably includes at least some register values.

In some embodiments, code, possibly customized to the Global Commit point, is added to recover state. A pointer to the code is paced in the table.

Global commit points are encountered relatively frequently, but state recovery is far less frequent. It is advantageous to minimize the work at a Global commit point at the cost of even greatly increasing the work when an actual state recovery must be performed.

Thus, for some embodiments of dependency analysis and Track separation, the code is all spread out to many "copies." At executable code generation, it is mostly put back together again.

Logical Processor Management

DTSE may be implemented with a set of cores that have multiple Simultaneous Multiple Threading hardware threads, for example, two Simultaneous Multiple Threading hardware threads per core. The DTSE system can create more Logical Processors so that each core appears to have, for example, four Logical Processors rather than just two. In addition, the DTSE system can efficiently manage the core resources for implementing the Logical Processors. Finally, if DTSE has decomposed some code streams into multiple threads, these threads can run on the Logical Processors.

To implement, for example, four Logical Processors on a core that has, for example, two Simultaneous Multiple Threading hardware threads, in some embodiments the DTSE system will hold the processor state for the, for example, two Logical Processors that cannot have their state in the core hardware. The DTSE system will switch the state in each Simultaneous Multiple Threading hardware thread from time to time.

DTSE will generate code for each software thread. DTSE may have done thread decomposition to create several threads from a single original code stream, or DTSE may create just a single thread from a single original code stream, on a case by case basis. Code is generated the same way for a single original code stream, either way. At Track separation, the code may be separated into more than one thread, or Track separation may just put all code into the same single Track.

Before generating executable code, additional work can be done on the code, including addition of instructions, to implement Logical Processor Management.

In some embodiments, DTSE hardware will provide at least one storage location that is uniformly addressed, but which, in fact, will access different storage for each Simultaneous Multiple Threading hardware thread that executes an access. In an embodiment, this is a processor general register such as RAX. This is accessed by all code running on any Simultaneous Multiple Threading hardware thread, on any core, as "RAX" but the storage location, and hence the data, is different for every Simultaneous Multiple Threading hardware thread that executes an access to "RAX". In some embodiments, the processor general registers are used for running program code so DTSE needs some other Simultaneous Multiple Threading hardware thread specific storage that DTSE hardware will provide. This could be, for example, one or a few registers per Simultaneous Multiple Threading hardware thread in the DTSE logic module.

In particular in some embodiments, a Simultaneous Multiple Threading hardware thread specific storage register, ME, will contain a pointer to the state save table for the Logical Processor currently running on this Simultaneous Multiple Threading hardware thread. The table at this location will contain certain other information, such as a pointer to the save area of the next Logical processor to run and a pointer to the previous Logical processor that ran on this Simultaneous Multiple Threading hardware thread save table.

All of the code that DTSE generates, for all threads, for all original code streams is in the same address space. Hence any generated code for any original code stream, can jump to any generated code for any original code stream. DTSE specific data is also all in the same address space. The program data space is, in general, in different address spaces for each original code stream.

Efficient Thread Switching

In some embodiments, DTSE will insert HT switch entry points and exit points in each thread that it generates code for. Thus, use of such entry points was discussed in the hardware section.

HT Switch Entry Point

In some embodiments, code at the HT switch entry point will read from ME, a pointer to its own save table and then the pointer to the next Logical Processor save table. From this table it can get the IP of the next HT switch entry point to go to following the entry point being processed. Code may use a special instruction that will push this address onto the return prediction stack in the branch predictor. Optionally, a prefetch may be issued at this address and possibly at additional addresses. This is all a setup for the next HT switch that will be done after this current HT switch entry point. The return predictor needs to be set up now so the next HT switch will be correctly predicted. If there may be I Cache misses after the next HT switch, prefetches should be issued at this point, to have that I stream in the I Cache at the next HT thread switch. The code will then read its required state at this point from its own save table, and resume executing the code after this HT switch entry point. This can include loading CR3, EPT, and segment registers when this is required. It is advantageous to have the Logical Processors that share the same Simultaneous Multiple Threading hardware thread have the same address space, for example, because they are all running threads from the same process, so that it is not necessary to reload these registers on an HT switch although this is not necessary.

HT Switch Exit Point

In some embodiments, code at the HT switch exit point will read from ME, a pointer to its own save table. It will store the required state for resuming to its own save table. It will then read from its own save table, a pointer to the save table of the next Logical Processor to run and writes it to ME. It reads the IP of the next HT switch entry point to go to, and pushes this on the stack. It does a Return instruction to perform a fully predicted jump to the required HT switch entry point.

Notice that code at the HT switch exit point has control over the IP at which it will resume when it again gets a Simultaneous Multiple Threading hardware thread to run on. It can put anything it wants in the IP in its own save table.

Efficient Unpredictable Indirect Branch

An unpredictable indirect branch can be done efficiently by DTSE by changing the indirect branch to just compute the branch target in some embodiments. It is followed with an HT switch exit point, but the computed branch target to the save table is stored.

When this thread is switched back in, it will naturally go to the correct target of the indirect branch. This can be done with no branch miss-prediction and no I cache miss for either the indirect branch or for the HT switches.

Switching Resources to a Logical Processor

In some embodiments, there is a special instruction or prefix, Stop Fetch until Branch Report. This instruction can be inserted immediately before a branch or indirect jump.

When Stop Fetch until Branch Report is decoded, instruction fetch for this I stream stops and no instruction after the next following instruction for this I stream will be decoded, provided that the other Simultaneous Multiple Threading hardware thread is making progress. If the other Simultaneous Multiple Threading hardware thread is not making progress, then this instruction is ignored. The following instruction should be a branch or indirect jump. It is tagged. Branches and jumps report at execution that they were correctly predicted or miss-predicted. When the tagged branch reports, instruction fetching and decode for this I stream is resumed. When any branch in this Simultaneous Multiple Threading hardware thread reports a miss-prediction, instruction fetching and decode is resumed.

In some embodiments, there is a special instruction or prefix, Stop Fetch until Load Report. This instruction can be inserted some time after a load. It has an operand which will be made to be the result of the load. The Stop Fetch until Load Report instruction actually executes. It will report when it executes without being cancelled. There are two forms of the Stop Fetch until Load Report instruction, conditional and unconditional.

The unconditional Stop Fetch until Load Report instruction will stop instruction fetching and decoding when it is decoded. The conditional Stop Fetch until Load Report instruction will stop instruction fetching and decoding on this I stream when it is decoded only if the other Simultaneous Multiple Threading hardware thread is making progress. Both forms of the instruction resume instruction fetching and decode on this I stream when the instruction reports uncancelled execution, and there are no outstanding data cache misses for this I stream.

Code Analysis

Flash Profiling will indicate for each individual branch or jump execution instance, if this execution instance was miss-predicted or correctly predicted. It will indicate instruction execution instances that got I Cache misses, second level cache misses, and misses to DRAM. It will indicate for each load execution instance, if this execution instance got a data cache miss, second level cache miss, or miss to DRAM.

All of the forms of static duplication that DTSE software does may also be used for Logical Processor Management as well. In some embodiments, all static instances of loads, branches and indirect jumps get miss numbers. Static instances of instructions get fetch cache miss numbers in those embodiments.

Different static instances of the same instruction (by original IP) very frequently have very different miss behaviors, hence it is generally better to use static instances of instructions. The more instances of an instruction, the better the chance that the miss rate numbers for each instance will be either high or low. A middle miss rate number is more difficult to deal with.

In spite of best efforts and although there is much improvement compared to just using IP, it is likely that there will still be a lot of instruction instances with mid range miss numbers. Grouping is a way to handle mid range miss numbers in some embodiments. A small tree of branches which each have a mid range miss-prediction rate can present a large probability of some miss-prediction somewhere on an execution path through the tree. Similarly, a sequential string of several loads, each with a mid range cache miss rate can present a large probability of a miss on at least one of the loads.

Loop unrolling is a grouping mechanism. An individual load in an iteration of the loop may have a mid range cache miss rate. If a number of executions of that load over a number of loop iterations is taken as a group, it can present a high probability of a cache miss in at least one of those iterations. Multiple loads within an iteration are naturally grouped together with grouping multiple iterations.

In some embodiments, the DTSE software creates groups so that each group has a relatively high probability of some kind of miss. The groups can sometimes be compacted. This is especially true of branch trees. Later branches in a branch tree can be moved up by statically duplicating instructions that used to be before a branch but is now after that branch. This packs the branches in the tree closer together.

If a group is only very likely to get a branch miss-prediction, it is generally not worth an HT switch. In some embodiments, Stop Fetch until Branch Report is inserted on the paths out of the group right before the last group branch on that path. The branches in the group on the path of execution will be decoded and then decoding will stop, as long as the other Simultaneous Multiple Threading hardware thread is making progress. This gives the core resources to the other Simultaneous Multiple Threading hardware thread. If there is no miss-prediction in the group, fetching and decoding will begin again when the last group branch on the execution path reports. Otherwise, as soon as a branch reports miss-prediction, fetching will resume at the corrected target address. This is not quite perfect because the branches may not report in order.

However, an HT switch is used for an indirect branch that has a high probability of miss-prediction, as was described.

Similarly, if a group is only very likely to get a data cache miss, it is generally preferred to not do an HT switch. If possible, the loads in the group will be moved so that all of the loads are before the first consumer of any of the loads in some embodiments. The conditional Stop Fetch until Load Report instruction is made dependent on the last load in the group and is placed after the loads but before any consumers in some embodiments.

An unconditional Stop Fetch until Load Report instruction can be used if a data cachedata cache miss is almost a certainty, but it is only a data cache miss.

Frequently loads in the group are generally not to be put before any consumers. For example, if the group is unrolled iterations of a loop, this does not work. In this case, it is desirable to make the group big enough that at least one and preferably several data cache misses are almost inevitable. This can generally be achieved if the group is unrolled iterations of a loop. A set of prefetches is generated to cover the loads in the group in some embodiments. The prefetches are placed first, then an HT switch, and then the code.

A group with a high probability of a second level cache miss, D stream or I stream justifies and HT switch. The prefetches are placed first, then the HT switch, and then the code.

Even around a 30% chance of a miss to DRAM can justify an HT switch. In those instances, in some embodiments a prefetch is done first, then HT switch. It is still preferable to group more to get the probability of miss higher and better yet if several misses can be covered.

In some embodiments, the work on the other Simultaneous Multiple Threading hardware thread is "covering" while an HT switch is happening. The object is to always have one Simultaneous Multiple Threading hardware thread doing real work.

If one Simultaneous Multiple Threading hardware thread is doing real work while the other is in Stop Fetch there is risk of a problem at any time in the working Simultaneous Multiple Threading hardware thread. So in generally it there is not reliance on only a single working Simultaneous Multiple Threading hardware thread for very long. Additionally, long Stop Fetches are not typically desired. If it is going to be long, an HT switch is made in some embodiments so the working Simultaneous Multiple Threading hardware thread is backed up by another, for when it encounters an impediment.

Exemplary Computer Systems and Processors

Figure 12:
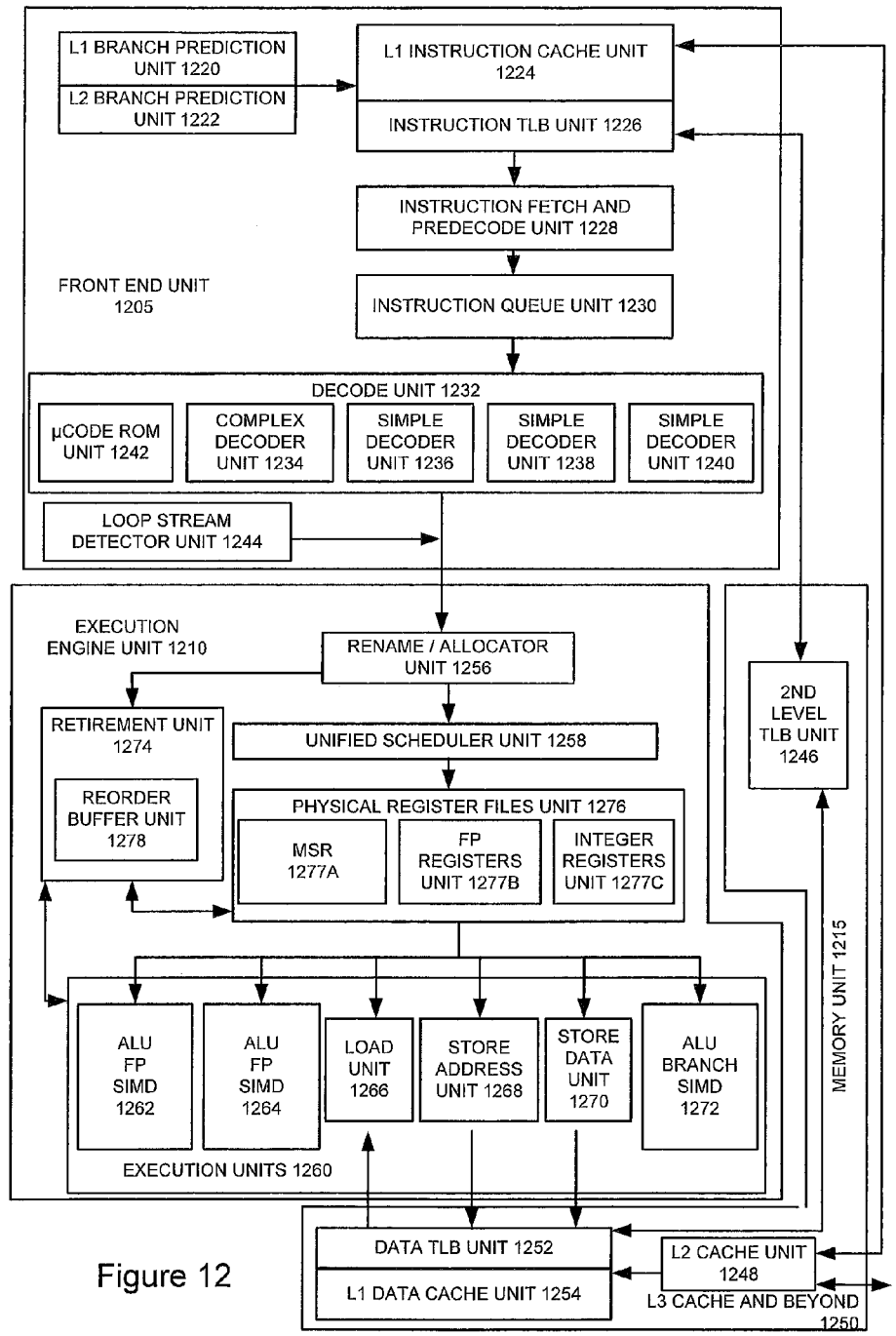
FIG. 12 is a block diagram illustrating an exemplary out-of-order architecture of a core according to embodiments of the invention.

FIG. 12 is a block diagram illustrating an exemplary out-of-order architecture of a core according to embodiments of the invention. However, the instructions described above may be implemented in an in-order architecture too. In FIG. 12, arrows denote a coupling between two or more units and the direction of the arrow indicates a direction of data flow between those units. Components of this architecture may be used to process the instructions detailed above including the fetching, decoding, and execution of these instructions.

FIG. 12 includes a front end unit 1205 coupled to an execution engine unit 1210 and a memory unit 1215; the execution engine unit 1210 is further coupled to the memory unit 1215.

The front end unit 1205 includes a level 1 (L1) branch prediction unit 1220 coupled to a level 2 (L2) branch prediction unit 1222. These units allow a core to fetch and execute instructions without waiting for a branch to be resolved. The L1 and L2 brand prediction units 1220 and 1222 are coupled to an L1 instruction cache unit 1224. L1 instruction cache unit 1224 holds instructions or one or more threads to be potentially be executed by the execution engine unite 1210.

The L1 instruction cache unit 1224 is coupled to an instruction translation lookaside buffer (ITLB) 1226. The ITLB 1226 is coupled to an instruction fetch and predecode unit 1228 which splits the bytestream into discrete instructions.

The instruction fetch and predecode unit 1228 is coupled to an instruction queue unit 1230 to store these instructions. A decode unit 1232 decodes the queued instructions including the instructions described above. In some embodiments, the decode unit 1232 comprises a complex decoder unit 1234 and three simple decoder units 1236, 1238, and 1240. A simple decoder can handle most, if not all, x86 instruction which decodes into a single uop. The complex decoder can decode instructions which map to multiple uops. The decode unit 1232 may also include a micro-code ROM unit 1242.

The L1 instruction cache unit 1224 is further coupled to an L2 cache unit 1248 in the memory unit 1215. The instruction TLB unit 1226 is further coupled to a second level TLB unit 1246 in the memory unit 1215. The decode unit 1232, the micro-code ROM unit 1242, and a loop stream detector (LSD) unit 1244 are each coupled to a rename/allocator unit 1256 in the execution engine unit 1210. The LSD unit 1244 detects when a loop in software is executed, stop predicting branches (and potentially incorrectly predicting the last branch of the loop), and stream instructions out of it. In some embodiments, the LSD 1244 caches micro-ops.

The execution engine unit 1210 includes the rename/allocator unit 1256 that is coupled to a retirement unit 1274 and a unified scheduler unit 1258. The rename/allocator unit 1256 determines the resources required prior to any register renaming and assigns available resources for execution. This unit also renames logical registers to the physical registers of the physical register file.

The retirement unit 1274 is further coupled to execution units 1260 and includes a reorder buffer unit 1278. This unit retires instructions after their completion.

The unified scheduler unit 1258 is further coupled to a physical register files unit 1276 which is coupled to the execution units 1260. This scheduler is shared between different threads that are running on the processor.

The physical register files unit 1276 comprises a MSR unit 1277A, a floating point registers unit 1277B, and an integers registers unit 1277C and may include additional register files not shown (e.g., the scalar floating point stack register file 545 aliased on the MMX packed integer flat register file 550).

The execution units 1260 include three mixed scalar and SIMD execution units 1262, 1264, and 1272; a load unit 1266; a store address unit 1268; a store data unit 1270. The load unit 1266, the store address unit 1268, and the store data unit 1270 perform load/store and memory operations and are each coupled further to a data TLB unit 1252 in the memory unit 1215.

The memory unit 1215 includes the second level TLB unit 1246 which is coupled to the data TLB unit 1252. The data TLB unit 1252 is coupled to an L1 data cache unit 1254. The L1 data cache unit 1254 is further coupled to an L2 cache unit 1248. In some embodiments, the L2 cache unit 1248 is further coupled to L3 and higher cache units 1250 inside and/or outside of the memory unit 1215.

The following are exemplary systems suitable for executing the instruction(s) detailed herein. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 13:
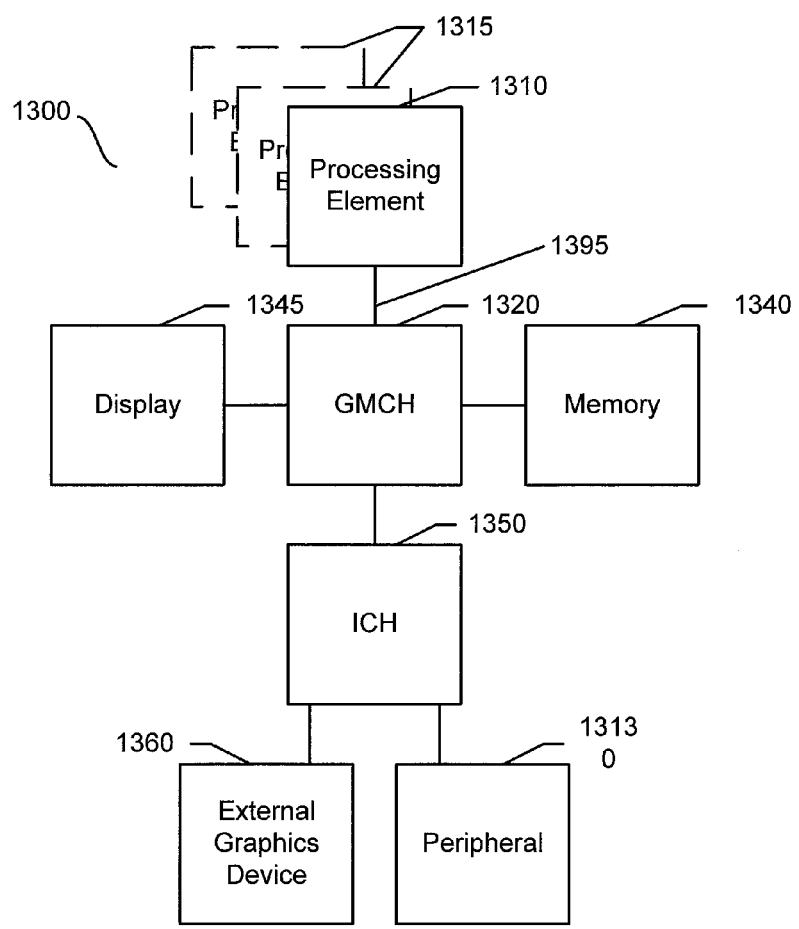
FIG. 13 shows a block diagram of a system in accordance with one embodiment of the present invention.

Referring now to FIG. 13, shown is a block diagram of a system 1300 in accordance with one embodiment of the present invention. The system 1300 may include one or more processing elements 1310, 1315, which are coupled to graphics memory controller hub (GMCH) 1320. The optional nature of additional processing elements 1315 is denoted in FIG. 13 with broken lines.

Each processing element may be a single core or may, alternatively, include multiple cores. The processing elements may, optionally, include other on-die elements besides processing cores, such as integrated memory controller and/or integrated I/O control logic. Also, for at least one embodiment, the core(s) of the processing elements may be multi-threaded in that they may include more than one hardware thread context per core.

FIG. 13 illustrates that the GMCH 1320 may be coupled to a memory 1340 that may be, for example, a dynamic random access memory (DRAM). The DRAM may, for at least one embodiment, be associated with a non-volatile cache.

The GMCH 1320 may be a chipset, or a portion of a chipset. The GMCH 1320 may communicate with the processor(s) 1310, 1315 and control interaction between the processor(s) 1310, 1315 and memory 1340. The GMCH 1320 may also act as an accelerated bus interface between the processor(s) 1310, 1315 and other elements of the system 1300. For at least one embodiment, the GMCH 1320 communicates with the processor(s) 1310, 1315 via a multi-drop bus, such as a frontside bus (FSB) 1395.

Furthermore, GMCH 1320 is coupled to a display 1345 (such as a flat panel display). GMCH 1320 may include an integrated graphics accelerator. GMCH 1320 is further coupled to an input/output (I/O) controller hub (ICH) 1350, which may be used to couple various peripheral devices to system 1300. Shown for example in the embodiment of FIG. 13 is an external graphics device 1360, which may be a discrete graphics device coupled to ICH 1350, along with another peripheral device 1370.

Alternatively, additional or different processing elements may also be present in the system 1300. For example, additional processing element(s) 1315 may include additional processors(s) that are the same as processor 1310, additional processor(s) that are heterogeneous or asymmetric to processor 1310, accelerators (such as, e.g., graphics accelerators or digital signal processing (DSP) units), field programmable gate arrays, or any other processing element. There can be a variety of differences between the physical resources 1310, 1315 in terms of a spectrum of metrics of merit including architectural, microarchitectural, thermal, power consumption characteristics, and the like. These differences may effectively manifest themselves as asymmetry and heterogeneity amongst the processing elements 1310, 1315. For at least one embodiment, the various processing elements 1310, 1315 may reside in the same die package.

Figure 14:
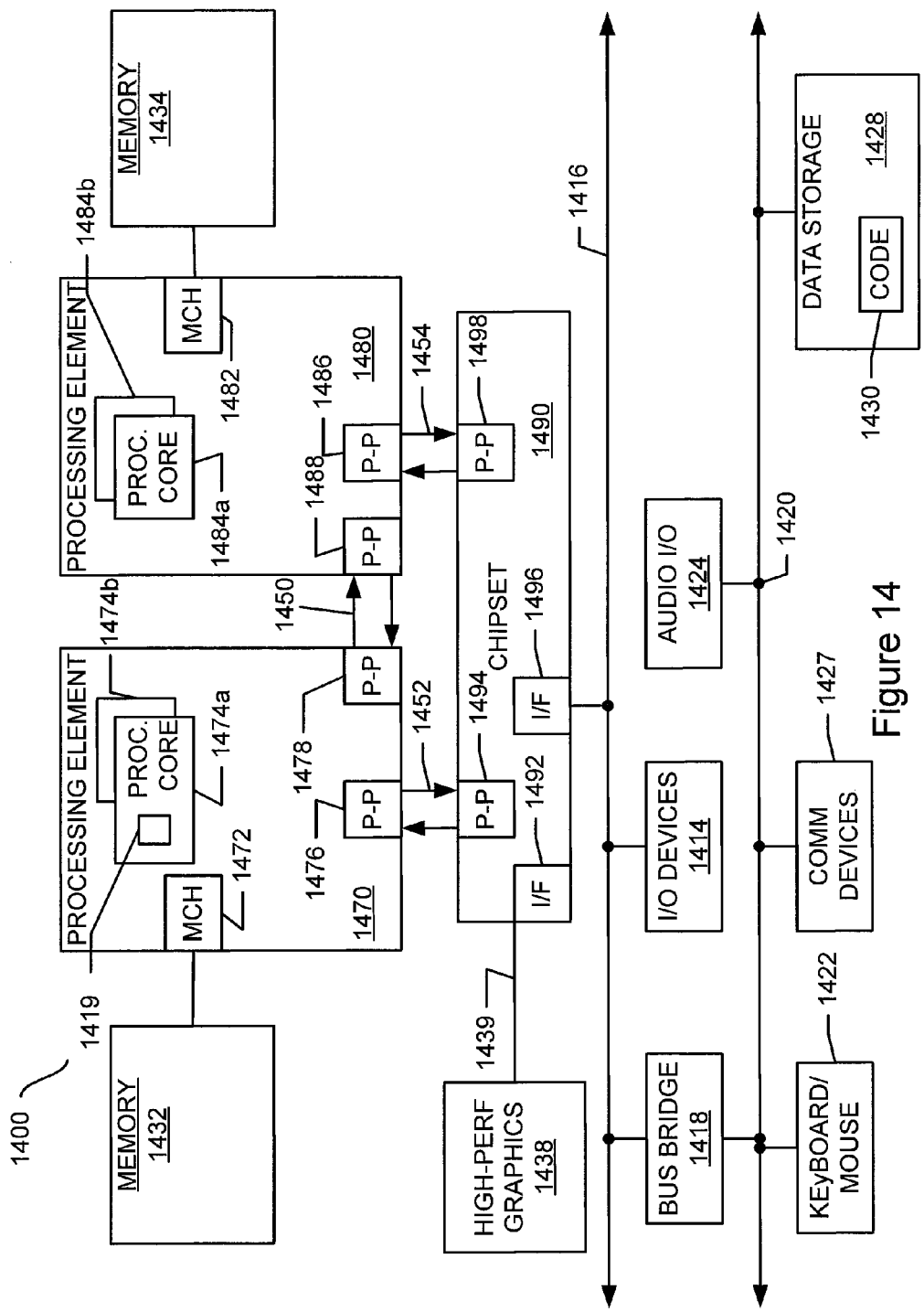
FIG. 14 shows a block diagram of a second system in accordance with an embodiment of the present invention.

Referring now to FIG. 14, shown is a block diagram of a second system 1400 in accordance with an embodiment of the present invention. As shown in FIG. 14, multiprocessor system 1400 is a point-to-point interconnect system, and includes a first processing element 1470 and a second processing element 1480 coupled via a point-to-point interconnect 1450. As shown in FIG. 14, each of processing elements 1470 and 1480 may be multicore processors, including first and second processor cores (i.e., processor cores 1474a and 1474b and processor cores 1484a and 1484b).

Alternatively, one or more of processing elements 1470, 1480 may be an element other than a processor, such as an accelerator or a field programmable gate array.

While shown with only two processing elements 1470, 1480, it is to be understood that the scope of the present invention is not so limited. In other embodiments, one or more additional processing elements may be present in a given processor.

First processing element 1470 may further include a memory controller hub (MCH) 1472 and point-to-point (P-P) interfaces 1476 and 1478. Similarly, second processing element 1480 may include a MCH 1482 and P-P interfaces 1486 and 1488. Processors 1470, 1480 may exchange data via a point-to-point (PtP) interface 1450 using PtP interface circuits 1478, 1488. As shown in FIG. 14, MCH's 1472 and 1482 couple the processors to respective memories, namely a memory 1442 and a memory 1444, which may be portions of main memory locally attached to the respective processors.

Processors 1470, 1480 may each exchange data with a chipset 1490 via individual PtP interfaces 1452, 1454 using point to point interface circuits 1476, 1494, 1486, 1498. Chipset 1490 may also exchange data with a high-performance graphics circuit 1438 via a high-performance graphics interface 1439. Embodiments of the invention may be located within any processor having any number of processing cores, or within each of the PtP bus agents of FIG. 14. In one embodiment, any processor core may include or otherwise be associated with a local cache memory (not shown). Furthermore, a shared cache (not shown) may be included in either processor outside of both processors, yet connected with the processors via p2p interconnect, such that either or both processors' local cache information may be stored in the shared cache if a processor is placed into a low power mode.

First processing element 1470 and second processing element 1480 may be coupled to a chipset 1490 via P-P interconnects 1476, 1486 and 1484, respectively. As shown in FIG. 14, chipset 1490 includes P-P interfaces 1494 and 1498. Furthermore, chipset 1490 includes an interface 1492 to couple chipset 1490 with a high performance graphics engine 1448. In one embodiment, bus 1449 may be used to couple graphics engine 1448 to chipset 1490. Alternately, a point-to-point interconnect 1449 may couple these components.

In turn, chipset 1490 may be coupled to a first bus 1416 via an interface 1496. In one embodiment, first bus 1416 may be a Peripheral Component Interconnect (PCI) bus, or a bus such as a PCI Express bus or another third generation I/O interconnect bus, although the scope of the present invention is not so limited.

As shown in FIG. 14, various I/O devices 1414 may be coupled to first bus 1416, along with a bus bridge 1418 which couples first bus 1416 to a second bus 1420. In one embodiment, second bus 1420 may be a low pin count (LPC) bus. Various devices may be coupled to second bus 1420 including, for example, a keyboard/mouse 1422, communication devices 1426 and a data storage unit 1428 such as a disk drive or other mass storage device which may include code 1430, in one embodiment. Further, an audio I/O 1424 may be coupled to second bus 1420. Note that other architectures are possible. For example, instead of the point-to-point architecture of FIG. 14, a system may implement a multi-drop bus or other such architecture.

Figure 15:
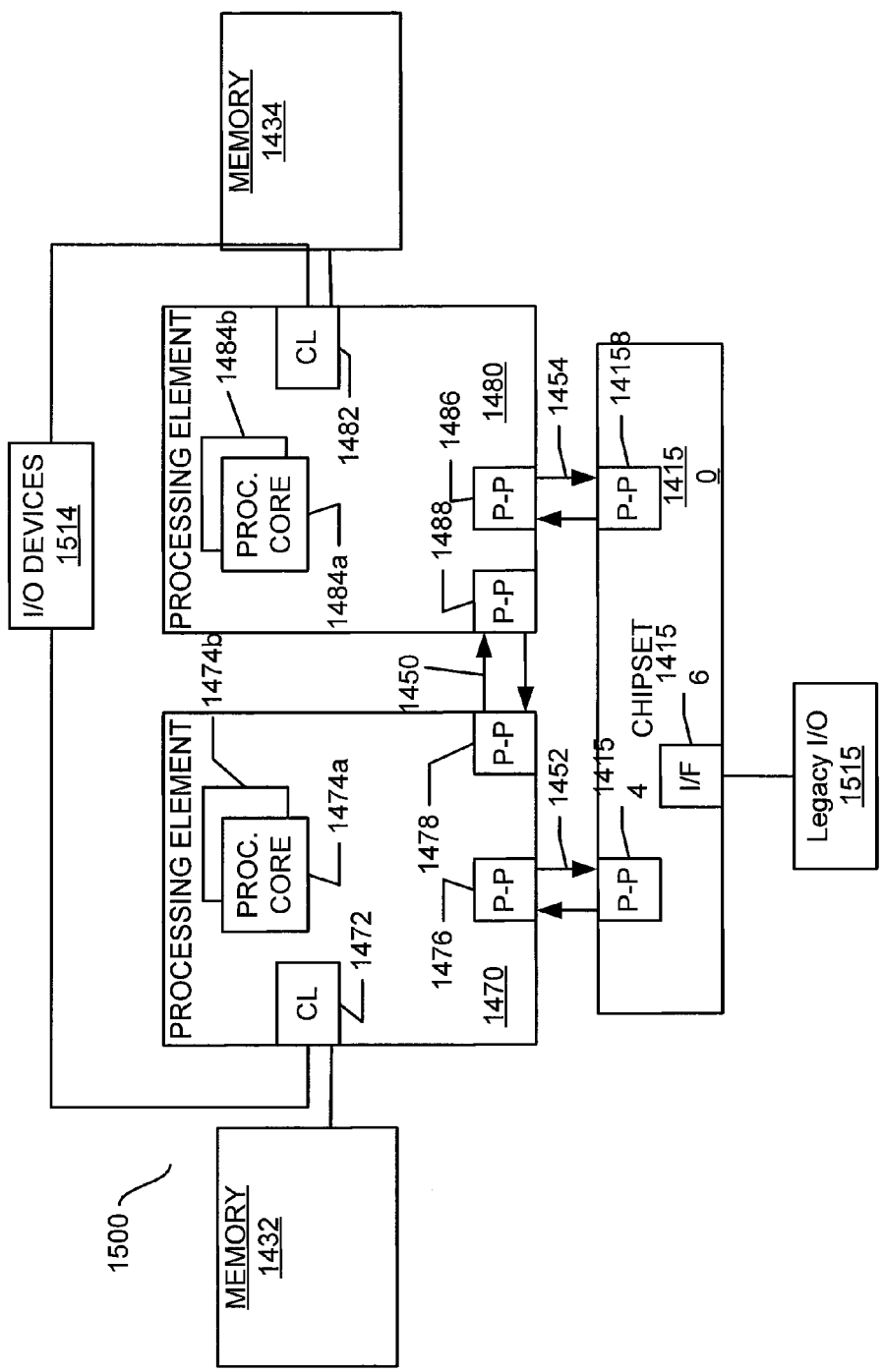
FIG. 15 shows a block diagram of a third system in accordance with an embodiment of the present invention.

Referring now to FIG. 15, shown is a block diagram of a third system 1500 in accordance with an embodiment of the present invention. Like elements in FIGS. 14 and 15 bear like reference numerals, and certain aspects of FIG. 14 have been omitted from FIG. 15 in order to avoid obscuring other aspects of FIG. 15.

FIG. 15 illustrates that the processing elements 1470, 1480 may include integrated memory and I/O control logic ("CL") 1472 and 1482, respectively. For at least one embodiment, the CL 1472, 1482 may include memory controller hub logic (MCH) such as that described above in connection with FIGS. 13 and 14. In addition, CL 1472, 1482 may also include I/O control logic. FIG. 15 illustrates that not only are the memories 1442, 1444 coupled to the CL 1472, 1482, but also that I/O devices 1514 are also coupled to the control logic 1472, 1482. Legacy I/O devices 1515 are coupled to the chipset 1490.

Embodiments of the mechanisms disclosed herein may be implemented in hardware, software, firmware, or a combination of such implementation approaches. Embodiments of the invention may be implemented as computer programs or program code executing on programmable systems comprising at least one processor, a data storage system (including volatile and non-volatile memory and/or storage elements), at least one input device, and at least one output device.

Program code, such as code 1430 illustrated in FIG. 14, may be applied to input data to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative data stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of particles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Accordingly, embodiments of the invention also include non-transitory, tangible machine-readable media containing instructions or containing design data, such as HDL, which defines structures, circuits, apparatuses, processors and/or system features described herein. Such embodiments may also be referred to as program products.

Certain operations of the instruction(s) disclosed herein may be performed by hardware components and may be embodied in machine-executable instructions that are used to cause, or at least result in, a circuit or other hardware component programmed with the instructions performing the operations. The circuit may include a general-purpose or special-purpose processor, or logic circuit, to name just a few examples. The operations may also optionally be performed by a combination of hardware and software. Execution logic and/or a processor may include specific or particular circuitry or other logic responsive to a machine instruction or one or more control signals derived from the machine instruction to store an instruction specified result operand. For example, embodiments of the instruction(s) disclosed herein may be executed in one or more the systems of FIGS. 13, 14, and 15 and embodiments of the instruction(s) may be stored in program code to be executed in the systems.

The above description is intended to illustrate preferred embodiments of the present invention. From the discussion above it should also be apparent that especially in such an area of technology, where growth is fast and further advancements are not easily foreseen, the invention can may be modified in arrangement and detail by those skilled in the art without departing from the principles of the present invention within the scope of the accompanying claims and their equivalents. For example, one or more operations of a method may be combined or further broken apart.

Alternative Embodiments

While embodiments have been described which would natively execute the instructions described herein, alternative embodiments of the invention may execute the instructions through an emulation layer running on a processor that executes a different instruction set (e.g., a processor that executes the MIPS instruction set of MIPS Technologies of Sunnyvale, Calif., a processor that executes the ARM instruction set of ARM Holdings of Sunnyvale, Calif.). Also, while the flow diagrams in the figures show a particular order of operations performed by certain embodiments of the invention, it should be understood that such order is exemplary (e.g., alternative embodiments may perform the operations in a different order, combine certain operations, overlap certain operations, etc.).

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate embodiments of the invention. The scope of the invention is not to be determined by the specific examples provided above but only by the claims below.

System and Method for Automatic Parallelization of Threads During Runtime

Figure 16:
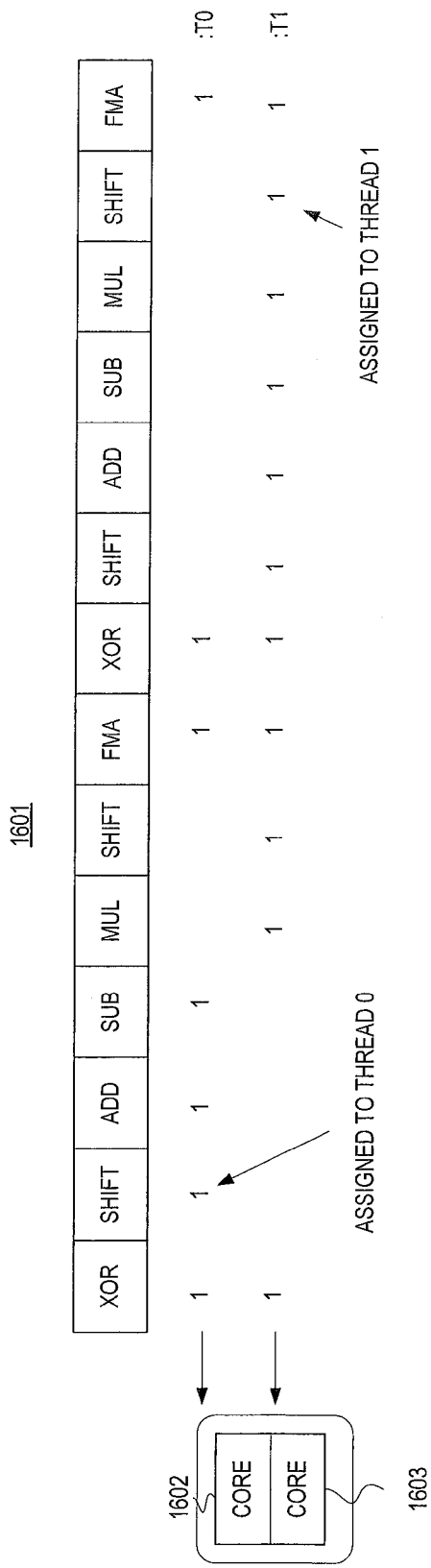
FIG. 16 illustrates an exemplary set of instructions assigned to different threads according to one embodiment.

Automatic parallelization of single threaded code is a challenging problem. The embodiments of the invention describe below performs automatic parallelization of single threaded binary code. FIG. 16 illustrates how a sequence of static instructions 1601 may be assigned to (decomposed to) create two parallel threads, T0 and T1. The techniques described herein explain how such parallelization may be accomplished dynamically, at runtime.

In particular, the embodiments of the invention provide solutions for:
 (1) parallelizing single threaded code (or a serial section of a parallel code) using binary code (i.e., without source code);
 (2) generating parallel threads that do not communicate while they execute;
 (3) using runtime branch and memory profile information for efficient parallelization;
 (4) generating parallel threads at runtime with low complexity and low overhead; and
 (5) parallelizing arbitrary code (not just loops, regular structures, etc).

Figure 17:
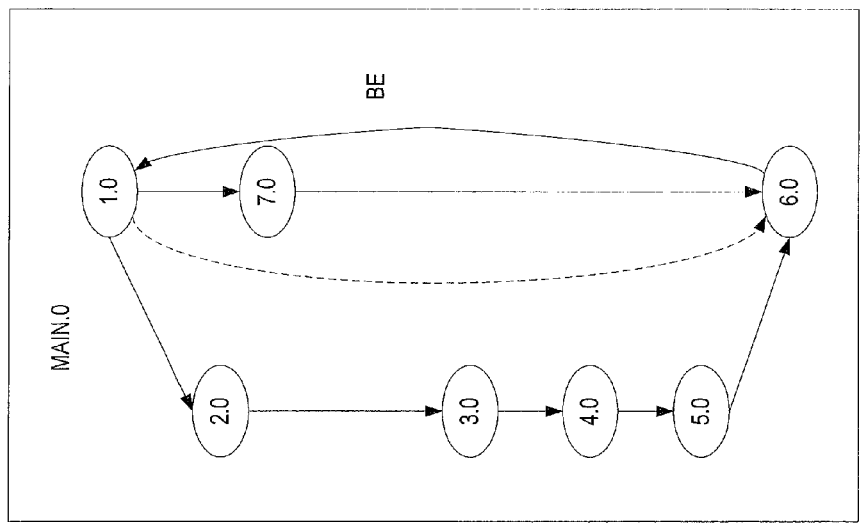
FIG. 17 illustrates an exemplary control flow graph used to illustrate embodiments of the invention.

Thread decomposition (TD) employed in one embodiment of the invention takes a static region of instructions such as that illustrated in FIG. 16 and a dynamic branch/memory-address profile of a single thread as input and decomposes this single thread into multiple speculative threads. FIG. 17 illustrates an exemplary control flow graph which will be used to provide an illustration of the operation of embodiments of the invention. The circles in FIG. 17 represent basic blocks and the arrows represent the program flow as each basic block is executed. For example, after basic block 2.0 is executed, the program flow moves to basic blocks 3.0, 4.0, 5.0, and finally 6.0. From 6.0, the program flow may return to basic block 1.0 from where it may branch back to basic block 2.0 or, alternatively, to basic block 7.0. Thus, the back edge (BE) arrow pointing from basic block 6.0 to 1.0 represents a program loop, which is addressed by embodiments of the invention as discussed below.

Figure 18:
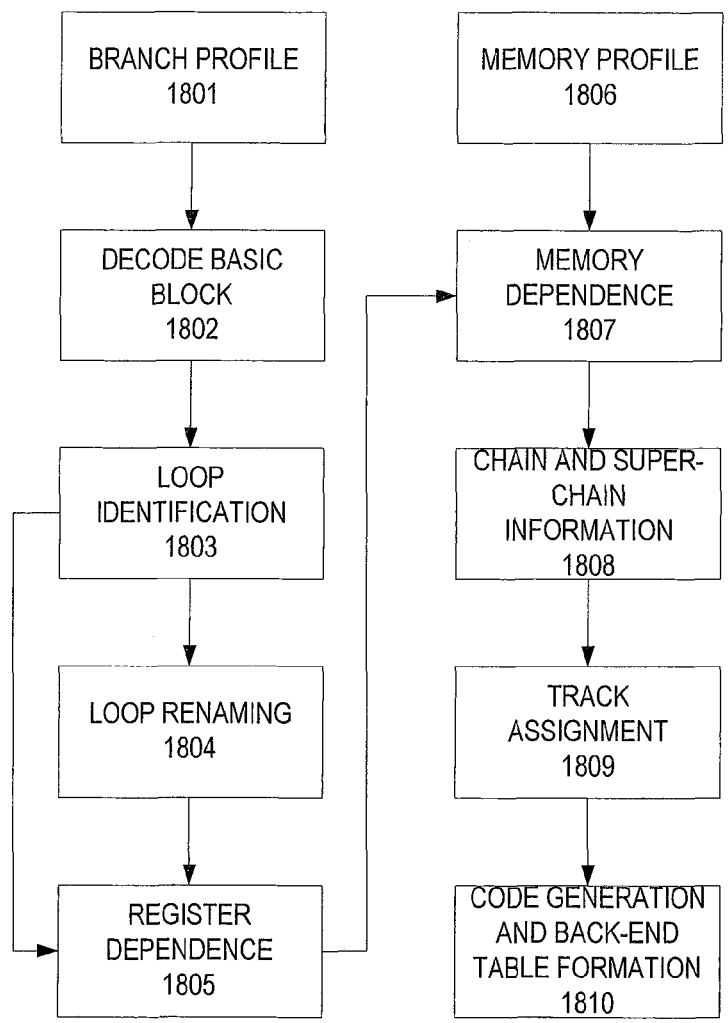
FIG. 18 illustrates a method according to one embodiment of the invention.

The speculative multithreading algorithm implemented by TD can be broken down into several phases as illustrated in the flowchart of FIG. 18. At 1801, a branch profile is parsed to extract the branch and memory profile information for the code region that will be decomposed. In one embodiment, the branch profile may be provided by the hardware described above. At 1802, the instruction bytes of the region are decoded by walking the branch profile. As the instruction bytes are decoded, the control flow between basic blocks is identified using the branch profile and a control flow graph (CFG) such as that shown in FIG. 16 is generated.

The next phase is loop identification 1803 and loop renaming 1804. Loop identification 1803 corresponds to cycles ("loops") in the control flow graph, such as the loop between basic blocks 6.0 and 1.0 in FIG. 16; it need not correspond to the actual program structure. Loop renaming 1804 is sometimes referred to as "loop unrolling" in that it makes multiple copies of the loop (see FIG. 23 described below). However, in one embodiment, it does not remove exits from the unrolled loop or change loop bounds, etc.

Loop renaming 1804 concludes all control manipulations. An approximation of immediate post dominators (Branch Convergent Points) may then be identified for branch instructions. Finally, parllelism is identified in this control flow graph. To do this, at 1805 and 1807, one embodiment of the invention establishes register and memory dependence relationships, respectively, between instructions in the CFG. In one embodiment, memory dependence information is established 1807 using the memory profile 1806 of the flow. For example, dependences that are not present in the flow may be assumed to be independent. Register dependences 1805 are formed by looking at register information associated with instructions in the region. In one embodiment, only true register dependences need to be considered; false dependences are handled by the implicit register renaming provides by the hardware in some embodiments (i.e., a side effect of executing on separate cores with separate register files) and the backend table mechanism (described later). Control dependences may be established using the branch convergent points identified earlier.

Figure 19:
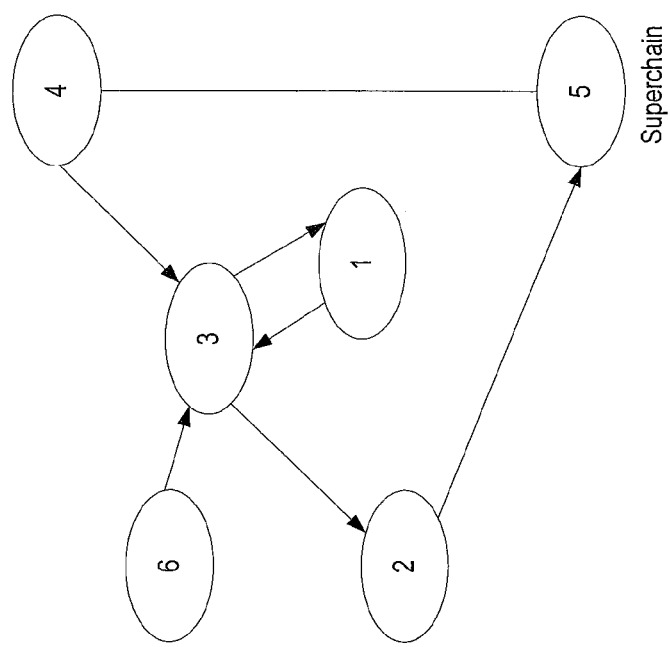
FIG. 19 illustrates one embodiment of a superchain.

Once dependences are established, at 1808 "super-chains" are formed—backward slices of instructions that don't have any consumer. As an example, in FIG. 19, a dependence graph of six instructions is shown with instruction 5 marked as a "superchain" because that instruction is not consumed by any other instruction. Once these super-chains are formed, at 1809 they are grouped together and assigned to execution tracks (T1 and T0 in FIG. 16) based on heuristics that balance the load of instructions on both cores 1602-1603. In one embodiment, each group is assigned to separate tracks/threads. As a result, each track is a speculative thread with some duplication of instructions between tracks and no communication between them. This allows them to be executed on separate cores 1602-1603 using hardware in one embodiment to detect any memory violations and/or commit state.

The final code generation phase 1810 emits the instructions for each track (with address related fix-up, branch adjustments, any new instructions that need to be emitted) and the backend table.

Having provided an overview of each of the operations set forth in FIG. 18, a detailed description of different embodiments of these operations will now be provided. One embodiment of the invention employs an Intermediate Representation (IR) of the program code. In particular, the thread decomposer (TD) logic uses a simple data flow representation of instructions which, in one embodiment, are x86 instructions. In one embodiment, the IR is operation-agnostic, except for memory, branch and some special instructions. The front end of the thread decomposer converts complex instructions (e.g., CISC x86 instructions) in to a simple format consisting of one destination and up to three source registers with explicit loads and stores. Any instruction that does not fit this simple form is broken down in to several simple instructions that are marked as a bundle.

Decoding Basic Blocks 1802:

Once the IR has been established, the TD walks the branch profile and requests information about the basic block starting at the target of the branch. If this information already exists, it continues to the next branch profile entry till the profile is walked and instruction bytes are read and converted to IR format. In one embodiment, indirect branches are converted to a jump table that converts the indirect branch to a direct branch for the observed targets in the flow profile.

There are limits on the number of targets supported. One embodiment creates a table 2001 to represent a CFG, such as that illustrated in FIG. 20. For instance, the table in FIG. 20 represents the CFG illustrated in FIG. 17. The illustrated table 2001 has only two edges for each basic block. For example, the table shows that basic block 1 has edges to both basic blocks 7 and 2 while the remaining basic blocks only have a single edge to another basic block (e.g., basic block 2 has an edge to basic block 3, basic block 3 has an edge to basic block 4, etc). A mapping is thus maintained between the decoded instruction bytes and the IR. Since the TD operations described herein do not alter instructions, there is no need for an encoder. The stored bytes are copied to the relevant track during code generation.

Loop Detection 1803 and Loop Renaming 1804:

The goal of back edge detection in thread decomposition is not to identify the true back edge (head dominates the tail) but to break a cycle in the CFG. After back edge detection, if the back edges from a graph are removed, the resulting graph is acyclic. The technique for back edge detection employed in one embodiment uses bit vectors to propagate bits from source to target basic blocks. If the bit corresponding to target basic block is already set, then a cycle is identified and the current edge is marked as a back edge. Once back edges are identified, blocks that belong to the loop are determined. To detect basic blocks in a loop, the following question is asked for every basic block: If any of my successors is in a loop then I am also in that loop, with one exception; the block that flows in to a loop head is not part of that loop. To exclude this block, a bit vector is defined that prevents propagation of the loop vector bit from a loop head to the predecessor of the loop head.

Figure 21:
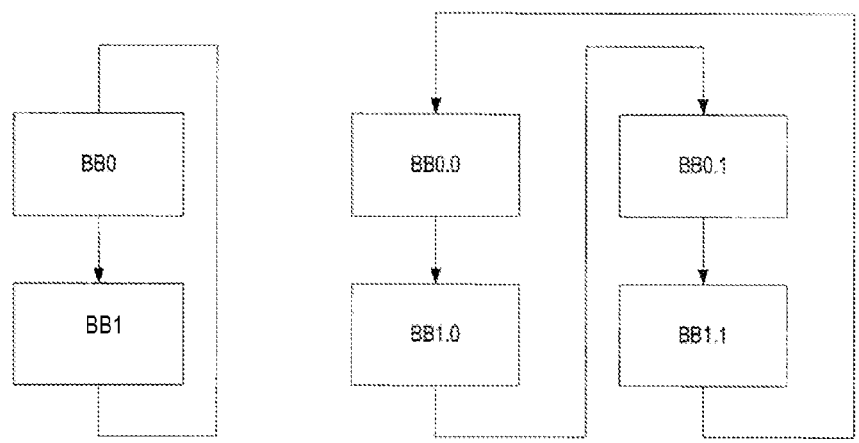
FIG. 21 illustrates one embodiment of an exemplary set of renamed basic blocks.

Loops are "conceptually" unrolled by creating versions for basic blocks. The table of FIG. 23 illustrates multiple versions (V0, V1) generated from the basic blocks shown in FIGS. 17 and 20. A version of a basic block is only associated with blocks in a loop. For example, as shown in FIG. 21, if one loop is found and blocks BB0 and BB1 are in that loop with the back edge going from BB1 to BB0, then the edges are remapped in the following manner: If the loop level of BB0 and BB1 was 2 (i.e. they were identified to be part of an inner loop), then four versions would be created, illustrated in FIG. 21 as BB0.0, BB1.0, BB0.1, and BB1.1. In one embodiment, loops are renamed so that parallelism can be obtained between two iterations of the same loop.

Figure 22:
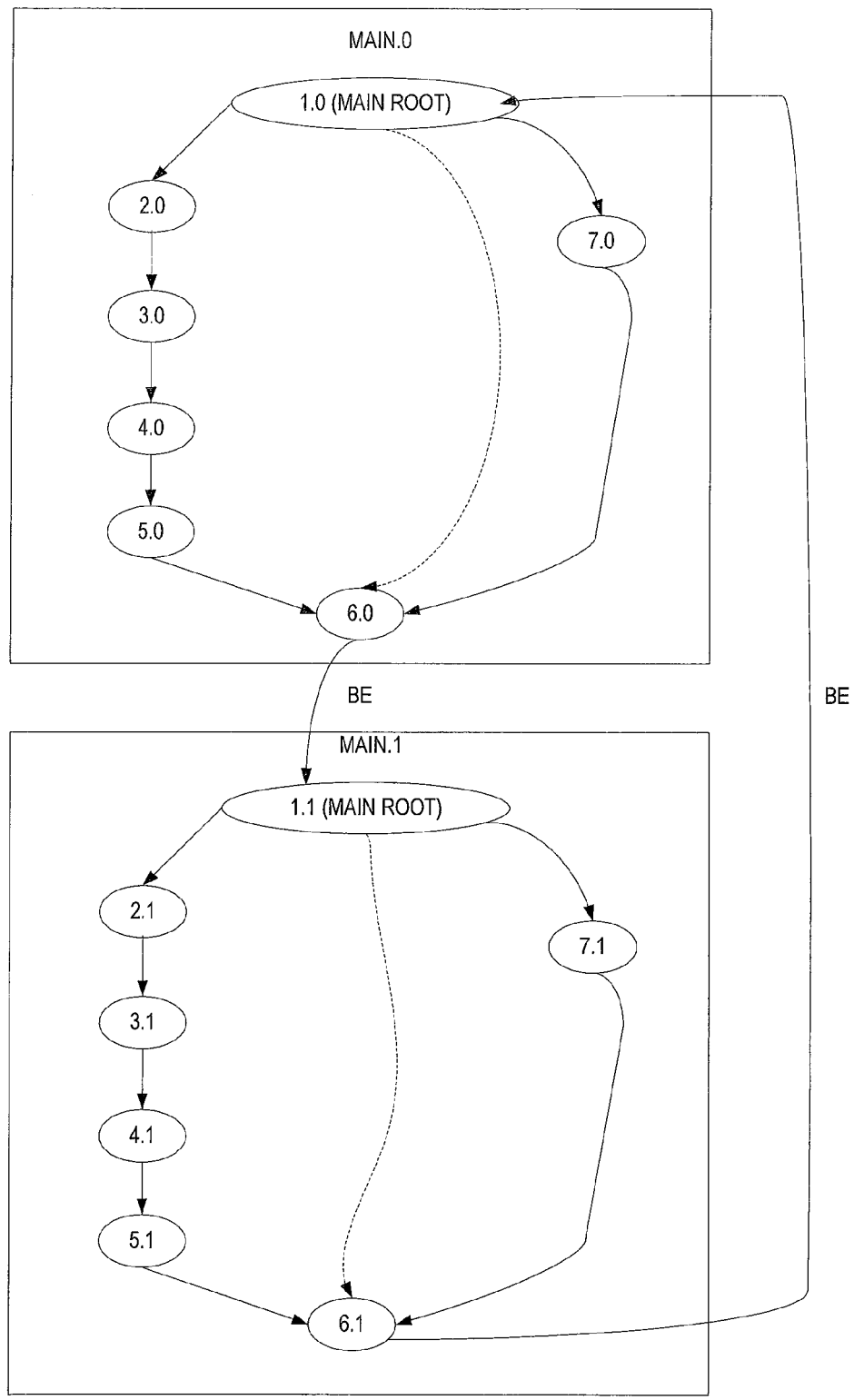
FIG. 22 illustrates one embodiment of a control flow graph showing a plurality of renamed basic blocks.

A control flow graph illustrating the foregoing principles is illustrated in FIG. 22, which shows two versions of the CFG in FIG. 17. MAIN.0 shows version of the CFG with basic blocks identified as 1.0 through 7.0; and MAIN.1 shows the second version of CFG with basic blocks identified as 1.1 through 7.1. The two versions of basic blocks may be executed in parallel and are linked via the back edge from basic block 6.0 to basic block 1.1 and from basic block 6.1 to basic block 1.0.

Register Dependence Analysis 1805:

One embodiment of TD builds use to def (UD) chains (also known as use-def chains or simply def chains) for identifying chains of dependent instructions for parallelization. The first step in identifying dependence is by using registers and branches and involves propagating the taken and not-taken (T/NT) bits along their respective paths. This is a forward union data flow problem. The point at which both T and NT bits for a particular branch converge is the convergent point for that branch. In other words that node is not control dependent on the branch. For instance, in FIG. 17, the convergent point for the branch at the end of basic block 1.0 is top of the basic block 6.0. In other words, no matter which control path the execution takes after basic block 1.0, the execution reaches basic block 6.0. This fact is depicted by a dotted arrow in FIG. 17. The next step is to use classical data flow analysis to generate reaching definitions.

Memory Dependence Analysis 1807:

As with register dependence, during memory dependence analysis 1807 only true dependences are of concern. In one embodiment, the system should ensure that there is dependence between loads that occur after a store to the same part of the same cache line. The memory profile is used 1806 to mark the dependences. Any dependence that is not seen in the profile is assumed not to exist. The branch profile and memory profile are walked over simultaneously. If a memory operation was a store, the addresses that were stored to are recorded. If a load is encountered, a lookup is performed to see if a previous store has been seen to the addresses being loaded from. If the lookup finds a match, a dependence is established between the load and the store. When the end of a basic block is reached, the branch profile is used to determine which edge is taken and move to the next basic block connected via that edge. This process continues until all entries in the memory and branch profiles are exhausted. The frequency of each basic block is also updated as the basic block is encountered before moving to the next basic block. This is used during super-chain assignment to tracks.

Super-Chain Formation 1808:

Super-chains are backward slices in the dependence graph of all instructions that don't have consumers. Thus, the first step in calculating super-chains is to find the instructions which don't have any consumers. These are the seed nodes for each super-chain to be constructed. In one embodiment, this is done by going through all instructions and marking the producers of the instruction in the UD chain as consumed. Instructions that are not consumed are added to the list super-chain generators. Super-chains are then grown from the super-chain generators by scanning the super-chain list object looking for the generators, starting with the UD chain for each instruction that forms the seed of the super chain. This chain is augmented with the producers and the process continues by processing their respective UD chains. This process continues until all transitive UD chains formed have been exhausted and super-chains have been calculated for all of the generators.

Track Assignment 1809:

Now that super-chains are established, they need to be assigned to separate tracks. The goal in one embodiment is to load balance the super-chains across the tracks. For example, if a particular super-chain places a very high load on a track/core, than that super-chain may be placed on a track/core by itself, with the other super-chains being grouped together on a separate track/core. Each super-chain represents a set of instructions that are dependent on each other and one super-chain is independent from another. Based on the amount of speculative resources available on the processor, 2 or more tracks can be generated. Each track will include the set of super-chains that will execute in parallel with other tracks. For example, if there are 4 super chains, they may be assigned such that 2 super chains are on one track and 2 super-chains are on the other. Alternatively, based on load, 1 super-chain may be assigned to its own track and the other 3 super-chains may be assigned to the other track.

In one embodiment, the first step is to calculate an approximate execution time for each super-chain. This may be done by using the frequency information collected during memory dependence analysis while walking the flash profile. Using the frequency information an approximation for the time taken for each super-chain may be calculated. Two super-chains may have instructions that are identical. In one embodiment, multiple heuristics are used during track assignment: (1) Load balancing to ensure that each track has similar amount of work (as described above); and (2) minimal duplication should occur between instructions on different tracks (i.e., so that the same processor resources are not being consumed in an overlapping manner).

Code Generation & Backend Table 1810:

Now that the region of code has been parallelized into two or more separate tracks, the code bytes associated with the two tracks needs to be emitted and the backend table which is used by the hardware needs to be generated to manage state correctly. Since new instructions are not generated by the thread decomposer (just reassignment to tracks), an encoder is not required and the mapping of the IR to instruction bytes is used to emit the executable code. Some basic blocks may be empty as all instructions are on a different track so branch target manipulation may be performed to avoid jumping to empty basic blocks; but the need for an encoder is still avoided.

The backend table is used by the processor hardware in one embodiment to synchronize execution across tracks and maintain the correct state. In one embodiment, to emit the backend table, all basic blocks are traversed and the taken/not taken targets are marked in the table. For each thread, the type of control transfer is marked for that version. Next, the load/store track bits are marked. For memory instructions, a determination is made as to what tracks they belong to, the track bits set appropriately, and the index is incremented. Once the end of a basic block is reached, a marker is used in the track bits to indicate that the end of the basic block has been reached. This way the processor hardware knows it has reached the end of the basic block. The processor hardware uses this information stored to maintain consistent state, checkpoint and commit as required and rollback when a violation is detected.

The techniques described above are unique and beneficial compared to current strategies used to parallelize single threaded code. In particular, prior approaches use a compiler (e.g., icc) to parallelize applications when compiling from source code or, alternatively, programmers manually parallelize their code.

In contrast to these prior techniques, the embodiments of the invention operate on binaries (e.g., x86 binaries) instead of source code and parallelize code having arbitrary control flow. Parallelization happens automatically without any programmer intervention. The generated parallel threads do not communicate while the parallel code is executing, thereby allowing threads to work independently (i.e., one thread does not stall for the other thread to produce a result). The parallelization algorithms make use of dynamic information (branch and memory profile) to extract more parallelism than possible with just static information. The memory profile is used to disambiguate store and load operations dynamically.

In one embodiment, the decoding algorithm separates an x86 stack update instruction (e.g., push/pop) into two operations (stack read/write and stack-pointer update) to avoid false dependences due to stack pointer updates. The techniques described herein have very low complexity and hence are suitable to be used by a runtime code generator (e.g., a just in time (JIT) code generator). In one embodiment, the whole parallelization algorithm (excluding x86 decoding) is written with ~1500 C statements. In one embodiment, the algorithms are regular, table/array based, and vectorized (using SSE/AVX) for best performance and low complexity and robustness. In one embodiment, these techniques allow parallelization to happen at finer granularity (at instruction level) as well as at a coarse granularity (e.g., at loop/function level).

Figure 24:
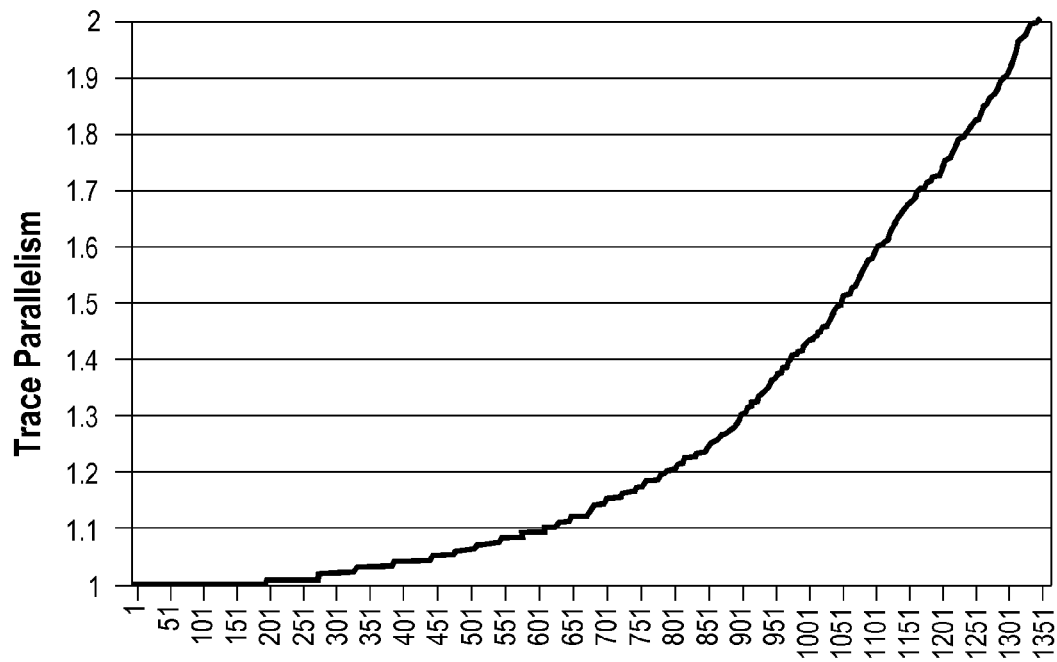
FIG. 24 illustrates exemplary graphs showing trace parallelism.
Figure 24:
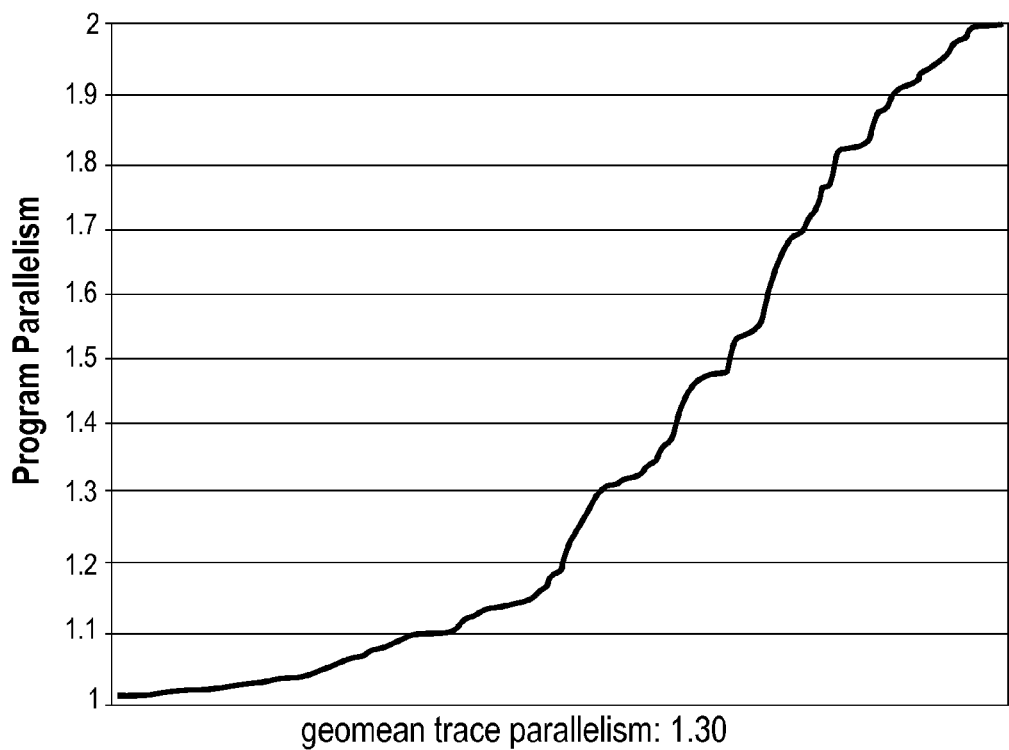

The efficacy of the thread decomposition process was evaluated using the implementation described previously along with a functional model of existing processor hardware. The implementation successfully decomposed around 826,000 code regions based on profiles collected across 31,000 LIT traces, in addition to code regions in 124 single-threaded workloads. FIG. 24 illustrates S-curves for both a study list of LIT traces (the single thread study list used to evaluate microarchitectural enhancements) and also on full application runs of 124 single-threaded workloads composed primarily of SPEC CPU2006, PARSEC, MediaBenchll, NAS Parallel Benchmarks, ArBB kernels, and the SSG Parallel Languages Futures benchmark suite.

In both charts shown in FIG. 24, a trace or program parallelism of 2.0 (an ideal decomposition) indicates that the benchmark was evenly divided among the 2 cores and without any duplication of instructions. A parallelism of 1.0 indicates that either no significant parallelism suitable for thread decomposition was present (i.e., the region required significant duplication), or that other aspects of the modeled processor did not discover the hot code or properly manage some aspect of the system (e.g., translated region management).

Figure 25:
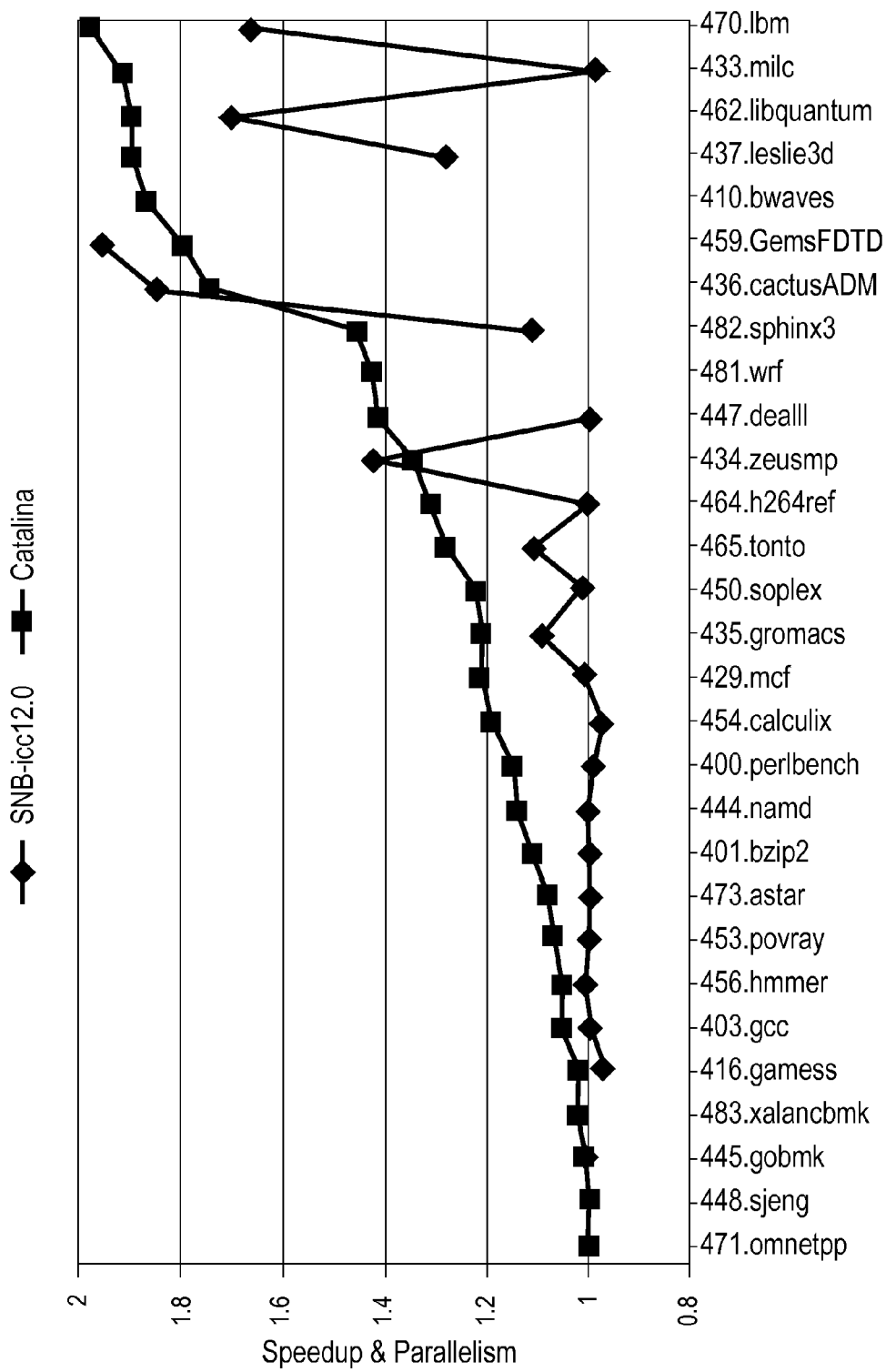
FIG. 25 illustrates one embodiment of a graph showing speedup and parallelism achieved by one embodiment of the invention.

In the chart shown in FIG. 25 for the SPEC CPU2006 benchmarks, the parallelism exposed by thread decomposition (as measured using the Catalina functional model) is compared to the measured speedup of compiler auto-parallelization for the icc 12.0 compiler on a Sandybridge workstation configured with two cores and with hyper-threading disabled.

The parallelism metric is described above. The first notable aspect is that parallelism is found among a many more of the benchmarks than compiler auto-parallelization despite the narrow and obfuscated view of the application. The other notable aspect is that these techniques tend to find at least as much parallelism as compiler auto-parallelization in cases where the auto-parallelization is able to perform well.

These embodiments of the invention describe a robust thread generation (parallelization) software layer that can be shipped as a part of the processor, or as a separate user visible library. The thread decomposition algorithm described here can be applied to general parallelization. Due to its simplicity, robustness, and low overheads, these techniques are suitable for implementing in any JIT.

Automatic parallelization allows single threaded code to run faster on a multicore processor. As the number of cores increase in the future, the value of automatic parallelization increases. With this technology, more performance may be provided using automatic parallelization.

We claim:
1. A computer-implemented method comprising:
analyzing a single-threaded region of executing program code, the analysis including identifying dependencies of binary code within the single-threaded region;
determining portions of the single-threaded region of executing program code which may be executed in parallel based on the analysis that includes the identified dependencies of binary code within the single-threaded region;
assigning the portions to two or more parallel execution tracks; and
executing the portions in parallel across the assigned execution tracks.
2. The method as in claim 1 wherein the dependences include register-based dependencies and memory-based dependencies.
3. The method as in claim 1 wherein the operation of analyzing further comprises:
parsing a branch profile to extract branch and memory profile information for the executing program code region.
4. The method as in claim 3 wherein the operation of analyzing further comprises:
decoding basic blocks of the program code region by walking the branch profile.
5. The method as in claim 4 wherein the operation of analyzing further comprises:
identifying loops within the region of program code; and
responsively creating multiple versions of basic blocks within the loops, the multiple versions being capable of execution in parallel.
6. The method as in claim 5 wherein identifying loops comprises identifying back edges in a control flow representation of the region of program code.
7. The method as in claim 5 wherein creating multiple versions comprises renaming the loops to uniquely identify the different versions.
8. The method as in claim 5 further comprising:
performing a register dependence analysis and a memory dependence analysis to identify independently-executable regions of the program code.
9. The method as in claim 8 further comprising:
forming super-chains from the program code.
10. The method as in claim 9 wherein forming super-chains comprises the operations of:
identifying instructions in the program code which are not consumed by any other instruction;
using the instructions which are not consumed by any other instruction as seed nodes for each super-chain; and
building each super-chain from a seed node.
11. The method as in claim 9 further comprising:
assigning each super-chain to one of the parallel execution tracks.

12. The method as in claim 11 further comprising:
calculating an approximate execution time for each super-chain; and
assigning each super-chain to balance load across the parallel execution tracks.

13. The method as in claim 12 further comprising:
reducing duplication of instructions between different parallel execution tracks using multiple heuristics so that same processors resources are not being consumed in an overlapping manner.

14. The method as in claim 13 further comprising:
emitting code bytes associated with each of the parallel execution tracks; and
generating a backend table usable by processor hardware to synchronize execution across tracks and maintain the correct state of each of the parallel execution tracks.

15. The method as in claim 14 wherein emitting code bytes comprises converting from an intermediate representation of the program code to program code executable on the processor.

16. The method as in claim 14 wherein generating the backend table comprises:
traversing all basic blocks and responsively setting taken/not taken targets in the backend table;
setting in the backend table the type of control transfer for each basic block;
setting in the backend table load/store track bits for each basic block; and
determining, for memory instructions, the tracks that they belong to and responsively setting the track bits associated therewith in the backend table.

* * * * *